United States Patent
Miyazaki et al.

(10) Patent No.: US 10,158,723 B2
(45) Date of Patent: Dec. 18, 2018

(54) DETERMINING COMMUNICATION HISTORY OF USERS

(71) Applicants: SONY CORPORATION, Tokyo (JP); SONY MOBILE COMMUNICATIONS INC., Tokyo (JP)

(72) Inventors: Reiko Miyazaki, Tokyo (JP); Yasushi Okumura, Tokyo (JP); Tomoo Mizukami, Tokyo (JP)

(73) Assignees: SONY CORPORATION, Tokyo (JP); SONY MOBILE COMMUNICATIONS INC., Tokyo (JP)

( * ) Notice: Subject to any disclaimer, the term of this patent is extended or adjusted under 35 U.S.C. 154(b) by 111 days.

(21) Appl. No.: 14/438,376

(22) PCT Filed: Sep. 24, 2013

(86) PCT No.: PCT/JP2013/075773
§ 371 (c)(1),
(2) Date: Apr. 24, 2015

(87) PCT Pub. No.: WO2014/073276
PCT Pub. Date: May 15, 2014

(65) Prior Publication Data
US 2015/0296031 A1  Oct. 15, 2015

(30) Foreign Application Priority Data
Nov. 9, 2012  (JP) .................................. 2012-247893

(51) Int. Cl.
G06F 15/16 (2006.01)
H04L 29/08 (2006.01)
(Continued)

(52) U.S. Cl.
CPC .............. H04L 67/16 (2013.01); G06F 13/00 (2013.01); G06F 17/30 (2013.01);
(Continued)

(58) Field of Classification Search
CPC .. G06Q 10/10; G06Q 10/107; G06K 9/00664; G06K 9/00677
(Continued)

(56) References Cited

U.S. PATENT DOCUMENTS 9,396,195 B1* 7/2016 Beguelin ............ G06F 17/30053
2010/0179874 A1* 7/2010 Higgins ............ G06K 9/00664
705/14.53
(Continued)

FOREIGN PATENT DOCUMENTS

JP  2008-176402 A  7/2008
JP  2010-079804 A  4/2010
(Continued)

OTHER PUBLICATIONS

European Search Report received for European Patent Application No. 13853504.2, dated Jun. 20, 2016, 12 pages.
(Continued)

Primary Examiner — Kyung H Shin
(74) Attorney, Agent, or Firm — Chip Law Group

(57) ABSTRACT

There is provided a communication terminal including an information acquisition unit that acquires, from another communication terminal, first information that includes connection information for connecting to a communication service and identification information of a user of the other communication terminal, and an information generation unit that, on the basis of the first information acquired by the information acquisition unit, generates second information that includes the connection information and identification information of a user of the current terminal.

17 Claims, 43 Drawing Sheets

(51) Int. Cl.
  *G06F 17/30* (2006.01)
  *G06F 13/00* (2006.01)
  *H04L 29/06* (2006.01)

(52) U.S. Cl.
  CPC ...... *G06F 17/30861* (2013.01); *H04L 65/403* (2013.01); *H04L 67/10* (2013.01); *H04L 67/22* (2013.01)

(58) Field of Classification Search
  USPC ........... 709/204; 235/375, 462.01; 705/14.53
  See application file for complete search history.

(56) References Cited

U.S. PATENT DOCUMENTS

2011/0101086 A1* 5/2011 Yach ................ G06Q 10/10
  235/375
2011/0307610 A1 12/2011 Hayashi

FOREIGN PATENT DOCUMENTS

| JP | 2011-259372 A | 12/2011 |
| JP | 2012-064151 A | 3/2012 |
| JP | 2012-133735 A | 7/2012 |
| JP | 2012-134932 A | 7/2012 |

OTHER PUBLICATIONS

Evie Powell et al., "Snag'em: Creating Community Connections through Games", 2011 IEEE Third International Conference on Privacy, Security, Risk and Trust (PASSAT), and 2011 IEEE Third International Conference on Social Computing, IEEE, Oct. 9, 2011, pages 4, XP032090260, DOI: 10.1109/PASSAT/SOCIALCOM.2011.229.

Office Action for JP Patent Application No. 2014-545604, dated Jul. 11, 2017, 07 pages of Office Action.

Office Action for CN Patent Application No. 201380057400.X dated Jan. 31, 2018, 9 pages of Office Action and 12 pages of English Translation.

* cited by examiner

FIG.6

140 PLAYLIST

| META-INFORMATION (CONTENT NAME) 1400 | META-INFORMATION (ARTIST NAME) 1402 | ACCOUNT 1404 | PLAYBACK ORDER 1406 | ... |
|---|---|---|---|---|
| SONG 1 | ARTIST A | Akko | 1 | ... |
| SONG 2 | ARTIST B | Akko | 2 | ... |
| SONG 3 | ARTIST C | Jenny | 3 | ... |
| SONG 4 | ARTIST D | Jenny | 4 | ... |
| ... | ... | ... | ... | ... |

FIG.15

PLAYLIST TABLE 162

| META-INFORMATION (CONTENT NAME) 1620 | META-INFORMATION (ARTIST NAME) 1622 | ACCOUNT 1624 | PLAYBACK DATE 1626 | PLAYBACK TIME 1628 | ... |
|---|---|---|---|---|---|
| SONG 1 | ARTIST A | Akko | 2012/10/26 | 20:05 | ... |
| SONG 2 | ARTIST B | Akko | 2012/10/26 | 20:35 | ... |
| SONG 3 | ARTIST A | Jenny | 2012/10/26 | 21:05 | ... |
| SONG 4 | ARTIST D | Jenny | 2012/10/26 | 21:35 | ... |
| ... | ... | ... | ... | ... | ... |

FIG.16

IMAGE TABLE 164

| IMAGE FILE 1640 | ACCOUNT 1642 | EMAIL ADDRESS 1644 | CAPTURE DATE 1646 | CAPTURE TIME 1648 |
|---|---|---|---|---|
| IMAGE 1 | Akko | aaa@jp.com | 2012/10/26 | 20:00 |
| IMAGE 2 | Akko | aaa@jp.com | 2012/10/26 | 20:30 |
| IMAGE 3 | Jenny | bbb@jp.com | 2012/10/26 | 21:00 |
| IMAGE 4 | Jenny | bbb@jp.com | 2012/10/26 | 21:30 |
| ... | ... | ... | ... | ... |

FIG.21

190 — MUSIC SELLING SERVICE

| META-INFORMATION (CONTENT NAME) 1900 | META-INFORMATION (ARTIST NAME) 1902 | PRICE 1904 | ... |
|---|---|---|---|
| SONG 1 | ARTIST A | 500 | ... |
| SONG 2 | ARTIST B | 600 | ... |
| SONG 3 | ARTIST A | 200 | ... |
| SONG 4 | ARTIST D | 500 | ... |
| ... | ... | ... | ... |

FIG.26

DEGREE OF APPEARANCE TABLE 230

| PERSON OF INTEREST 2300 | IMAGE FILE 2302 | NOTICEABILITY 2304 |
|---|---|---|
| A | IMAGE 1 | 1.0 |
| A | IMAGE 2 | 1.0 |
| B | IMAGE 1 | 1.2 |
| B | IMAGE 2 | 0.9 |
| C | IMAGE 3 | 1.0 |
| D | IMAGE 2 | 2.0 |
| D | IMAGE 3 | 1.0 |
| ... | ... | ... |

FIG.28

| IMAGE GROUP | DEGREE OF APPEARANCE | | | | VARIANCE OF DEGREE OF APPEARANCE |
|---|---|---|---|---|---|
| | A | B | C | D | |
| IMAGE 1, IMAGE 2, IMAGE 3 | 2.0 | 1.8 | 1.0 | 3.0 | 0.51 |
| IMAGE 1, IMAGE 2 | 2.0 | 1.8 | 0 | 2.0 | 0.71 |
| IMAGE 1, IMAGE 3 | 1.0 | 1.2 | 1.0 | 1.0 | 0.71 |
| IMAGE 2, IMAGE 3 | 1.0 | 0.6 | 1.0 | 3.0 | 0.88 |

FIG.33

322 PROPAGATION INFORMATION TABLE

| CONNECTING PERSON ID | PROPAGATION SOURCE ID | PROPAGATION DESTINATION ID | |
|---|---|---|---|
| A | Non | B | ⋮ |
| B | A | D | ⋮ |
| C | B | E | ⋮ |
| D | B | Non | ⋮ |
| E | C | Non | ⋮ |
| ⋮ | ⋮ | ⋮ | ⋮ |

432 CONTENT SHARING LIST

| META-INFORMATION (CONTENT NAME) 4320 | META-INFORMATION (CONTENT TYPE) 4322 | CONTENT OWNER 4324 | ... |
|---|---|---|---|
| SONG 1 | MUSIC | Akko | ... |
| SONG 2 | MUSIC | Jenny | ... |
| IMAGE 1 | IMAGE | Akko | ... |
| IMAGE 2 | IMAGE | Moscow | ... |
| ... | ... | ... | ... |

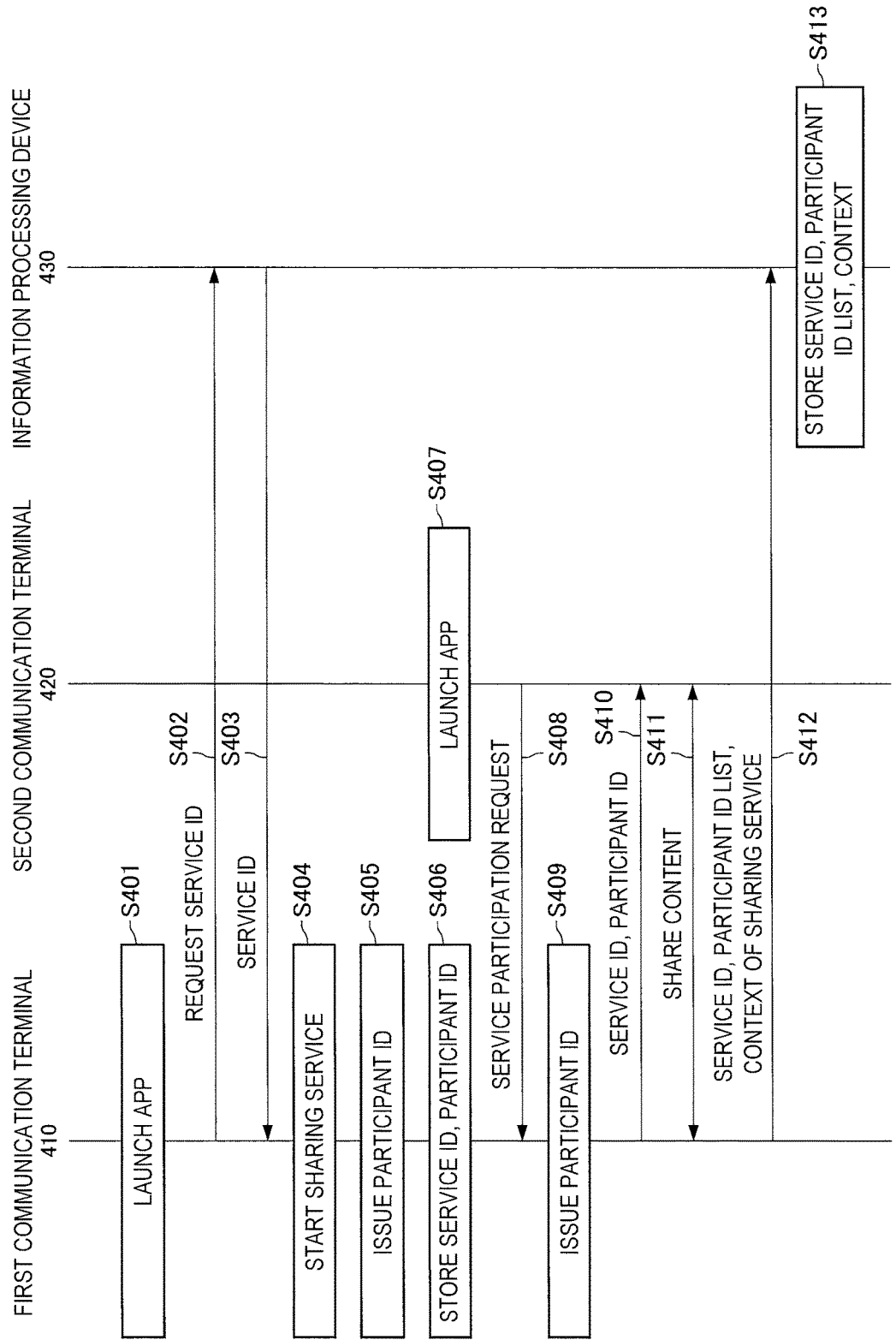

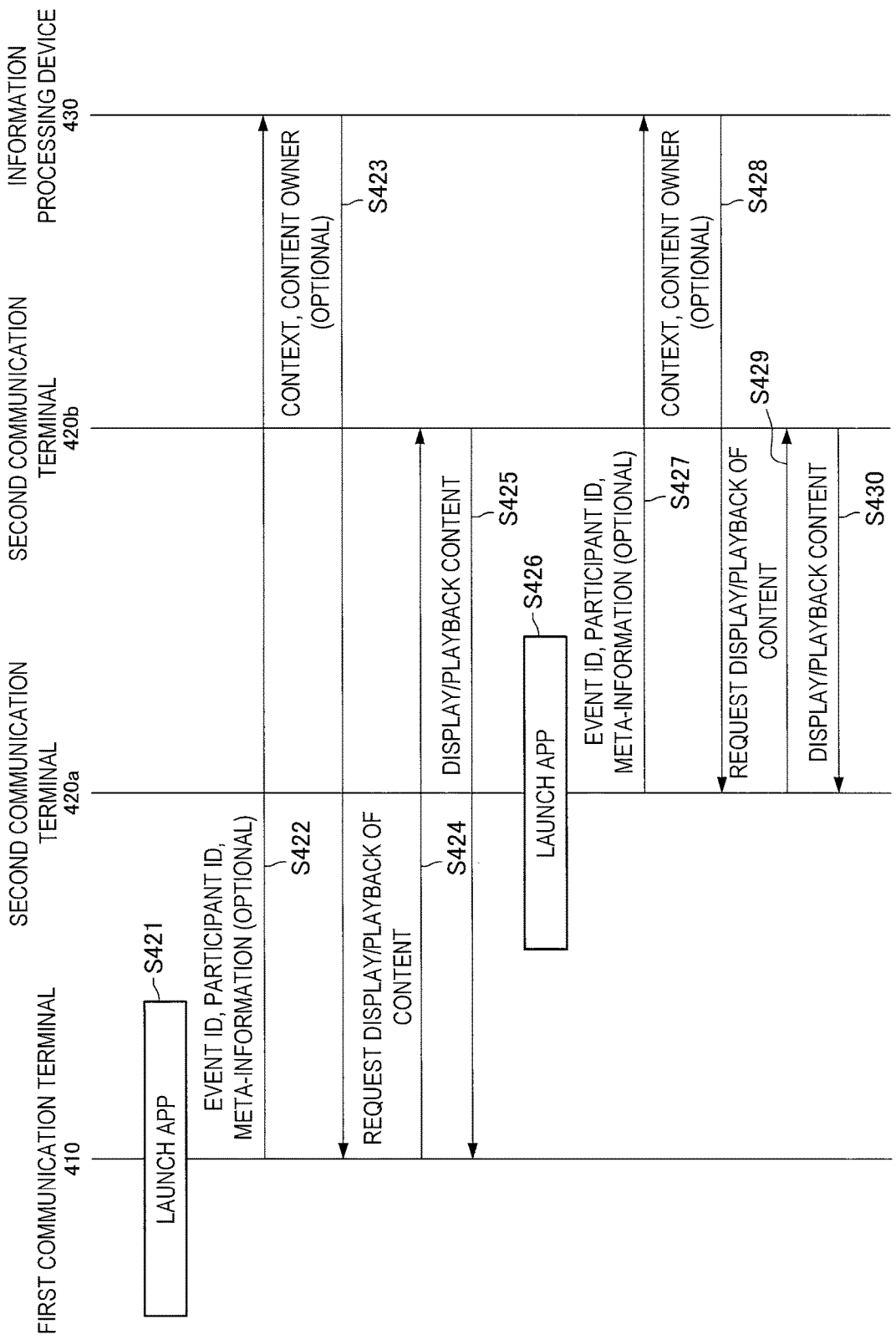

DETERMINING COMMUNICATION HISTORY OF USERS

TECHNICAL FIELD

The present disclosure relates to a communication terminal, an information processing device, a communication method, an information processing method, a program, and a communication system.

BACKGROUND ART

Recently, mobile communication terminals such as mobile phones are proliferating, enabling individuals to exchange information with others with almost no restrictions on place. In addition, there is also the development of information processing technology that supports information sharing between acquaintances and connections between people, such as social networking services (SNS).

For example, Patent Literature 1 discloses technology that manages and updates a social graph by judging a degree of association between users, on the basis of a communication history of a mobile terminal. Also, Patent Literature 2 discloses technology that estimates a person having a high information propagation ability, on the basis of a communication history of a communication terminal.

CITATION LIST

Patent Literature

Patent Literature 1: JP 2012-133735A
Patent Literature 2: JP 2012-064151A

SUMMARY OF INVENTION

Technical Problem

However, the above technologies are unable to support the clear indication of individual transmission histories of information in association with users. For example, at a place where many participants gather, such as a party venue, a history of how information was transmitted among which users, and in what order, cannot be ascertained.

Accordingly, the present disclosure provides a new and improved communication terminal, information processing device, communication method, information processing method, program, and communication system able to support the clear indication of individual transmission histories of information in association with users.

Solution to Problem

To solve the problem, according to an embodiment of the present disclosure, there is provided a communication terminal including an information acquisition unit that acquires, from another communication terminal, first information that includes connection information for connecting to a communication service and identification information of a user of the other communication terminal, and an information generation unit that, on the basis of the first information acquired by the information acquisition unit, generates second information that includes the connection information and identification information of a user of the current terminal.

To solve the problem, according to another embodiment of the present disclosure, an information processing device including a receiving unit that receives identification information of a user of a first communication terminal and identification information of a user of a second communication terminal from the second communication terminal, is the second communication terminal being a communication terminal that has received propagation of connection information of a communication service and identification information of a user of the current terminal from the first communication terminal, and a graph generation unit that generates a social graph that indicates a relationship between the user of the first communication terminal and the user of the second communication terminal.

To solve the problem, according to another embodiment of the present disclosure, there is provided a communication method including acquiring, from another communication terminal, first information that includes connection information for connecting to a communication service and identification information of a user of the other communication terminal, and generating, on the basis of the acquired first information, second information that includes the connection information and identification information of a user of the current terminal.

To solve the problem, according to another embodiment of the present disclosure, there is provided an information processing method including receiving identification information of a user of a first communication terminal and identification information of a user of a second communication terminal from the second communication terminal, is the second communication terminal being a communication terminal that has received propagation of connection information of a communication service and identification information of a user of the current terminal from the first communication terminal, and generating a social graph that indicates a relationship between the user of the first communication terminal and the user of the second communication terminal.

To solve the problem, according to another embodiment of the present disclosure, there is provided a program for causing a computer to function as an information acquisition unit that acquires, from another communication terminal, first information that includes connection information for connecting to a communication service and identification information of a user of the other communication terminal, and an information generation unit that, on the basis of the first information acquired by the information acquisition unit, generates second information that includes the connection information and identification information of a user of the current terminal.

To solve the problem, according to another embodiment of the present disclosure, there is provided a communication system including a communication terminal and an information processing device. The communication terminal includes an information acquisition unit that acquires, from another communication terminal, first information that includes connection information for connecting to a communication service and identification information of a user of the other communication terminal, and an information generation unit that, on the basis of the first information acquired by the information acquisition unit, generates second information that includes the connection information and identification information of a user of the current terminal. The information processing device includes a receiving unit that receives, from the communication terminal, the identification information of the user of the other communication terminal and identification information of a user of the communication terminal, and a graph generation unit that generates a social graph that indicates a relationship between the user of the other communication terminal and the user of the communication terminal.

Advantageous Effects of Invention

According to the present disclosure as described above, it is possible to support the clear indication of individual transmission histories of information in association with users.

BRIEF DESCRIPTION OF DRAWINGS

FIG. 6 is an explanatory diagram illustrating an example of a configuration of a playlist according to the same embodiment.

FIG. 15 is an explanatory diagram illustrating an example of a configuration of a playlist table according to the same modification.

FIG. 16 is an explanatory diagram illustrating an example of a configuration of an image table according to the same modification.

FIG. 21 is an explanatory diagram illustrating an example of a configuration of data managed by a music selling service according to the same modification.

FIG. 26 is an explanatory diagram illustrating an example of a configuration of an appearance level table according to the same embodiment.

FIG. 28 is an explanatory diagram illustrating an example of a method of evaluating a captured image group according to the same embodiment.

FIG. 33 is an explanatory diagram illustrating an example of a configuration of a propagation information table according to the same embodiment.

FIG. 41 is an explanatory diagram illustrating an example of a configuration of a content sharing list according to the same embodiment.

FIG. 42 is a sequence diagram illustrating operation during a content sharing service according to the same embodiment.

FIG. 43 is a sequence diagram illustrating operation after a content sharing service according to the same embodiment.

DESCRIPTION OF EMBODIMENTS

Figure 1:
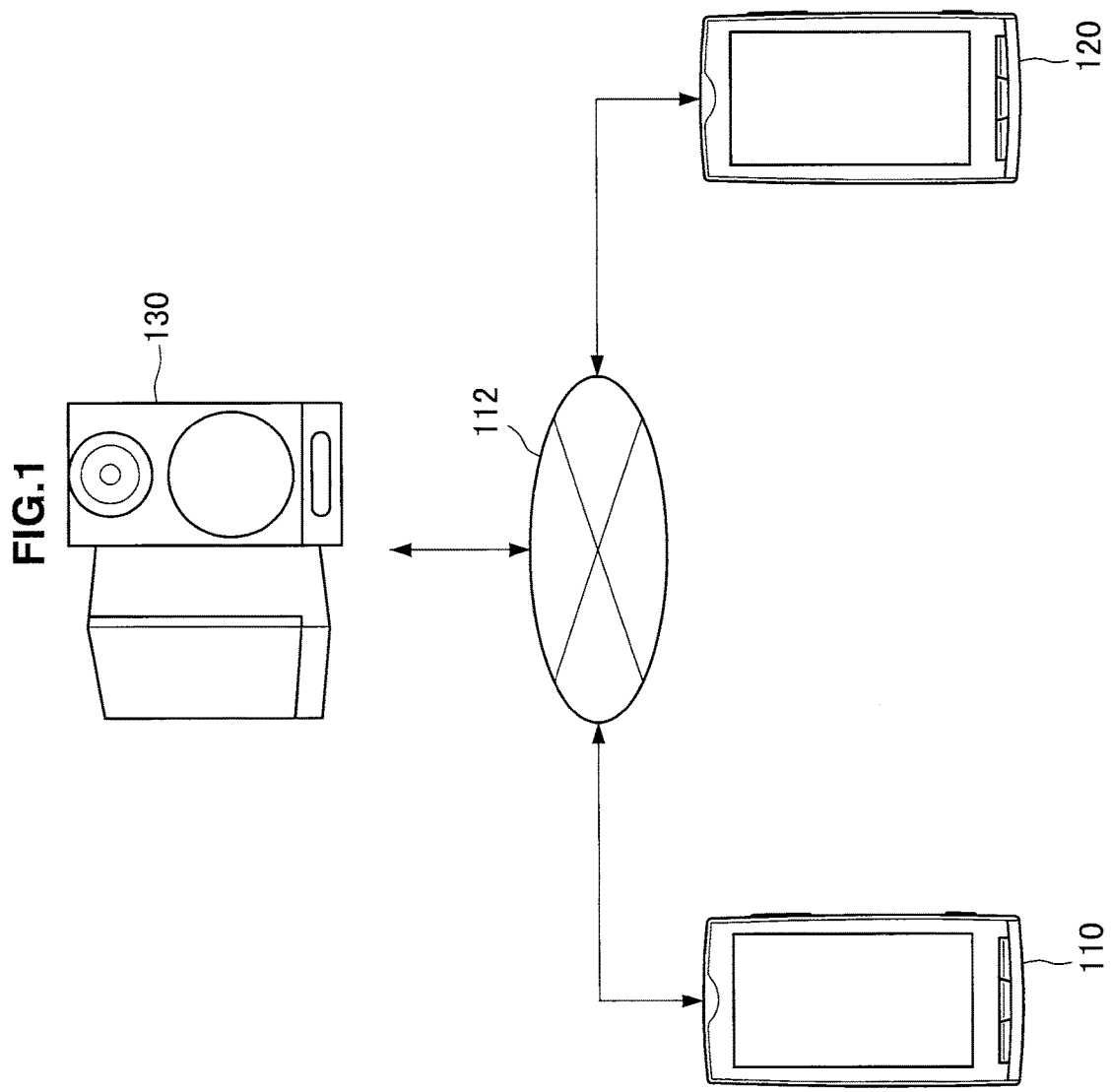
FIG. 1 is an explanatory diagram illustrating a configuration of a communication system according to the first embodiment of the present disclosure.

Hereinafter, preferred embodiments of the present disclosure will be described in detail and with reference to the attached drawings. The present disclosure may be carried out in various embodiments, examples of which are described in detail from sections (1. Detailed description of first embodiment) to (4. Detailed description of fourth embodiment). In addition, the detailed description of the embodiments in this section will be given in the order indicated below.

1. Detailed description of first embodiment
1-1. First embodiment
1-2. First modification of first embodiment
1-3. Second modification of first embodiment
2. Detailed description of second embodiment
2-1. Basic configuration of image processing system
2-2. Overview of second embodiment
2-3. Configuration according to second embodiment
2-4. Operation according to second embodiment
2-5. Advantageous effects according to second embodiment
3. Detailed description of third embodiment
3-1. Basic configuration of communication system
3-2. Overview of third embodiment
3-3. Configuration according to third embodiment
3-4. Operation according to third embodiment
3-5. Advantageous effects according to third embodiment
4. Detailed description of fourth embodiment
4-1. Basic configuration of communication system
4-2. Overview of fourth embodiment
4-3. Configuration according to fourth embodiment
4-4. Operation according to fourth embodiment
4-5. Advantageous effects according to fourth embodiment Note that, in this specification and the appended drawings, structural elements that have substantially the same function and structure are denoted with the same reference numerals, and repeated explanation of these structural elements is omitted.

Also, in this specification and the appended drawings, multiple structural elements having substantially the same function and structure may in some cases be distinguished by different letters appended to the same sign. For example, multiple elements having substantially the same function and structure are distinguished as the communication terminal 310a, the communication terminal 310b, the communication terminal 310c, and so on as necessary. On the other hand, when not particularly distinguishing each of multiple structural elements having substantially the same function and structure, only the same sign will be given. For example, the communication terminal 310a, the communication terminal 310b, and the communication terminal 310c will be simply designated the communication terminal 310 when not being particularly distinguished.

<1. Detailed Description of First Embodiment>
[1-1. First Embodiment]

First, a problem that the first embodiment attempts to solve will be described. In the past, there has been developed technology that acts as a method of playing back background music (BGM) at a place where many people gather, such as a party venue, for example, including (A) technology in which a subset of the participants, such as the party organizer or a disc jockey (DJ) select and play back music, and (B) technology that automatically plays music continuously using a wired broadcast, subscription service, or the like. However, the above technologies of (A) and (B) have the following drawbacks. For example, not all of the participants are able to select music on the spot, not all of the participants are able to play back or change music at arbitrary timings, and in addition, not all participants are able to search, listen to, and purchase the music that was played at the party venue or the like after the party ends, for example.

In addition, the technologies described in JP 2012-133735A and JP 2012-064151A are unable to adequately support joint activity by the users of multiple communication terminals. For example, in the case of wanting to collectively enjoy the playback of content in a place where many people gather, such as at a party venue, it is desirable for an arbitrary participant to be able to select the content to play back on the spot, but this cannot be realized with the above technologies. In addition, an arbitrary participant is unable to easily change the content to play back at an arbitrary timing.

Thus, focusing on the above circumstances led to the creation of a first communication terminal 110 according to the first embodiment. The first communication terminal 110 according to the first embodiment is able to support joint activity by the users of multiple communication terminals.

Such a first communication terminal 110 (communication terminal) according to the first embodiment is provided with:

A. a communication unit 1100 (acquisition unit) that acquires, from a second communication terminal 120 (other communication terminal), meta-information associated with content stored in the second communication terminal 120; and B. a playlist management unit 1102 that manages a playlist which is shared with the second communication terminal 120 and which is for playing back content corresponding to the meta-information acquired from the second communication terminal 120.

In addition, a second communication terminal 120 according to the first embodiment is provided with:

C. a storage unit 1202 that stores one or more pieces of content;

D. a communication unit 1200 (transmitting unit) that transmits meta-information associated with content stored in the storage unit 1202 to the first communication terminal 110 (other communication terminal);

E. a communication unit 1200 (receiving unit) that receives, from the first communication terminal 110, a playlist which is shared with the first communication terminal 110 and which is for playing back content corresponding to the meta-information; and F. a display unit 1204 that displays a playlist screen based on the playlist.

(1-1-1. Basic Configuration of Communication System)

Hereinafter, first, a basic configuration of such a communication system according to the first embodiment will be described with reference to FIG. 1. As illustrated in FIG. 1, the communication system according to the first embodiment includes a first communication terminal 110, a communication network 112, a second communication terminal 120, and a playback device 130.

—First Communication Terminal 110—

The first communication terminal 110 is a communication terminal connectable to the communication network 112 discussed later. The first communication terminal 110 may be a mobile phone such as a smartphone, a tablet, a personal digital assistant (PDA), a digital still camera, a digital video camera, or a game console, for example.

Figure 2:
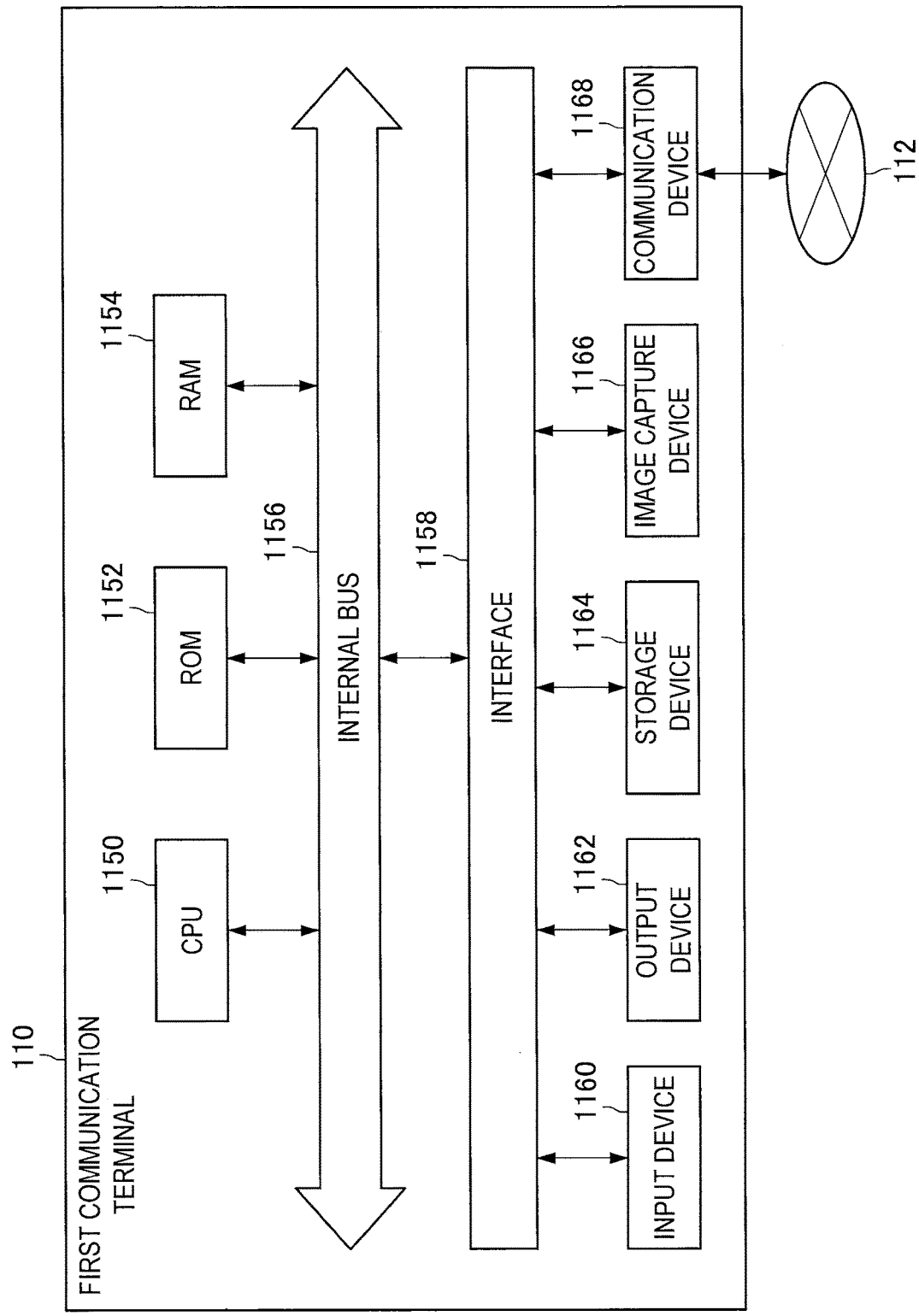
FIG. 2 is an explanatory diagram illustrating a hardware configuration of a first communication terminal according to the same embodiment.

The first communication terminal 110 has a hardware configuration as illustrated in FIG. 2, for example. As illustrated in FIG. 2, the first communication terminal 110 is equipped with a central processing unit (CPU) 1150, read-only memory (ROM) 1152, random access memory (RAM) 1154, an internal bus 1156, an interface 1158, an input device 1160, an output device 1162, a storage device 1164, an image capture device 1166, and a communication device 1168.

The CPU 1150 is realized as an example of the playlist management unit 1102 and the playback control unit 1110 of the first communication terminal 110 discussed later, for example. The CPU 1150 functions as a computational processing device and control device, and controls overall operation inside the first communication terminal 110 by following various programs. The CPU 1150 may be a microprocessor.

The ROM 1152 stores information such as programs and computational parameters used by the CPU 1150. In addition, the RAM 1154 temporarily stores information such as programs used during execution by the CPU 1150, and parameters that change as appropriate during such execution. The CPU 1150, the ROM 1152, and the RAM 1154 are interconnected by the internal bus 1156 realized as a CPU bus or the like.

The interface 1158 connects the input device 1160, the output device 1162, the storage device 1164, the image capture device 1166, and the communication device 1168 to the internal bus 1156. For example, the input device 1160 exchanges data with the CPU 1150 and the like via the interface 1158 and the internal bus 1156.

The input device 1160 is made up of an input means by which a user inputs information, such as a touch panel, a button, a microphone, or a switch, for example, and an input control circuit that generates an input signal on the basis of input from the user, and outputs to the CPU 1150. By operating the input device 1160, a user of the first communication terminal 110 is able to input various data and instruct the first communication terminal 110 to perform processing operations, for example.

The output device 1162 includes a display device such as a liquid crystal display (LCD) device, an organic light-emitting diode (OLED) device, or indicator light, for example. Additionally, the output device 1162 includes an audio output device such as a speaker or headphones. For example, the display device displays captured images, generated images, and the like. Meanwhile, the audio output device converts audio data or the like into sound, and outputs the sound.

The storage device 1164 is a device used for data storage, realized as an example of the storage unit 1104 of the first communication terminal 110 discussed later, for example. The storage device 1164 may include a storage medium, a recording device that records data to the storage medium, a readout device that reads out data from the storage medium, a deletion device that deletes data recorded to the storage medium, and the like. The storage device 1164 stores programs executed by the CPU 1150 and various data.

The image capture device 1166 is realized as an example of the image capture unit 1116 of the first communication terminal 110 discussed later, for example. The image capture device 1166 includes a lens and an image sensor such as a charge-coupled device (CCD) or a complementary metal-oxide-semiconductor (CMOS) sensor, for example. The image capture device 1166 has a function of forming an external image on the image sensor through the lens, and capturing a still image or a moving image.

The communication device 1168 is a communication interface realized by a communication device or the like that connects to the communication network 112 discussed later, for example. The communication device 1168 is realized as an example of the communication unit 1100 of the first communication terminal 110 discussed later, for example. Also, the communication device 1168 may be a communication device supporting wireless LAN, or a communication device supporting Long Term Evolution (LTE).

Note that the hardware configuration of the first communication terminal 110 is not limited to the foregoing configuration. For example, although not illustrated in FIG. 2, the first communication terminal 110 may also include a Global Positioning System (GPS) receiver function, a clock function, an acceleration sensor, a gyroscope, a barometric sensor, a geomagnetic sensor, and the like.

—Communication Network 112—

The communication network 112 is a wired or wireless transmission channel for information transmitted from a device connected to the communication network 112. For example, the communication network 112 may encompass a public network such as the Internet, a telephone network, or a satellite communication network, and various local area networks (LANs) or wide area networks (WANs) including Ethernet (registered trademark). Additionally, the communication network 112 may also encompass a dedicated network such as an Internet Protocol virtual private network (IP-VPN).

—Second Communication Terminal 120—

The second communication terminal 120 is a communication terminal connectable to the communication network 112. The second communication terminal 120, similarly to the first communication terminal 110, may be a mobile phone such as a smartphone, a tablet, a PDA, a digital still camera, a digital video camera, or a game console, for example. In addition, the second communication terminal 120 may also have a hardware configuration similar to the first communication terminal 110 discussed earlier.

—Playback Device 130—

The playback device 130 is a device that supports Digital Living Network Alliance (DLNA), for example, and plays back content such as music and video. The playback device 130 includes an audio output device such as a speaker, for example. The playback device 130 may also include a display device such as a liquid crystal display (LCD) device or an OLED device, for example.

(1-1-2. Overview of First Embodiment)

The above thus describes a basic configuration of a communication system according to the first embodiment. Next, an overview of the first embodiment made up of the communication system discussed above will be described with reference to FIG. 3.

Herein, an example of applying the first embodiment to a situation in which a user possessing the first communication terminal 110 and multiple users possessing the second communication terminal 120 gather at a facility such as a party venue, and collectively enjoy content played back by the playback device 130, will be described as an example.

Figure 3:
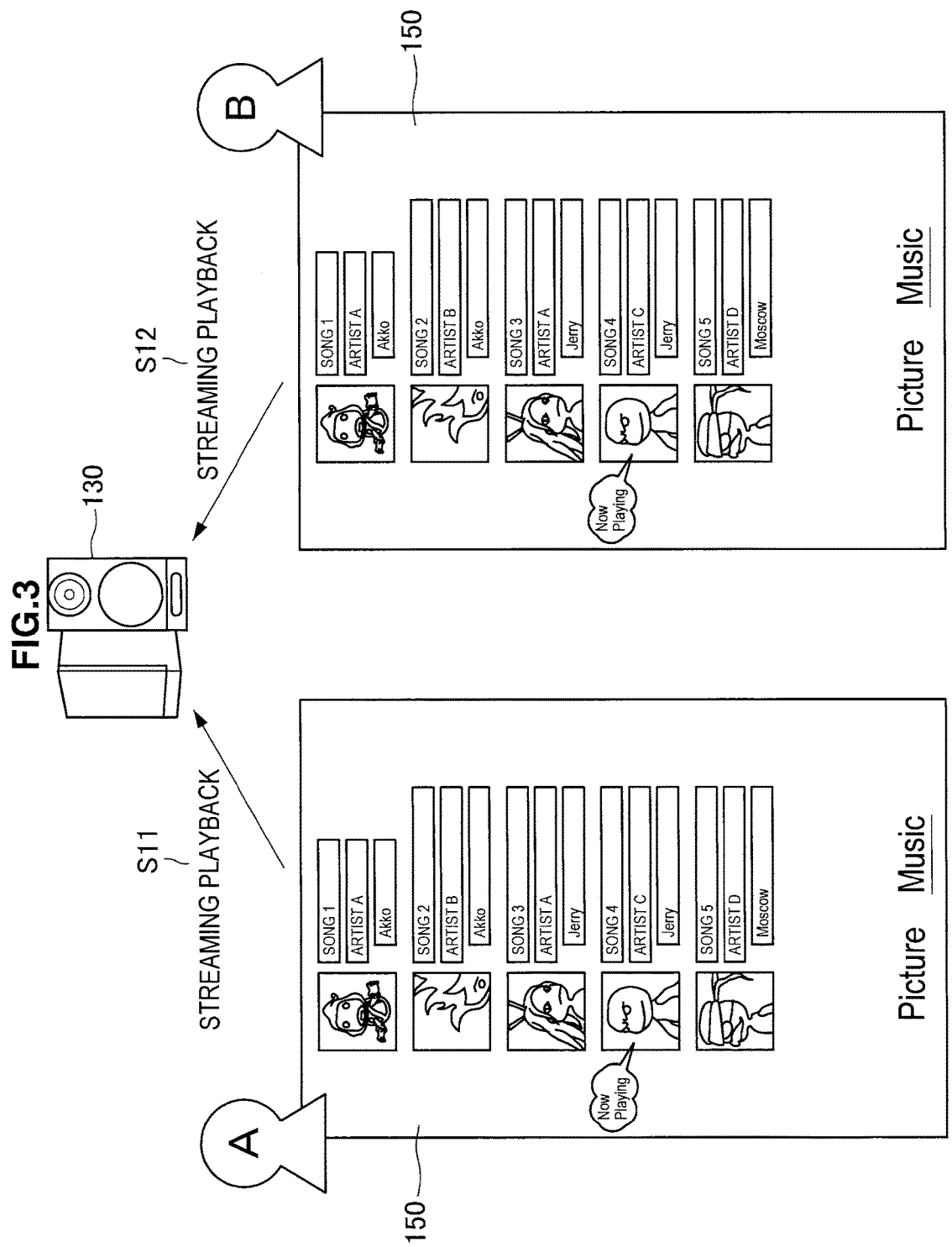
FIG. 3 is an explanatory diagram illustrating an overview of the same embodiment.

As illustrated in FIG. 3, the present example presupposes a situation in which the first communication terminal 110 and the second communication terminal 120 are able to share and display the same playlist screen 150. Also, a playlist that forms the basis of the playlist screen 150 is managed by the first communication terminal 110, and in addition, is shared between the first communication terminal 110 and the second communication terminal 120.

On the playlist screen 150, a user of the first communication terminal 110 or a user of the second communication terminal 120 are able to submit content stored in the user's own terminal as playback content at respectively arbitrary timings. For example, if a user of the second communication terminal 120 adds content stored in the user's own terminal to the playlist screen, the first communication terminal 110 acquires meta-information such as a content name and an artist name associated with the relevant content from the second communication terminal 120. Subsequently, the first communication terminal 110 adds the relevant meta-information to the playlist, and updates the relevant playlist.

In addition, content submitted to the playlist screen is played back in the registered order on the playlist, such as by being transmitted in a streaming format from the communication terminal where the relevant content is stored to the playback device 130, for example (S11, S12).

As discussed earlier, according to the first embodiment, the first communication terminal 110 acquires, from the second communication terminal 120, meta-information associated with content stored in the second communication terminal 120. Additionally, the first communication terminal 110 manages a playlist which is shared with the second communication terminal 120 and which is for playing back content corresponding to the meta-information acquired from the second communication terminal 120. For this reason, by receiving an instruction from the second communication terminal 120 and updating the relevant playlist, the first communication terminal 110 is able to appropriately control the type of content to play back as well as the playback timing. Consequently, the first communication terminal 110 is able to support joint activity by the first communication terminal 110 and the (one or more) second communication terminal 120.

(1-1-3. Configuration According to First Embodiment)
(1-1-3-1. First Communication Terminal 110)

The foregoing thus describes an overview of the first embodiment. Next, a configuration according to the first embodiment will be described in detail.

Figure 4:
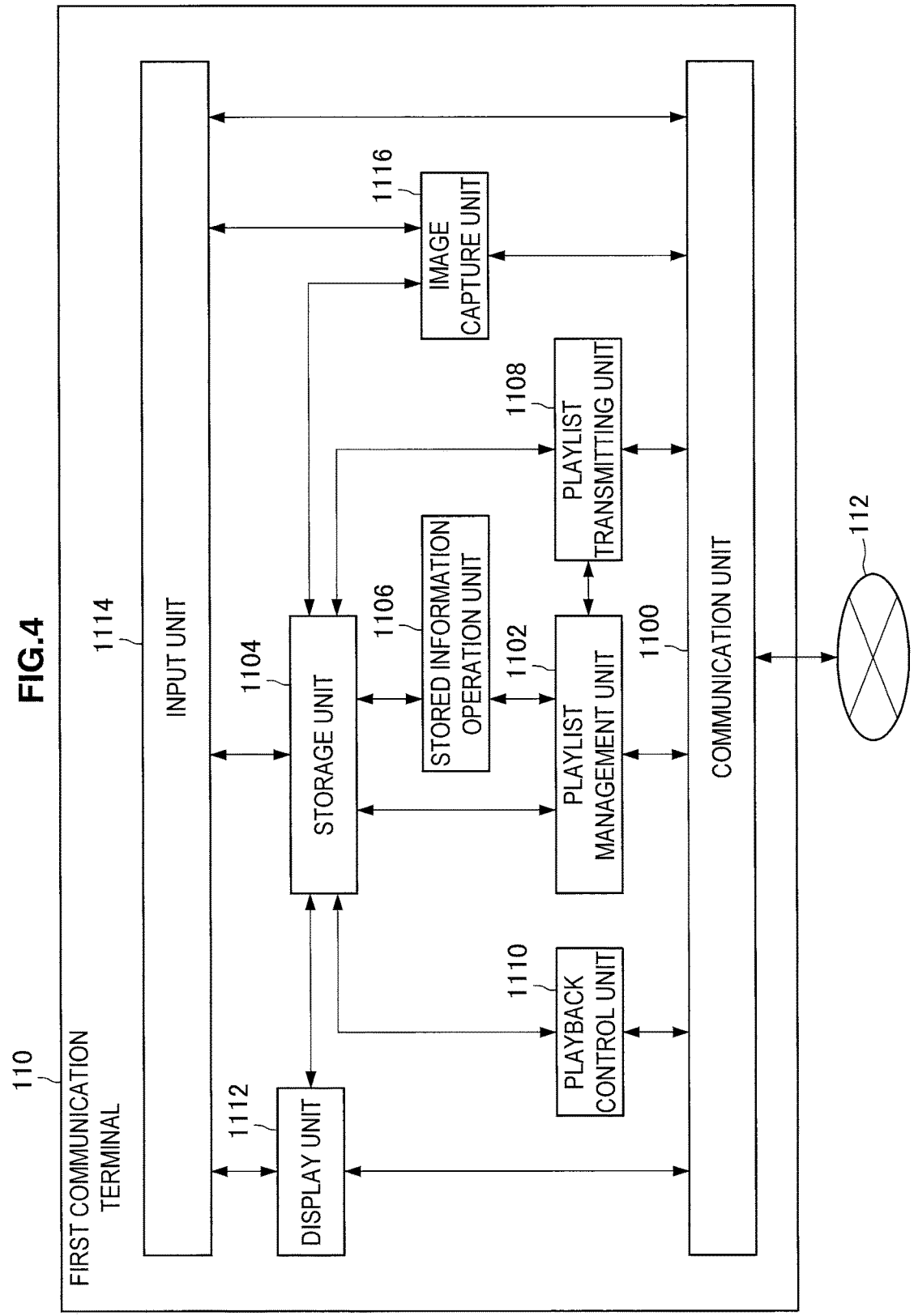
FIG. 4 is a function block diagram illustrating a configuration of a first communication terminal according to the same embodiment.

FIG. 4 is a function block diagram illustrating a configuration of the first communication terminal 110 according to the first embodiment. As illustrated in FIG. 4, the first communication terminal 110 according to the first embodiment includes a communication unit 1100 (acquisition unit), a playlist management unit 1102, a storage unit 1104, a stored information operation unit 1106 (acquisition unit), a playlist transmitting unit 1108, a playback control unit 1110, a display unit 1112, an input unit 1114 (acquisition unit), and an image capture unit 1116.

The communication unit 1100 transmits and receives various information to and from the second communication terminal 120 or the playback device 130 via the communication network 112. For example, the communication unit 1100 receives, from the second communication terminal 120, meta-information associated with content stored in the second communication terminal 120. Also, the communication unit 1100 receives, from the second communication terminal 120, a playback change request for changing playback from the currently playing content to content corresponding to any of the meta-information recorded in the playlist. Also, the communication unit 1100, under control by the playback control unit 1110 discussed later, transmits content stored in the storage unit 1104 to the playback device 130 in a streaming format, for example. Note that the above content is music or video, for example. Also, the music is not limited to songs performed or sung by human beings, and may also be sound effects, such as the sound of applause, for example.

The playlist management unit 1102 manages a playlist which is shared with the second communication terminal 120 and which is for playing back content corresponding to meta-information acquired from the second communication terminal 120.

For example, the playlist management unit 1102 records, in a playlist, meta-information acquired by the communication unit 1100 or the stored information operation unit 1106 in association with identification information of the user corresponding to the second communication terminal 120 or the current device itself from which the relevant meta-information was acquired. Also, the playlist management unit 1102 additionally records, in a playlist, acquired meta-information in association with a playback order in which to play back content corresponding to the relevant meta-information. Also, when meta-information is acquired, the playlist management unit 1102 records the meta-information in the playlist so that the playback order in which to play back content corresponding to the relevant meta-information is at the end of the playback order recorded in the playlist. Note that the functions of the playlist management unit 1102 discussed above will be later described in detail.

At this point, an example of a configuration of a playlist (a playlist 140) will be described with reference to FIG. 6. As illustrated in FIG. 6, in the playlist 140, a meta-information (content name) column 1400, a meta-information (artist name) column 1402, an account column 1404, and a playback order column 1406 are recorded in association with each other, for example. Herein, in the account column 1404, the user whose submitted the relevant content to the playlist, or in other words, the account of the user of the second communication terminal that transmitted the meta-information to the first communication terminal 110, is recorded. Also, in the playback order column 1406, the playback order in which to play back the relevant content is recorded. For example, the data illustrated on the second row of FIG. 6 indicates that the content name is "Song 1", the artist name is "Artist A", the account name that submitted the relevant content is "Akko", and the playback order of the relevant content is "1st".

The storage unit 1104 stores information such as a playlist recorded by the playlist management unit 1102, and content or software downloaded by the user, for example.

The stored information operation unit 1106 acquires data from the storage unit 1104 or records data to the storage unit 1104, according to an instruction from the playlist management unit 1102. For example, the stored information operation unit 1106 acquires, from the storage unit 1104, meta-information associated with content stored in the storage unit 1104. In addition, the stored information operation unit 1106 causes the storage unit 1104 to store a playlist recorded by the playlist management unit 1102.

The playlist transmitting unit 1108 transmits a playlist to the second communication terminal 120. In addition, when the playlist is updated by the playlist management unit 1102, the playlist transmitting unit 1108 transmits the updated playlist to the second communication terminal 120. Note that the playlist transmitting unit 1108 may also be incorporated into the first communication terminal 110 to realize the above functions.

The playback control unit 1110, following the playback order recorded in the playlist, transmits an instruction to play back content corresponding to meta-information recorded in the playlist to the second communication terminal 120 storing the relevant content via the communication unit 1100. In addition, when the communication unit 1100 or the input unit 1114 acquires a playback change request, the playback control unit 1110 instructs the communication terminal storing the content specified by the playback change request so that playback changes from the currently playing content to the relevant specified content.

The display unit 1112 displays various display screens, such as a playlist screen, for example.

Figure 7:
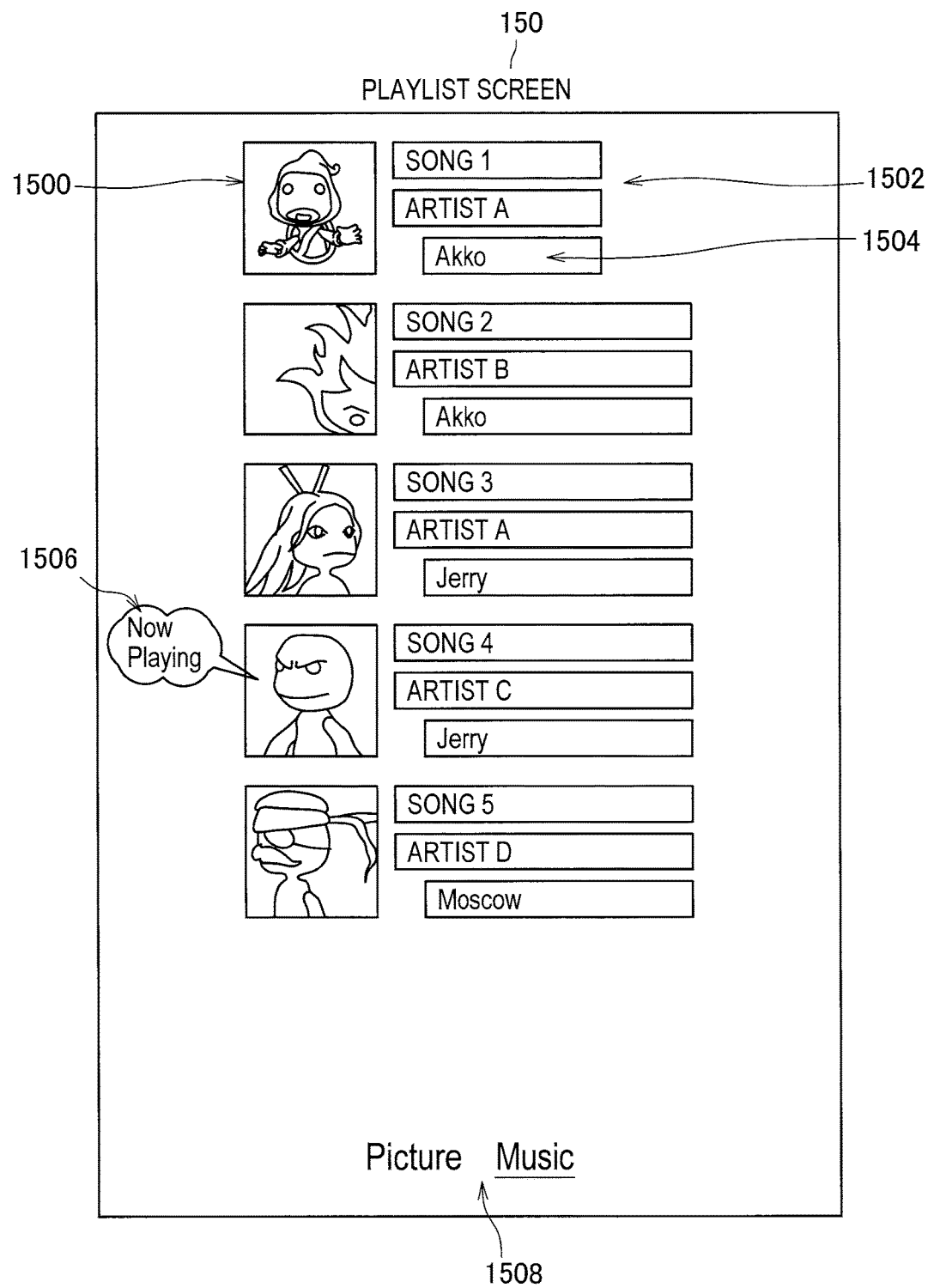
FIG. 7 is an explanatory diagram illustrating an example of a configuration of a playlist screen according to the same embodiment.

At this point, an example of a configuration of a playlist screen (a playlist screen 150) will be described with reference to FIG. 7. As illustrated in FIG. 7, the playlist screen 150 includes, for example, a thumbnail 1500 of content recorded in the playlist, a meta-information display field 1502 of the relevant content, an account field 1504 of the submitter of the relevant content, an indicator display 1506 of the currently playing content, and a display screen selection button 1508. Herein, the display unit 1112 may display in the thumbnail 1500 a thumbnail acquired from the first communication terminal 110 or the second communication terminal 120, or display a thumbnail acquired from a designated webpage on the basis of the meta-information of the relevant content. In addition, the display unit 1112 may also display, in the meta-information display field 1502 and the account field 1504, respectively corresponding items from the playlist 140 illustrated in FIG. 6, for example. In addition, the display screen selection button 1508 may be a button for toggling the display of display screens provided for different content to play back, such as a screen for pictures and a screen for music, for example.

The input unit 1114 receives various operations from the user. For example, the input unit 1114 receives the playback change request discussed earlier.

The image capture unit 1116 has a function of forming an external image on an image sensor through a lens, and capturing a still image or a moving image. For example, the image capture unit 1116 may capture a face image of the user of the first communication terminal 110.

Note that, according to the first embodiment, it is also possible to provide a computer program causing hardware such as the CPU 1150, ROM 1152, and RAM 1154 built into the first communication terminal 110 to exhibit the same functionality as the respective components of the first communication terminal 110 discussed above. Also, a storage medium having such a computer program stored therein is also provided.

The above thus describes a configuration of the first communication terminal 110 according to the first embodiment, but the configuration is not limited to the configuration discussed above. For example, the image capture unit 1116 may not be included. Also, one or more of any of the storage unit 1104, the stored information operation unit 1106, the display unit 1112, the input unit 1114, and the image capture unit 1116 may be provided in another device.

(1-1-3-2. Second Communication Terminal 120)

Figure 5:
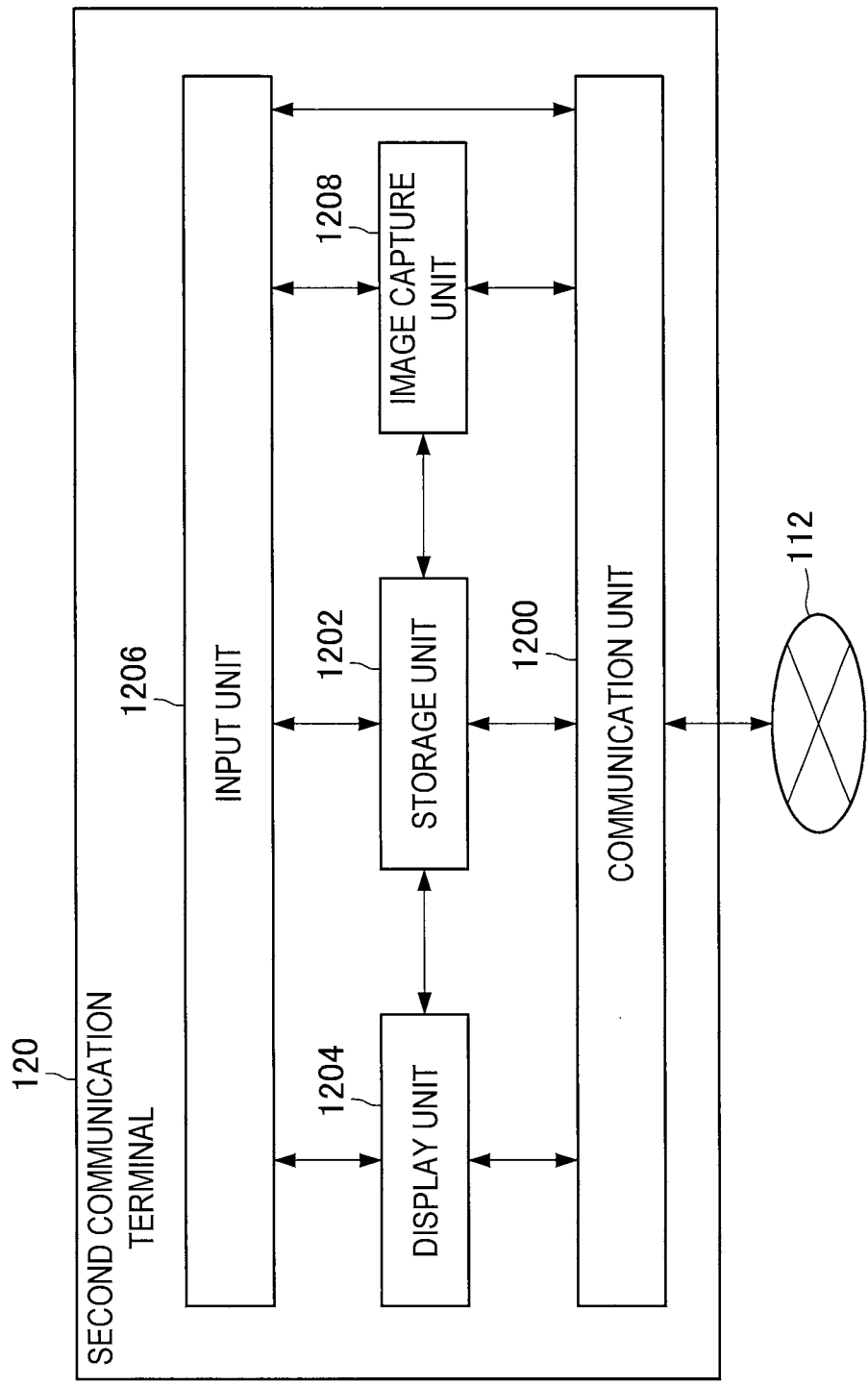
FIG. 5 is a function block diagram illustrating a configuration of a second communication terminal according to the same embodiment.

Also, as illustrated in FIG. 5, the second communication terminal 120 according to the first embodiment includes a communication unit 1200 (transmitting unit, receiving unit), a storage unit 1202, a display unit 1204, an input unit 1206, and an image capture unit 1208.

The communication unit 1200 transmits and receives various information to and from the first communication terminal 110 or the playback device 130 via the communication network 112. For example, the communication unit 1200 transmits meta-information associated with content stored in the storage unit 1202 discussed later to the first communication terminal, or receives a playlist from the first communication terminal 110.

The storage unit 1202 stores information such as a playlist received from the first communication terminal 110, and content or software downloaded by the user, for example.

The display unit 1204 displays various display screens, such as a playlist screen, for example.

The input unit 1206 receives various operations from the user. For example, the input unit 1206 receives the playback change request discussed earlier.

The image capture unit 1208 has a similar function as the image capture unit 1116 in the first communication terminal 110.

(1-1-4. Operation According to First Embodiment)

(1-1-4-1. Operation from App Launch to Content Playback)

Figure 8:
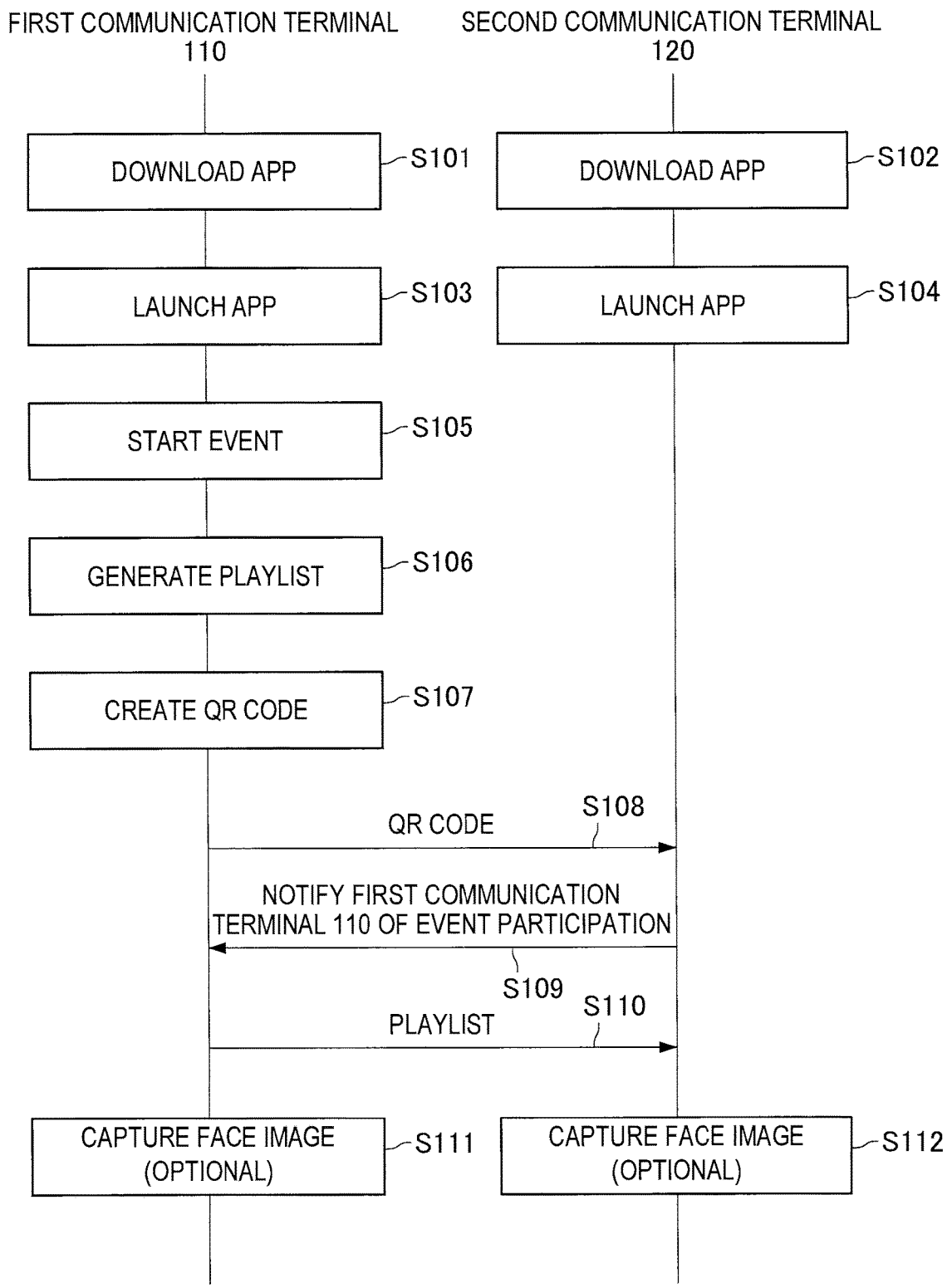
FIG. 8 is a first sequence diagram illustrating operation from app launch to content playback according to the same embodiment.

The above thus describes a configuration according to the first embodiment. Next, operation according to the first embodiment will be described. First, operation from app launch to content playback according to the first embodiment will be described. FIG. 8 is a first sequence diagram illustrating operation from app launch to content playback according to the first embodiment.

As illustrated in FIG. 8, first, the user of the first communication terminal 110 downloads an application for using the communication system according to the first embodiment from a designated Uniform Resource Locator (URL). Subsequently, the storage unit 1104 stores the relevant application (S101). Next, the relevant application launches in response to a user operation on the input unit 1114 (S103).

Similarly, the user of the second communication terminal 120 downloads the relevant application from a designated URL. Subsequently, the storage unit 1202 stores the relevant application (S102). Next, the relevant application launches in response to a user operation on the input unit 1206 (S104).

After that, as a result of the user operating the relevant application via the input unit 1114, the first communication terminal 110 starts a certain event for playing back content on the relevant communication system (S105).

Note that although the above describes an example in which the first communication terminal 110 starts an event using an application downloaded from a designated URL, the present disclosure is not limited to such an example. For example, the first communication terminal 110 may access a designated web server in the relevant communication system, and start an event on a web page provided by the relevant web server.

Next, the playlist management unit 1102 generates a playlist corresponding to the relevant event (S106).

Next, the first communication terminal 110 generates a QR code (registered trademark) including an URL, for example, for making use of the relevant event (S107).

Next, the display unit 1112 displays the generated QR code (registered trademark). In addition, in response to a user operation on the input unit 1206, the image capture unit 1208 of the second communication terminal 120 reads the relevant QR code (registered trademark) displayed on the first communication terminal 110 (S108).

Next, in response to a user operation on the input unit 1206, the URL included in the relevant QR code (registered trademark) is accessed, and a notification of event participation is transmitted to the first communication terminal 110 (S109).

After the first communication terminal 110 receives the notification of event participation, the playlist transmitting unit 1108 transmits the playlist generated in S106 to the second communication terminal 120 via the communication unit 1100 (S110).

Next, in response to a user operation on the input unit 1114, the image capture unit 1116 captures a face image of the user of the first communication terminal 110 (S111). Similarly, in response to a user operation on the input unit 1206, the image capture unit 1208 captures a face image of the user of the second communication terminal 120 (S112). Note that the face images captured in S111 and S112 are used to display the relevant users on a playlist screen, for example. In addition, the operation in S111 or S112 may also be omitted.

Similarly, in response to a user operation on the input unit 1206, the image capture unit 1208 captures a face image of the user of the second communication terminal 120 (S112). Note that the operation in S112 may also be omitted.

—Operation of Updating Playlist with Meta-Information Stored in Second Communication Terminal 120—

Figure 9:
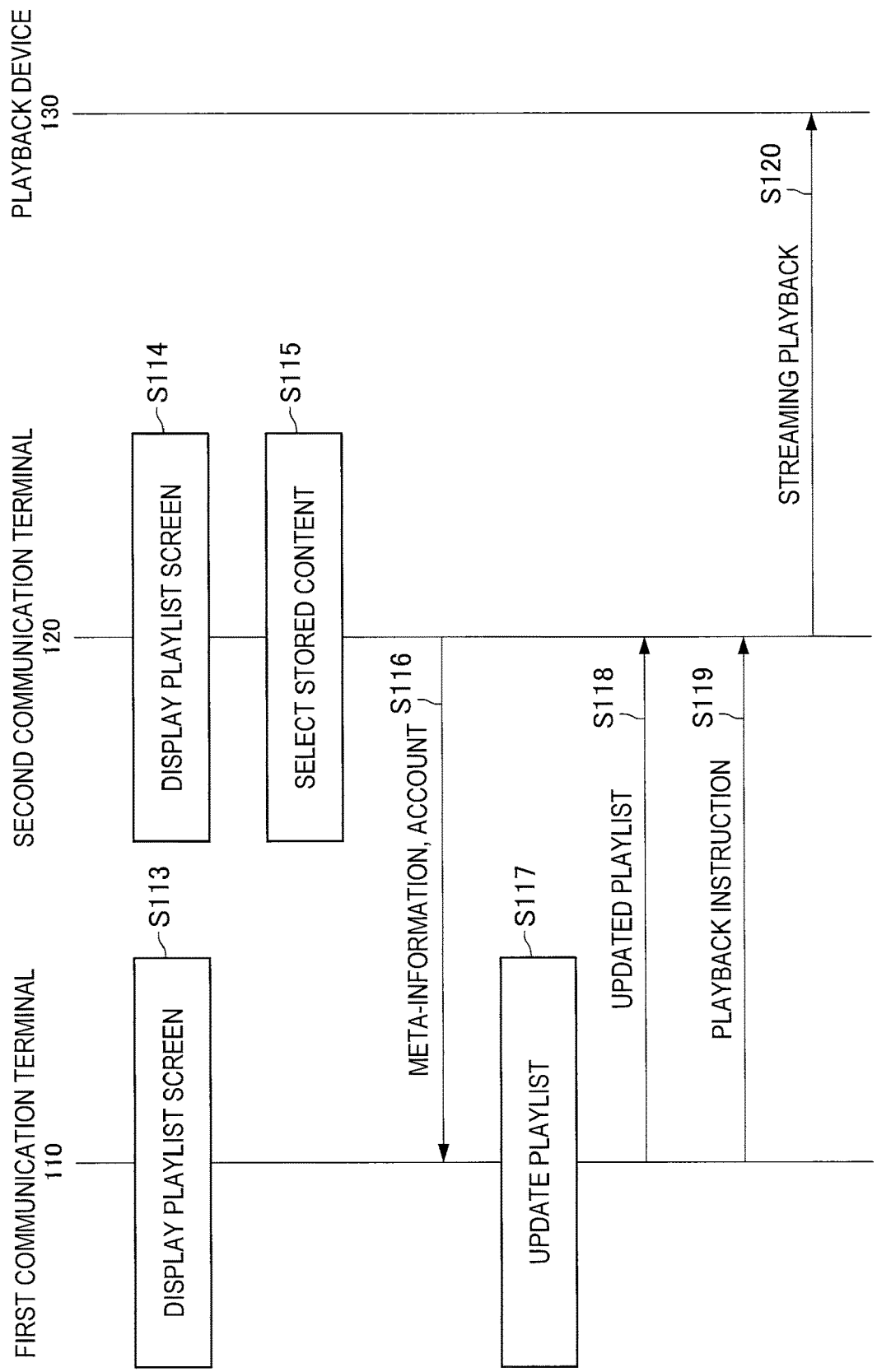
FIG. 9 is a second sequence diagram illustrating operation from app launch to content playback according to the same embodiment.

FIG. 9 is a first sequence diagram for describing operation after S112. FIG. 9 illustrates operation in which the first communication terminal 110 receives meta-information of content stored in the second communication terminal 120 from the second communication terminal 120, and records the relevant meta-information in a playlist. Note that for the sake of convenience, even if multiple second communication terminals 120 exist, the following description will focus on an arbitrary one from among the multiple second communication terminals 120.

As illustrated in FIG. 9, after S112, the display unit 1112 of the first communication terminal 110 uses the relevant application to display a playlist screen based on the playlist (S113). Similarly, the display unit 1204 of the second communication terminal 120 uses the relevant application to display a playlist screen based on the playlist (S114).

Next, the user of the second communication terminal 120 operates the input unit 1206 to select desired content to be played back on the playback device 130 from among content stored in the storage unit 1202 (S115).

Next, the communication unit 1200 transmits meta-information corresponding to the selected content, and the account of the user of the second communication terminal 120, to the first communication terminal 110 (S116).

Next, the playlist management unit 1102 of the first communication terminal 110 records, in the playlist, the meta-information and the account received from the second communication terminal 120 in association with each other. Also, the playlist management unit 1102 may additionally record, in the playlist, the relevant meta-information in association with a playback order in which to play back the content corresponding to the relevant meta-information. Also, the playlist management unit 1102 may record the relevant meta-information in the playlist so that the playback order in which to play back the content corresponding to the relevant meta-information is at the end of the playback order recorded in the playlist. Next, the stored information operation unit 1106 causes the storage unit 1104 to store the updated playlist (S117).

Next, the playlist transmitting unit 1108 transmits the updated playlist to all second communication terminals 120 via the communication unit 1100 (S118). Note that the operation from S115 to S118 may be repeated multiple times.

Next, the playback control unit 1110, following the playback order recorded in the playlist, transmits an instruction to play back content corresponding to meta-information recorded in the playlist to the second communication terminal 120 storing the respective content via the communication unit 1100 (S119).

When the second communication terminal 120 receives the relevant playback instruction, the communication unit 1200 of the second communication terminal 120 transmits the relevant content stored in the storage unit 1202 to the playback device 130 in a streaming format, for example. Subsequently, the playback device 130 plays back the received content (S120).

—Operation of Updating Playlist with Meta-Information Stored in First Communication Terminal 110—

Figure 10:
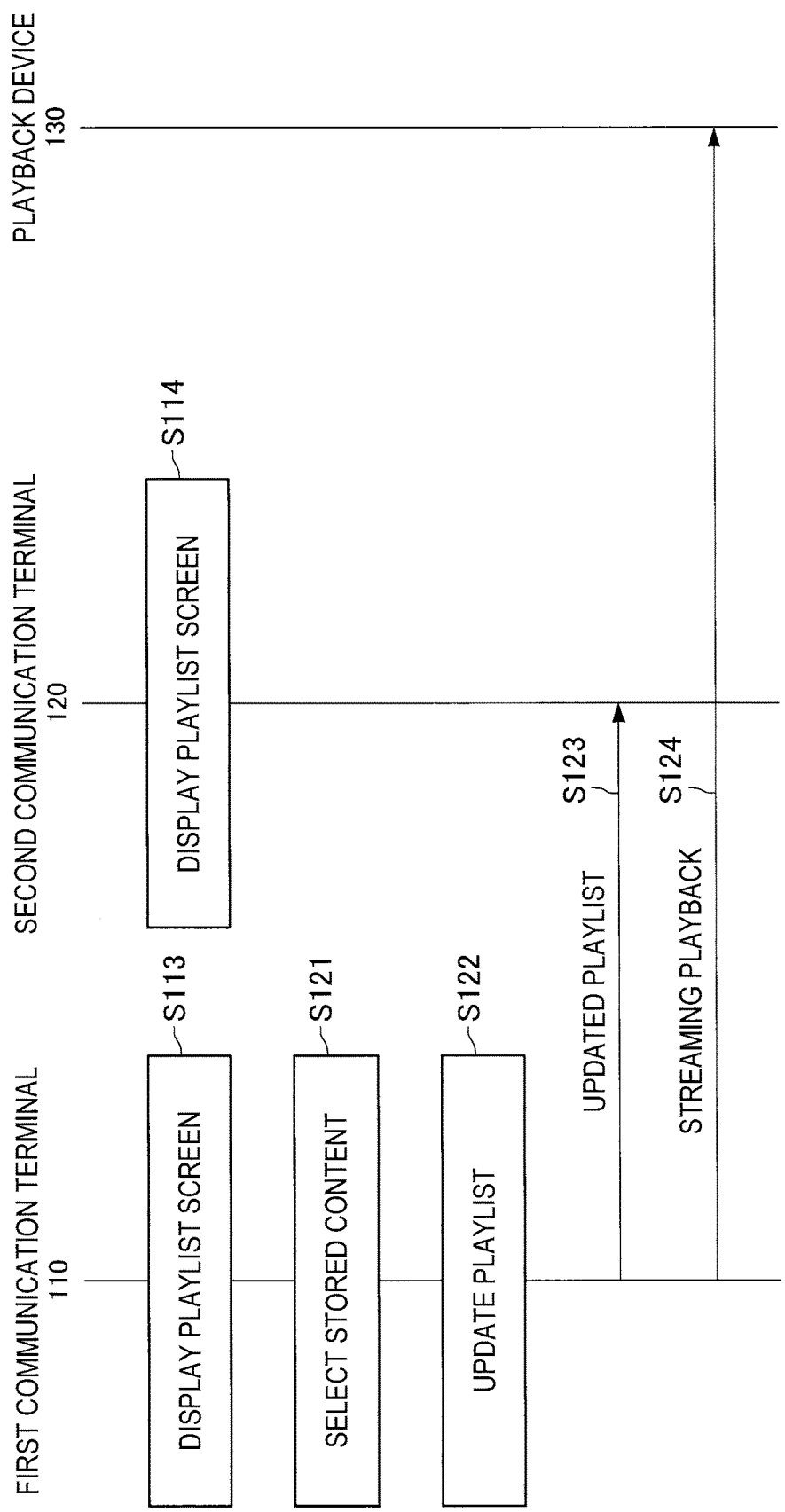
FIG. 10 is a third sequence diagram illustrating operation from app launch to content playback according to the same embodiment.

FIG. 10 is a second sequence diagram for describing operation after S112. FIG. 10 illustrates operation in which the first communication terminal 110 records meta-information of content stored in the first communication terminal 110 in a playlist.

As illustrated in FIG. 10, immediately after S112, the first communication terminal 110 and the second communication terminal 120 use the relevant application to display a playlist screen, similarly to S113 and S114 in FIG. 9 (S113, S114).

Next, the user of the first communication terminal 110 operates the input unit 1114 to select desired content to be played back on the playback device 130 from among content stored in the storage unit 1104 (S121).

Next, the playlist management unit 1102 records, in the playlist, meta-information corresponding to the selected content in association with the account of the user of the first communication terminal 110. Also, the playlist management unit 1102 may additionally record, in the playlist, the relevant meta-information in association with a playback order in which to play back the content corresponding to the relevant meta-information. Also, the playlist management unit 1102 may record the relevant meta-information in the playlist so that the playback order in which to play back the content corresponding to the relevant meta-information is at the end of the playback order recorded in the playlist. Next, the stored information operation unit 1106 causes the storage unit 1104 to store the updated playlist (S122).

Next, the playlist transmitting unit 1108 transmits the updated playlist to all second communication terminals 120 via the communication unit 1100 (S123). Note that the operation from S121 to S123 may be repeated multiple times.

Next, the playback control unit 1110, following the playback order recorded in the playlist, transmits the content corresponding to the meta-information recorded in the playlist and stored in the storage unit 1104 to the playback device 130 in a streaming format, for example, via the communication unit 1100. Subsequently, the playback device 130 plays back the received content (S124).

The above thus describes operation after S112 with reference to FIGS. 9 and 10, but operation is not limited to the operation discussed above. For example, the operation from S115 to S117 in FIG. 9 and the operation from S121 to S123 in FIG. 10 may also be combined, or processed in parallel.

(1-1-4-2. Operation of Changing Playback Content)

—Operation of Changing Playback Content According to Request from Second Communication Terminal 120*a*—

Figure 11:
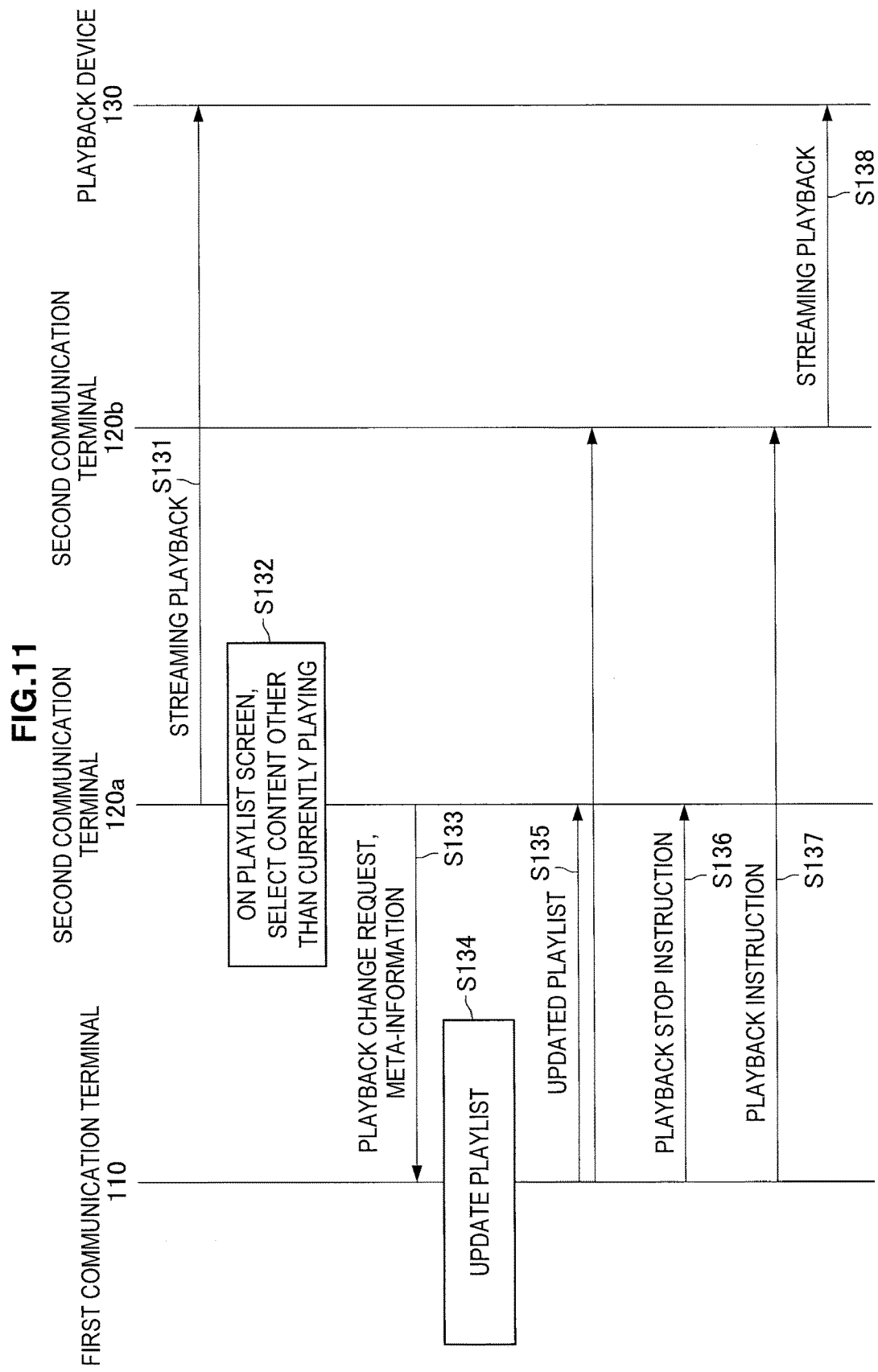
FIG. 11 is a first sequence diagram illustrating operation of changing playback content according to the same embodiment.

Next, operation of changing playback content according to the first embodiment will be described. FIG. 11 is a first sequence diagram illustrating operation of changing playback content according to the first embodiment.

Note that FIG. 11 illustrates operation in which a second communication terminal 120*a* changes playback from content stored in the second communication terminal 120*a* to content stored in a second communication terminal 120*b*.

Also, FIG. 11 presupposes a situation in which the playback device 130 is currently playing back content transmitted from the second communication terminal 120a in a streaming format, for example (S131).

As illustrated in FIG. 11, while the playback device 130 is currently playing back certain content, the user of the second communication terminal 120a operates the input unit 1206 to select desired content to be played back on the playback device 130 from among the content displayed on the playlist screen other than the currently playing content (S132). Note that for the sake of convenience, the description herein supposes that the content selected in S132 is stored in the second communication terminal 120b.

Next, the communication unit 1200 transmits meta-information of the content selected in S132, and a playback change request for changing playback to the relevant content, to the first communication terminal 110 (S133).

Next, the playlist management unit 1102, on the basis of the playback change request received from the second communication terminal 120a, updates the playlist so that the content corresponding to the received meta-information comes first in the playback order. Note that the playlist management unit 1102 changes the playback order of the currently playing content according to a predetermined rule, such as changing the playback order to last, or to second place, for example. Next, the stored information operation unit 1106 causes the storage unit 1104 to store the updated playlist (S134).

Next, the playlist transmitting unit 1108 transmits the updated playlist to all second communication terminals 120, such as the second communication terminal 120a and the second communication terminal 120b, for example, via the communication unit 1100 (S135).

Next, the playback control unit 1110 transmits, to the second communication terminal 120 storing the currently playing content (in FIG. 11, the second communication terminal 120a) via the communication unit 1100, an instruction to stop the transmission of content to the playback device 130. Subsequently, when the second communication terminal 120a receives the relevant instruction, the communication unit 1200 of the second communication terminal 120a stops the transmission of the playing content (S136).

Next, the playback control unit 1110, on the basis of the updated playlist, transmits an instruction to play back the content with the playback order changed to first to the second communication terminal 120b storing the relevant content, via the communication unit 1100 (S137).

When the second communication terminal 120b receives the relevant playback instruction, similarly to S120 in FIG. 9, the communication unit 1200 of the second communication terminal 120b transmits the relevant content stored in the storage unit 1202 of the second communication terminal 120b to the playback device 130 in a streaming format, for example. Subsequently, the playback device 130 plays back the received content (S138).

—Operation of Changing Playback Content According to Request from First Communication Terminal 110—

Figure 12:
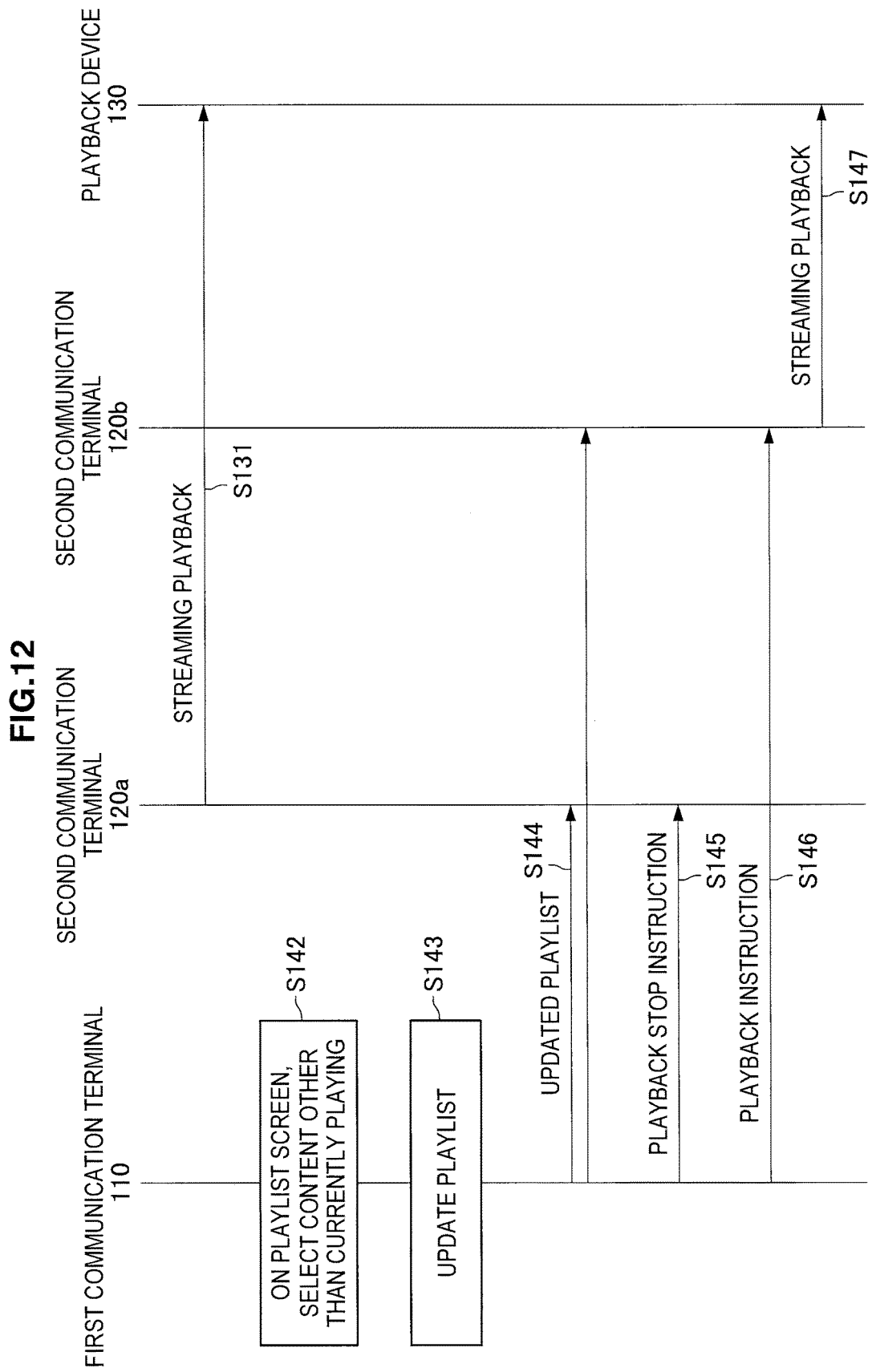
FIG. 12 is a second sequence diagram illustrating operation of changing playback content according to the same embodiment.

FIG. 12 is a second sequence diagram illustrating operation of changing playback content according to the first embodiment. Note that FIG. 12 illustrates operation in which the first communication terminal 110 changes playback from content stored in the second communication terminal 120a to content stored in the second communication terminal 120b. Also, similarly to FIG. 11, FIG. 12 presupposes a situation in which the playback device 130 is currently playing back content transmitted from the second communication terminal 120a (S131).

As illustrated in FIG. 12, while the playback device 130 is currently playing back certain content, the user of the first communication terminal 110 operates the input unit 1114 to select desired content to be played back on the playback device 130 from among the content displayed on the playlist screen other than the currently playing content (S142). Note that for the sake of convenience, the description herein supposes that the content selected in S142 is stored in the second communication terminal 120b.

Next, the playlist management unit 1102 updates the playlist so that the content specified in S142 comes first in the playback order. Next, the stored information operation unit 1106 causes the storage unit 1104 to store the updated playlist (S143).

Note that the subsequent operation (S144 to S147) is similar to S135 to S138 illustrated in FIG. 11. Consequently, description thereof is omitted herein.

The above thus describes operation of changing playback content with reference to FIGS. 11 and 12, but operation is not limited to the operation discussed above. For example, the operation from S132 to S134 in FIG. 11 and the operation from S142 to S144 in FIG. 12 may also be processed in parallel.

(1-1-5. Advantageous Effects According to First Embodiment)

As described above, according to the first embodiment, the first communication terminal 110 acquires, from the second communication terminal 120, meta-information associated with content stored in the second communication terminal 120. Additionally, the first communication terminal 110 manages a playlist which is shared with the second communication terminal 120 and which is for playing back content corresponding to the meta-information acquired from the second communication terminal 120. For this reason, by receiving a request from the second communication terminal 120 and updating the relevant playlist, the first communication terminal 110 is able to appropriately control the type of content to play back as well as the playback timing. Consequently, the first communication terminal 110 is able to support joint activity by the first communication terminal 110 and the (one or more) second communication terminal 120.

For example, at a party venue or the like, any participant from among the gather participants is able to add meta-information corresponding to content stored in the second communication terminal 120 that he or she possesses to the playlist on the spot, and thereby cause the playback device 130 to play back the relevant content. In addition, any participant is able to use the second communication terminal 120 that he or she possesses to change the playback by selecting desired content from the playlist, and thereby change the content played back on the playback device 130 at arbitrary timings. In this way, it is possible for all participants to jointly select and change the content to play back, and collectively enjoy the playback of content.

In addition, when the playlist is updated, the first communication terminal 110 transmits the updated playlist to all second communication terminals 120. For this reason, since each user of the second communication terminal 120 is always able to acquire the most up-to-date playlist, users of the second communication terminal 120 are able to share and enjoy the operation of playing back and changing content among each other in real-time.

In addition, the sharing between the first communication terminal 110 and the second communication terminal 120, and between second communication terminals 120, is only a playlist in which meta-information is recorded, while the content itself is not shared among the communication terminals. For this reason, it is possible to protect the copyright of the content.

In addition, by combining a captured image captured during the event by the first communication terminal 110 or the second communication terminal 120 with the meta-information of music and playback order of the relevant music recorded in the playlist, the user of the first communication terminal 110 is able to apply the combined information to the creation of various video. For example, the user of the first communication terminal 110 may create a video recording the circumstances of the event, a slideshow with added BGM, or the like, and share the video or the like with users of the second communication terminal 120.

In addition, the first communication terminal 110 and the second communication terminal 120 do not require special functions, and a device available to general users, such as a smartphone, for example, may be used. For this reason, there is an advantage of realizing the relevant communication system with a low-cost configuration, without using expensive devices.

[1-2. First Modification of First Embodiment]

Next, a first modification of the first embodiment will be described. According to the first modification, for example, after the end of an event that was held, participants of the relevant event are able to review information related to the circumstances of the relevant event and content that was played back at the relevant event.

(1-2-1. Basic Configuration of Communication System)

Figure 13:
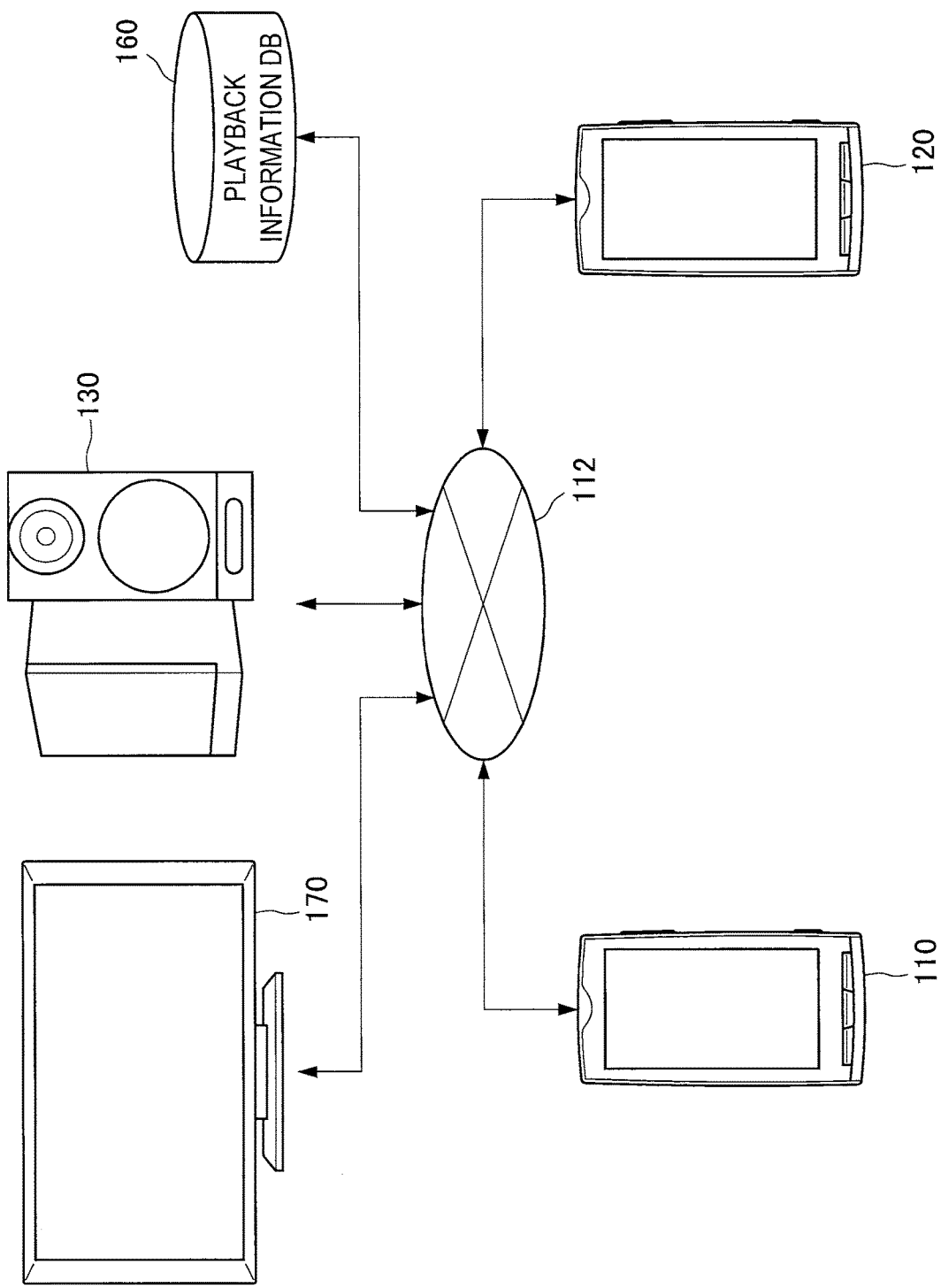
FIG. 13 is an explanatory diagram illustrating a configuration of a communication system according to a first modification of the same embodiment.

Hereinafter, first, a basic configuration of a communication system according to the first modification will be described with reference to FIG. 13. As illustrated in FIG. 13, compared to the first embodiment, a communication system according to the first modification additionally includes a playback information database 160 and a display device 170.

—Playback Information Database 160—

The playback information database 160 is a storage device for storing information such as a playlist or image file transmitted from the first communication terminal 110, or an image file transmitted from the second communication terminal 120. The playback information database 160 includes the playlist table 162 illustrated in FIG. 15 and the image table 164 illustrated in FIG. 16, for example.

At this point, an exemplary configuration of the playlist table 162 will be described with reference to FIG. 15. As illustrated in FIG. 15, in the playlist table 16, a meta-information (content name) column 1620, a meta-information (artist name) column 1622, an account column 1624, a playback date column 1626, and a playback time column 1628 are recorded in association with each other, for example. Herein, in the account column 1624, the account of the user who submitted the relevant content to the playlist is recorded, similarly to the first embodiment discussed earlier. Also, in the playback date column 1626, the date when the relevant content was played back is recorded. Also, in the playback time column 1628, the time when the relevant content was played back is recorded. For example, the data illustrated on the second row of FIG. 15 indicates that the content name is "Song 1", the artist name is "Artist A", the account name that submitted the relevant content is "Akko", the date when the relevant content was played back is "2012/10/26", and the time when the relevant content was played back is "20:05".

Next, an exemplary configuration of the image table 164 will be described with reference to FIG. 16. As illustrated in FIG. 16, in the image table 164, an image file name column 1640, an account column 1642, an email address column 1644, a capture date column 1646, and a capture time column 1648 are recorded in association with each other, for example. Herein, in the account column 1642, the account of the user who transmitted the relevant image file to the playback information database 160 is recorded. Herein, in the email address column 1644, the email address of the user who transmitted the relevant image file to the playback information database 160 is recorded. Also, in the capture date column 1646, the date when the relevant image file was captured is recorded. Also, in the capture time column 1648, the time when the relevant image file was captured is recorded. For example, the data illustrated on the second row of FIG. 16 indicates that the image file name is "Image 1", the account name of the user who transmitted the relevant image file is "Akko", the email address of the relevant user is "aa@jp.com", the date when the relevant image file was captured is "2012/10/26", and the time when the relevant image file was captured is "20:00".

—Display Device 170—

The display device 170 is a device for displaying a display screen transmitted from a device connected to the communication network 112. For example, the display device 170 is able to display an event review screen transmitted from the playback information database 160, discussed later.

At this point, an example of a configuration of an event review screen (an event review screen 180) will be described with reference to FIG. 17. The event review screen 180 displays a list of information related to content that was played back at an event venue, for example, in time slots during which a still image or a moving image was captured by an event participant. For this reason, there is an advantage in that an event participant may reference the event review screen 180 after the event ends, and more easily recall information related to content that was played back during the event.

Figure 17:
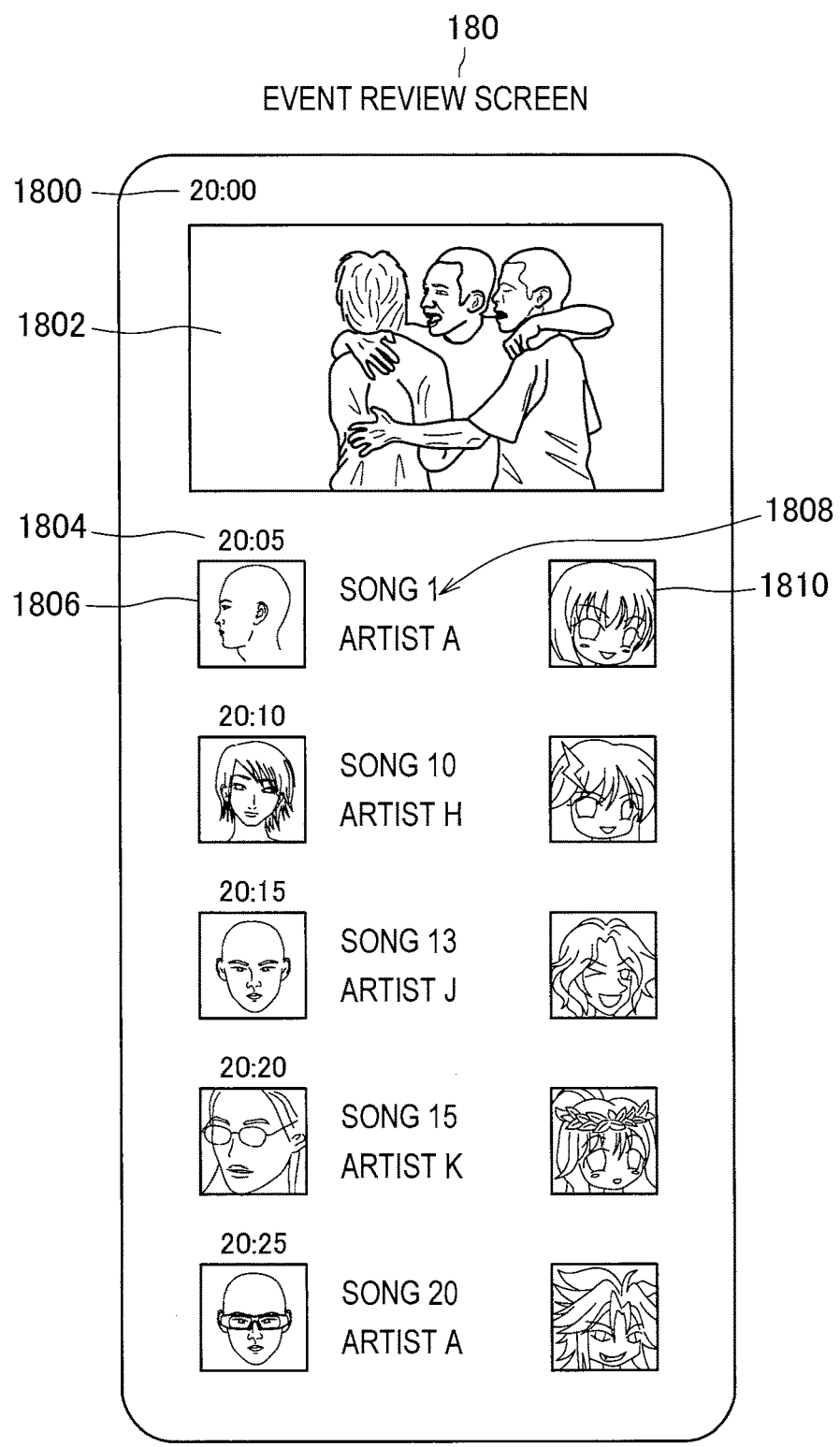
FIG. 17 is an explanatory diagram illustrating an example of a configuration of an event review screen according to the same modification.

As illustrated in FIG. 17, for example, the event review screen 180 includes an image capture time display field 1800, an image display field 1802, a content playback time display field 1804, a content submitter face image display field 1806, a content meta-information display field 1808, and a content thumbnail 1810. Herein, the image capture time display field 1800 displays the time at which the image displayed in the image display field 1802 was captured at an event venue, for example.

The above thus describes a basic configuration of a communication system according to the first modification, but the configuration is not limited to the configuration discussed above. For example, the playback device 130 or the display device 170 may also not be included.

(1-2-2. Configuration According to First Modification)

(1-2-2-1. First Communication Terminal 110)

The above thus describes a basic configuration of a communication system according to the first modification. Next, a configuration according to the first modification will be described in detail.

Figure 14:
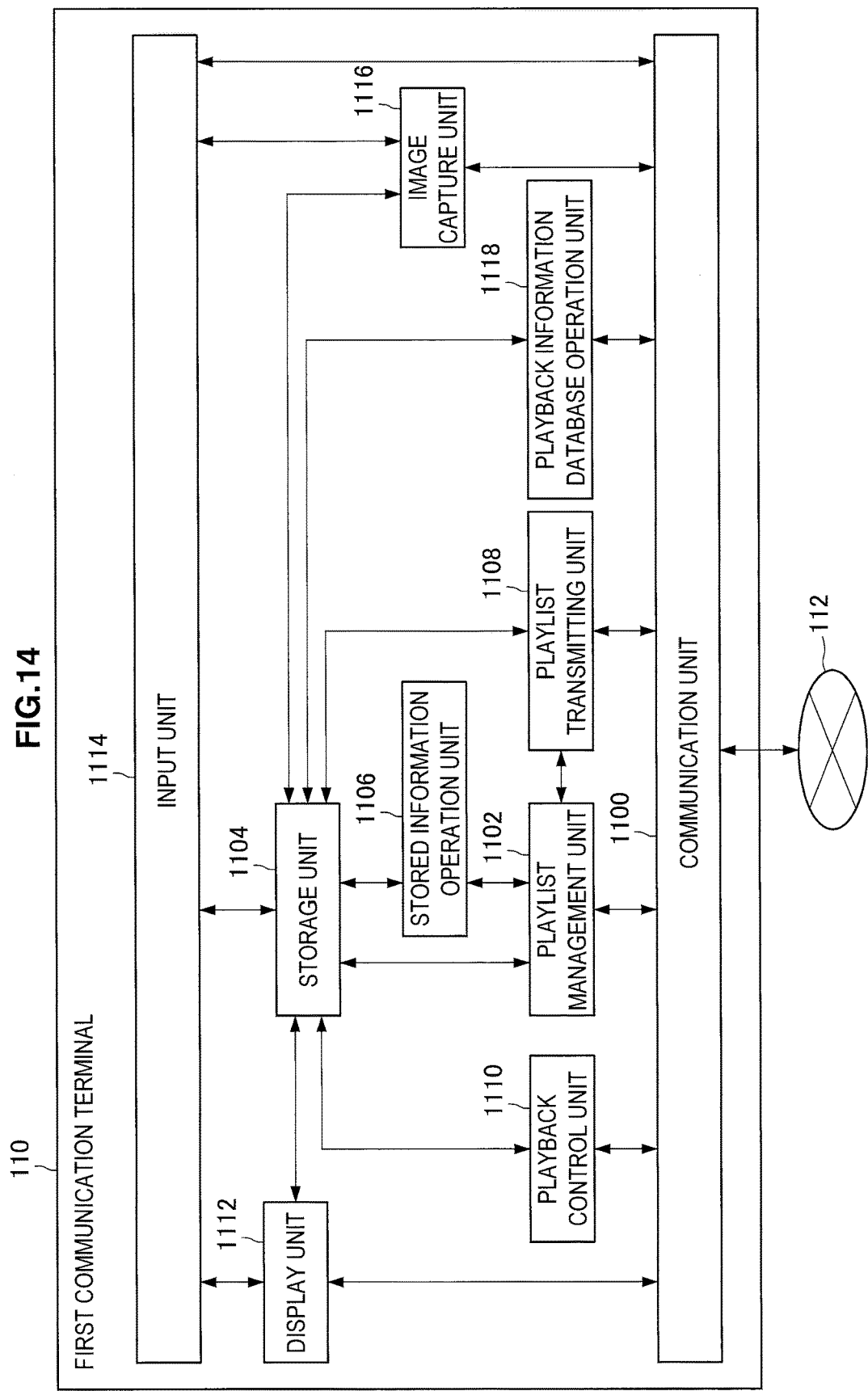
FIG. 14 is a function block diagram illustrating a configuration of a first communication terminal according to the same modification.

FIG. 14 is a function block diagram illustrating a configuration of the first communication terminal 110 according to the first modification. As illustrated in FIG. 14, compared to the first embodiment, the first communication terminal 110 according to the first modification additionally includes a playback information database operation unit 1118.

The playback information database operation unit 1118 transmits, to the playback information database 160 via the communication unit 1100, a captured image captured by the image capture unit 1116, a capture time of the relevant captured image, and identification information of the user of the first communication terminal 110, thereby causing the playback information database 160 to store the above three pieces of information in association with each other. Note that the playback information database operation unit 1118 may cause the communication unit 1100 to transmit to the playback information database 160 not the captured image itself that was captured by the image capture unit 1116, but instead meta-information corresponding to the relevant captured image, such as information indicating the owner of the relevant captured image.

In addition, the playlist management unit 1102 according to the first modification has, in addition to the functions provided in the first embodiment, an additional function of recording, in the playlist, meta-information received from the second communication terminal 120, in association with a playback time when the content corresponding to the relevant meta-information was played back, for example. Note that the functions of the other structural elements are similar to the first embodiment.

(1-2-2-2. Second Communication Terminal 120)

The configuration of the second communication terminal 120 according to the first modification is similar to the first embodiment. Consequently, description thereof is omitted herein.

(1-2-3. Operation According to First Modification)

Figure 18:
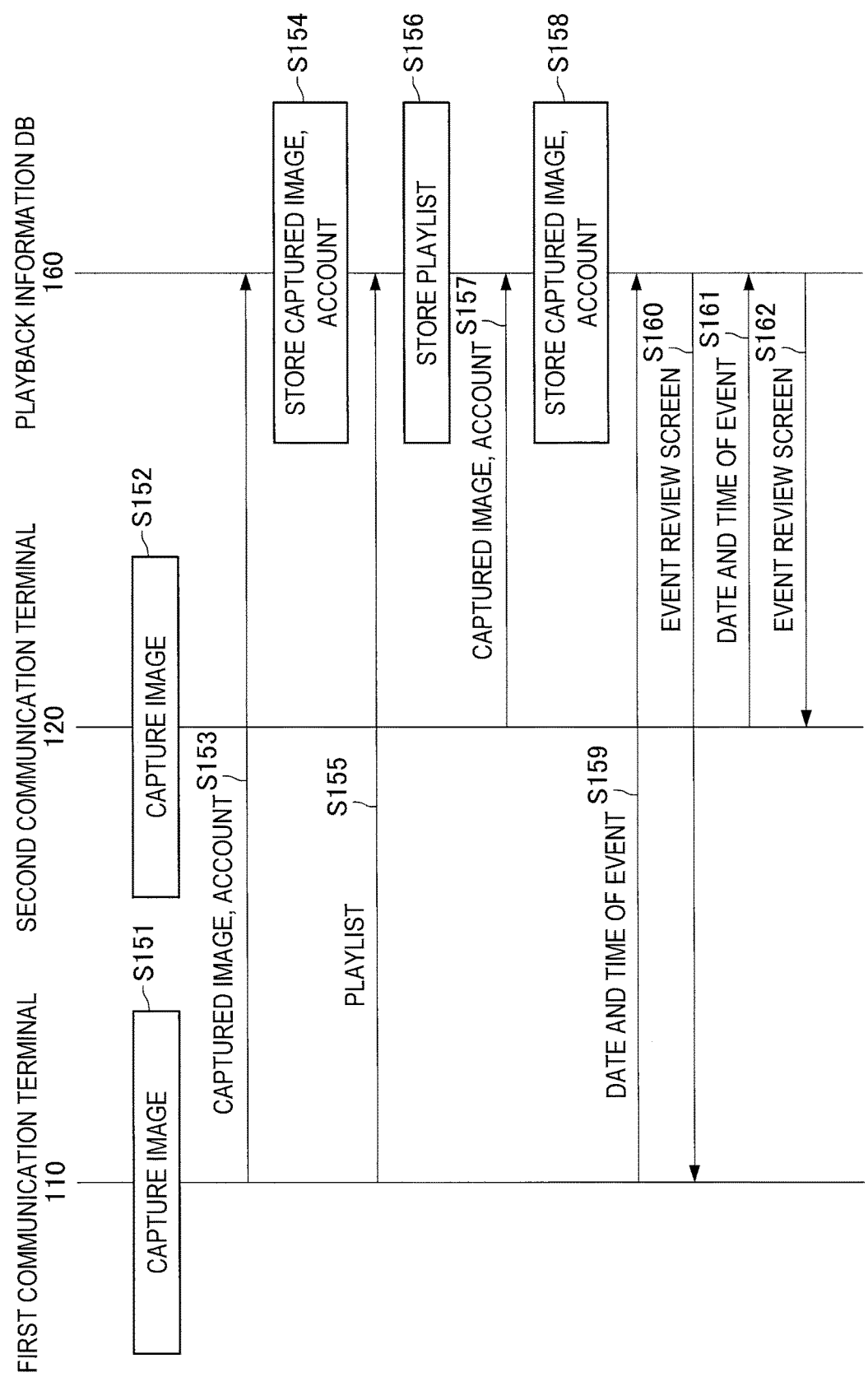
FIG. 18 is a sequence diagram illustrating operation according to the same modification.

Next, operation according to the first modification will be described. FIG. 18 is a sequence diagram illustrating operation according to the first modification.

As illustrated in FIG. 18, at an event venue, for example, first, in response to an operation by the user of the first communication terminal 110, the image capture unit 1116 captures a picture of the surroundings as a still image or a moving image (S151). Similarly, in response to an operation by the user of the second communication terminal 120, the image capture unit 1208 captures a picture of the surroundings as a still image or a moving image (S152).

Next, the playback information database operation unit 1118 transmits, to the playback information database 160 via the communication unit 1100, a captured image captured by the image capture unit 1116, a capture time of the relevant captured image, and identification information of the user of the first communication terminal 110 (S153). Subsequently, the playback information database 160 associates and stores the captured image, the capture time of the relevant captured image, and the account received from the first communication terminal 110 (S154).

Next, the communication unit 1100 of the first communication terminal 110 transmits a playlist stored in the storage unit 1104 to the playback information database 160 (S155). Subsequently, the playback information database 160 stores the playlist received from the first communication terminal 110 (S156).

Next, the communication unit 1100 of the second communication terminal 120 transmits the captured image that was captured in S152 and the account of the user of the second communication terminal 120 to the playback information database 160 (S157). Subsequently, the playback information database 160 associates and stores the captured image, the capture time of the relevant captured image, and the account received from the second communication terminal 120 (S158).

Next, after the event ends, for example, when the user of the first communication terminal 110 desires to view an event review screen related to the relevant event, the communication unit 1100 of the first communication terminal 110 transmits, to the playback information database 160, information related to the relevant event which is input by the user into the input unit 1114, such as the date and time of the event, for example (S159).

Next, the playback information database 160 transmits, to the first communication terminal 110, an event review screen as illustrated in FIG. 17, for example, based on the event-related information received from the first communication terminal 110 (S160). Note that, as a modification of S160, the playback information database 160 may also transmit an event review screen based on the event-related information received from the first communication terminal 110 to the display device 170.

Next, similarly to S159 the communication unit 1200 of the second communication terminal 120 transmits, to the playback information database 160, information related to the relevant event which is input by the user into the input unit 1206, such as the date and time of the event, for example (S161).

Next, similarly to S160, the playback information database 160 transmits, to the second communication terminal 120, an event review screen based on the event-related information received from the second communication terminal 120 (S162). Note that, as a modification of S162, the playback information database 160 may also transmit an event review screen based on the event-related information received from the second communication terminal 120 to the display device 170.

The above thus describes operation according to the first modification, but operation is not limited to the operation discussed above. For example, the operation from S153 to S158 may be processed in parallel rather than sequentially.

Also, the operation from S159 to S162 likewise may be processed in parallel.

Also, in S153 and S157, the first communication terminal 110 and the second communication terminal 120, instead of transmitting the captured image itself to the playback information database 160, may also transmit meta-information corresponding to the relevant captured image, such as information indicating the owner of the relevant captured image, for example, to the playback information database 160. In this modification, in S160 and S162, the playback information database 160 generates an event review screen that includes meta-information corresponding to the relevant captured image instead of the captured image itself, and then transmits the relevant event review screen to the first communication terminal 110 or the second communication terminal 120. Subsequently, in the case of desiring to reference the captured image itself, the first communication terminal 110 and the second communication terminal 120 requests permission to access the communication terminal holding the relevant captured image, on the basis of the meta-information displayed on the received event review screen. According to this modification, since the captured image itself is not saved in the playback information database 160, the first communication terminal 110 and the second communication terminal 120 are unable to directly access a captured image captured or stored by another communication terminal. For this reason, it is possible to sufficiently protect the copyright of the captured image.

Also, (1-2-4. Advantageous Effects According to First Modification)

As described above, according to the first modification, the first communication terminal 110 records, in a playlist, meta-information received from the second communication terminal 120, in association with a playback time when the content corresponding to the relevant meta-information was played back, for example. Subsequently, the first communication terminal 110 causes the playback information database 160 to store a captured image, a capture time of the relevant captured image, and identification information of the user in association with each other, and additionally causes the playback information database 160 to store the playlist. For this reason, the user of the first communication terminal 110 or the second communication terminal 120 is able to acquire, from the playback information database 160, information including the captured image, the capture time of the relevant captured image, the playback time of the content, and the meta-information of the relevant content, like an event review screen, for example. Consequently, there is an advantage in that the relevant user may reference information like an event review screen after an event in which the user participated ends, for example, and more easily recall information related to content that was played back during the relevant event.

For example, after the event ends, the user of the first communication terminal 110 or the second communication terminal 120 is able to satisfy needs such as wanting to remember the name of a song that was playing when a certain photo was being displayed, or wanting to listen to that music again.

[1-3. Second Modification of First Embodiment]

Next, a second modification of the first embodiment will be described. According to the second modification, an event participant is able to purchase or view content played back at an event venue, for example, during the relevant event or after the event ends.

(1-3-1. Basic Configuration of Communication System)

Figure 19:
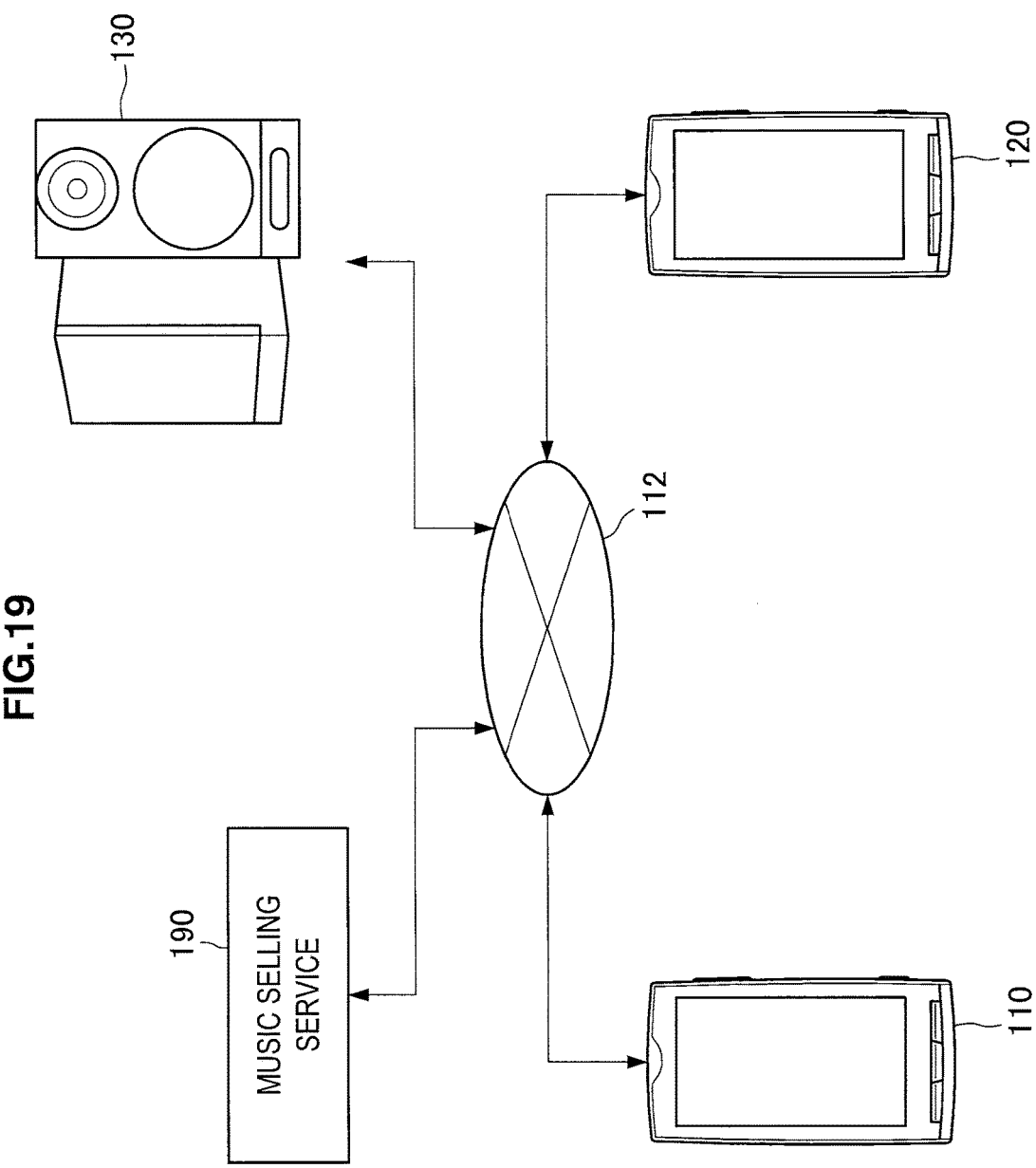
FIG. 19 is an explanatory diagram illustrating a configuration of a communication system according to a second modification of the same embodiment.

Hereinafter, first, a basic configuration of a communication system according to the second modification will be described with reference to FIG. 19. As illustrated in FIG. 19, compared to the first embodiment, a communication system according to the second modification additionally includes a music selling service 190 (content providing server).

—Music Selling Service 190—

The music selling service 190 is an information processing device for selling content such as music, for example, to a device connected to the communication network 112. In the music selling service 190, multiple pieces of content are recorded in association with information related to each piece of content, and the price of each piece of content.

At this point, an example of data registered in the music selling service 190 will be described with reference to FIG. 21. As illustrated in FIG. 21, in the music selling service 190, meta-information (content name) 1900, meta-information (artist name) 1902, and a price 1904 are recorded in association with each other, for example. For example, the data illustrated on the second row of FIG. 21 indicates that the content name is "Song 1", the artist name is "Artist A", and the price of the relevant content is "500 yen".

The above thus describes a basic configuration of a communication system according to the second modification, but the configuration is not limited to the configuration discussed above. For example, the playback information database 160 according to the first modification may also be included.

(1-3-2. Configuration According to Second Modification)

(1-3-2-1. First Communication Terminal 110)

The above thus describes a basic configuration of a communication system according to the second modification. Next, a configuration according to the second modification will be described in detail.

Figure 20:
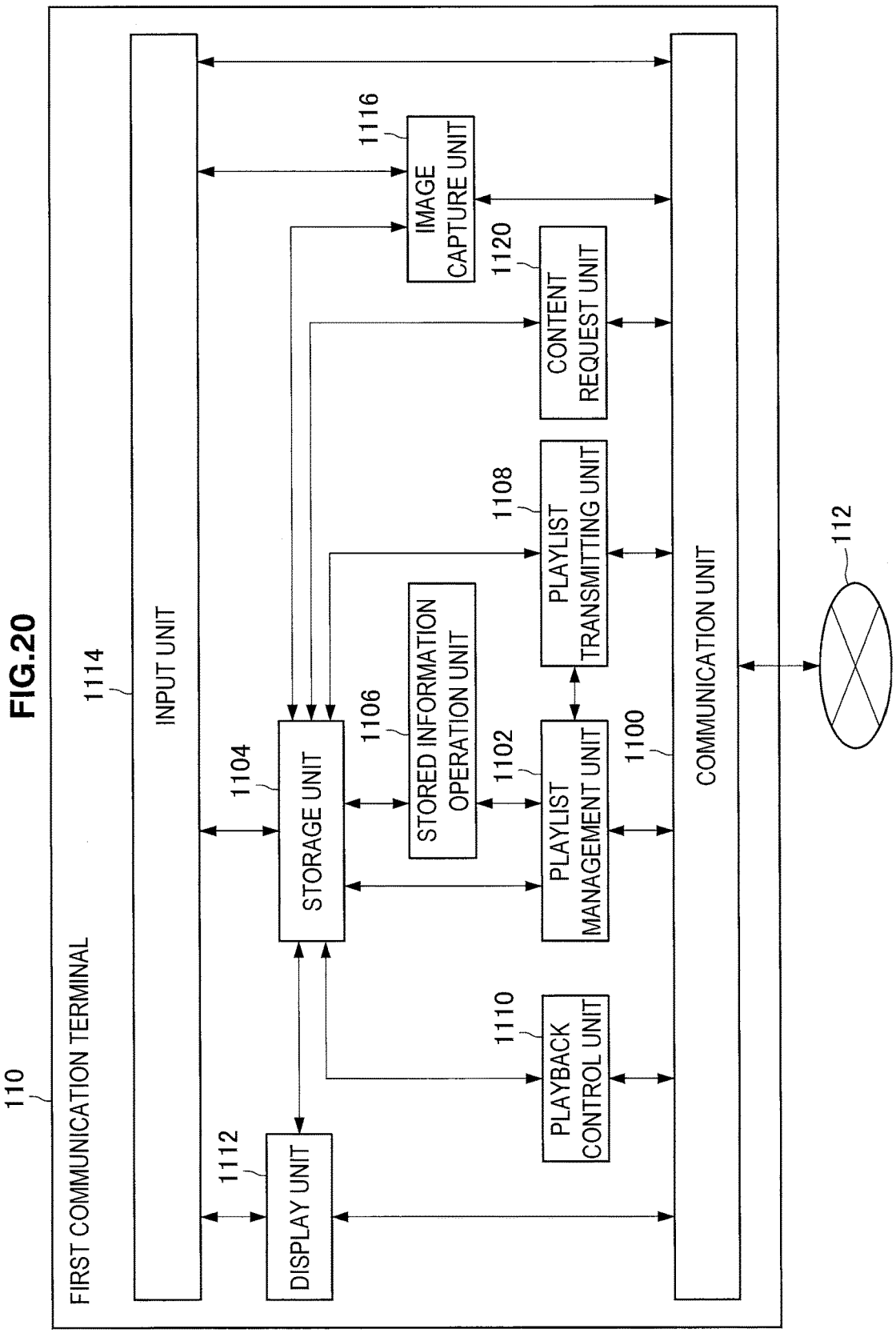
FIG. 20 is a function block diagram illustrating a configuration of a first communication terminal according to the same modification.

FIG. 20 is a function block diagram illustrating a configuration of the first communication terminal 110 according to the second modification. As illustrated in FIG. 20, compared to the first embodiment, the first communication terminal 110 according to the second modification additionally includes a content request unit 1120. Note that the functions of the other structural elements are similar to the first embodiment.

The content request unit 1120 requests the music selling service 190 to provide content corresponding to arbitrary meta-information recorded in a playlist.

(1-3-2-2. Second Communication Terminal 120)

The configuration of the second communication terminal 120 according to the second modification is roughly similar to the first embodiment. However, the configuration is not limited to such a configuration, and functionality similar to the content request unit 1120 of the first communication terminal 110 additionally may be included, for example.

(1-3-3. Operation According to Second Modification)

Figure 22:
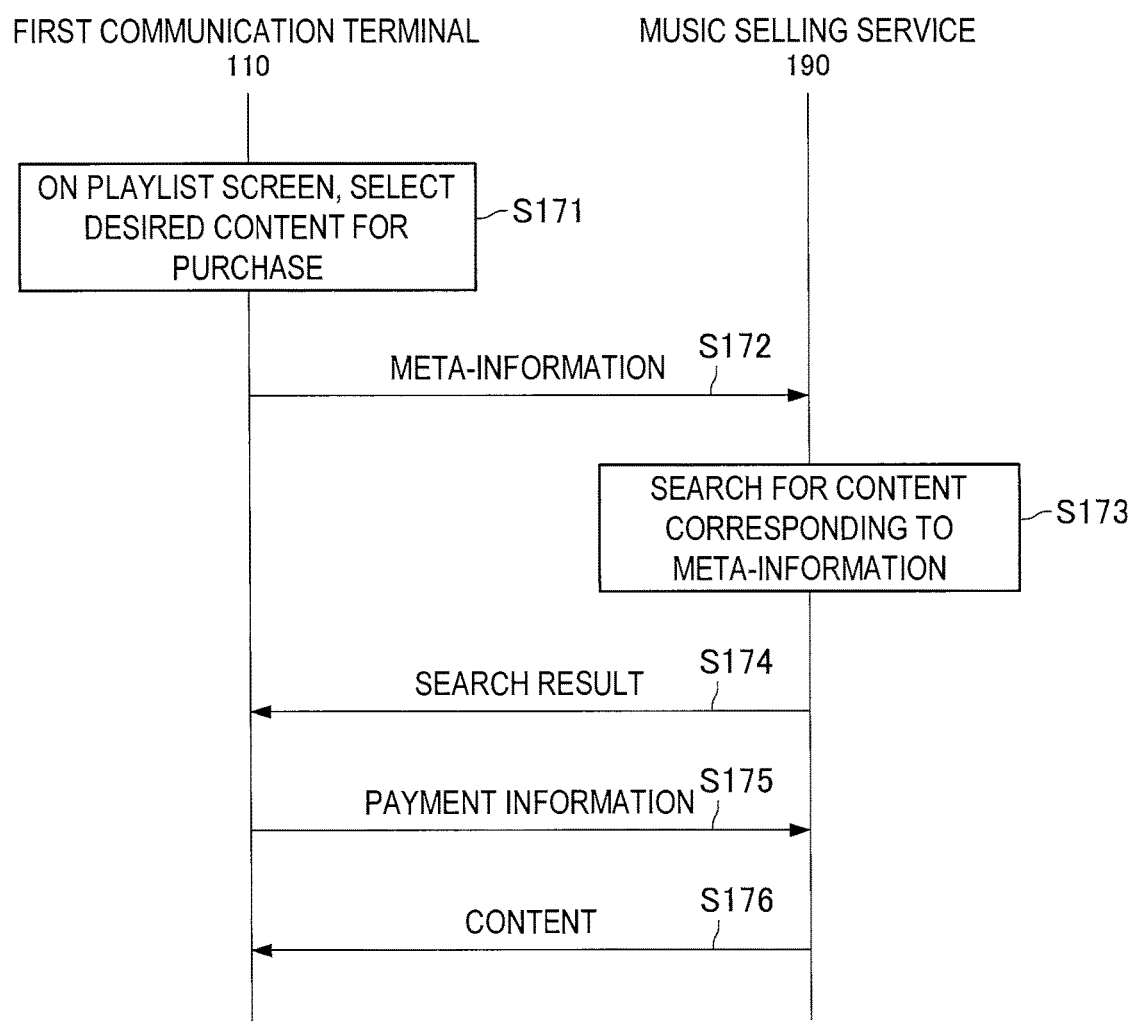
FIG. 22 is a sequence diagram illustrating operation according to the same modification.

Next, operation according to the second modification will be described. FIG. 22 is a sequence diagram illustrating operation according to the second modification.

As illustrated in FIG. 22, at an event venue for example, first, the user of the first communication terminal 110 operates the input unit 1114 to select desired content for purchase or viewing from among the content displayed on a playlist display screen (S171). Subsequently, the content request unit 1120 acquires meta-information corresponding to the content selected by the user from the playlist, and transmits the relevant meta-information to the music selling service 190 via the communication unit 1100 (S172).

Next, the music selling service 190 searches to determine whether or not the content corresponding to the meta-information received from the first communication terminal 110 is registered in the service itself (S173). Subsequently, the music selling service 190 transmit a result of the relevant search to the first communication terminal 110 (S174).

If the relevant content is registered in the music selling service 190, and in addition, the user of the first communication terminal 110 desires to purchase or view the relevant content, the user of the first communication terminal 110 inputs into the input unit 1114 payment information for paying compensation to the music selling service 190, for example. Subsequently, the communication unit 1100 transmits the input payment information to the music selling service 190 (S175).

Next, the music selling service 190, on the basis of the payment information received from the first communication terminal 110, conducts a designated payment process related to the sale or the like of the relevant content to the first communication terminal 110. Subsequently, if the payment process completes successfully, the music selling service 190 transmits the relevant content to the first communication terminal 110 (S176).

The above thus describes operation according to the second modification, but operation is not limited to the operation discussed above. For example, by performing similar operation between the music selling service 190 and the second communication terminal 120 instead of the first communication terminal 110, the purchasing or viewing of content by the second communication terminal 120 may also be conducted.

(1-3-4. Advantageous Effects According to Second Modification)

As described above, according to the second modification, the first communication terminal 110 is able to request the music selling service 190 to purchase or view content corresponding to meta-information recorded in a playlist, and settle payment with the music selling service 190. For this reason, if the user of the first communication terminal 110 desires to purchase or view content that was added to the playlist by any second communication terminal 120 at an event venue, for example, the user of the first communication terminal 110 is able to purchase or view the relevant content during the relevant event or after the event ends.

<2. Detailed Description of Second Embodiment>

The foregoing thus describes the first embodiment. Next, a second embodiment will be described. First, a problem that the second embodiment attempts to solve will be described. In the related art, technology has been developed that creates and provides a photo album, slideshow, or the like by gathering captured images captured by multiple participants at an event or the like into a single location, such as a cloud service. However, the above technology is still unable to realize the following functions (A) to (D).

(A) Extracting an image group from among the multiple captured images captured by event participants so that all event participants are evenly included.

(B) Creating a photo album, for example, for effectively communicating the atmosphere of the event. For example, displaying the number of participants of the event, or presenting a display reflecting conditions such as the lighting of the event.

(C) Providing information about the venue where the event was held, or a facility such as a store, together with a photo album, for example.

(D) Providing functionality that leads to profits for the store where the event was held, or giving some kind of benefit to participants who submitted a captured image.

Also, the technologies described in JP 2012-133735A and JP 2012-064151A are unable to provide useful support when it is desirable to choose some images from among multiple captured images. For example, when multiple captured images are captured in a place where many people gather, such as at an event venue, it is desirable to choose a group of images that evenly includes the event participants from among the multiple captured images, but this cannot be realized with the above technology. Also, a group of images that includes a specific person such as the organizer of the event cannot be automatically chosen.

Thus, focusing on the above circumstances led to the creation of an image processing device 210 according to the second embodiment. The image processing device 210 according to the second embodiment is able to provide useful support when it is desirable to choose some images from among multiple captured images.

Such an image processing device 210 according to the second embodiment is provided with:

A. a person recognition unit 2104 that recognizes people included in each of multiple captured images;

B. an image evaluation unit 2106 that evaluates one or more captured image groups extracted from among the multiple captured images, on the basis of a degree of appearance of each person of interest recognized by the person recognition unit 2104; and C. an image selection unit 2108 that selects a captured image group having the highest result of the evaluation by the image evaluation unit 2106.

[2-1. Basic Configuration of Image Processing System]

Figure 23:
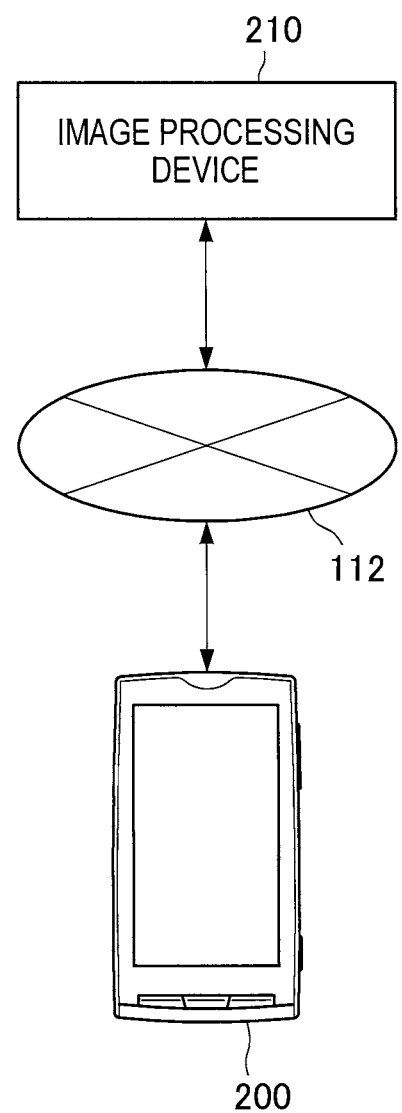
FIG. 23 is an explanatory diagram illustrating a configuration of a communication system according to the second embodiment of the present disclosure.

Hereinafter, first, a basic configuration of such an image processing system according to the second embodiment will be described with reference to FIG. 23. As illustrated in FIG. 23, the image processing system according to the second embodiment includes a communication terminal 200, a communication network 112, and an image processing device 210. Note that the communication network 112 is similar to the first embodiment.

—Communication Terminal 200—

The communication terminal 200 is a device connectable to the communication network 112. The communication terminal 2000 may be a mobile phone such as a smartphone, a tablet, a PDA, a digital still camera, a digital video camera, or a game console, for example. In addition, the communication terminal 200 may also have a hardware configuration similar to the first communication terminal 110 according to the first embodiment.

—Image Processing Device 210—

The image processing device 210 is a device that conducts image processing on the basis of a captured image received from a device connected to the communication network 112, such as the communication terminal 200, for example. The image processing device 210 may have a hardware configuration similar to the first communication terminal 110 according to the first embodiment, but may also have differences, such as not including the input device 1160 or the image capture device 1166, for example.

The above thus describes a basic configuration of an image processing system according to the second embodiment, but the configuration is not limited to the configuration discussed above. For example, the playback information database 160 or the display device 170 according to the first modification of the first embodiment may also be included.

[2-2. Overview of Second Embodiment]

Next, an overview of the second embodiment made up of the image processing system discussed above will be described with reference to FIG. 24. Herein, as an example, a case will be described in which a user possessing the communication terminal 200 participates in an event such as a party, and subsequently, after the relevant event ends, the user desires to review the conditions of the relevant event, such as who participated in the relevant event, for example.

Figure 24:
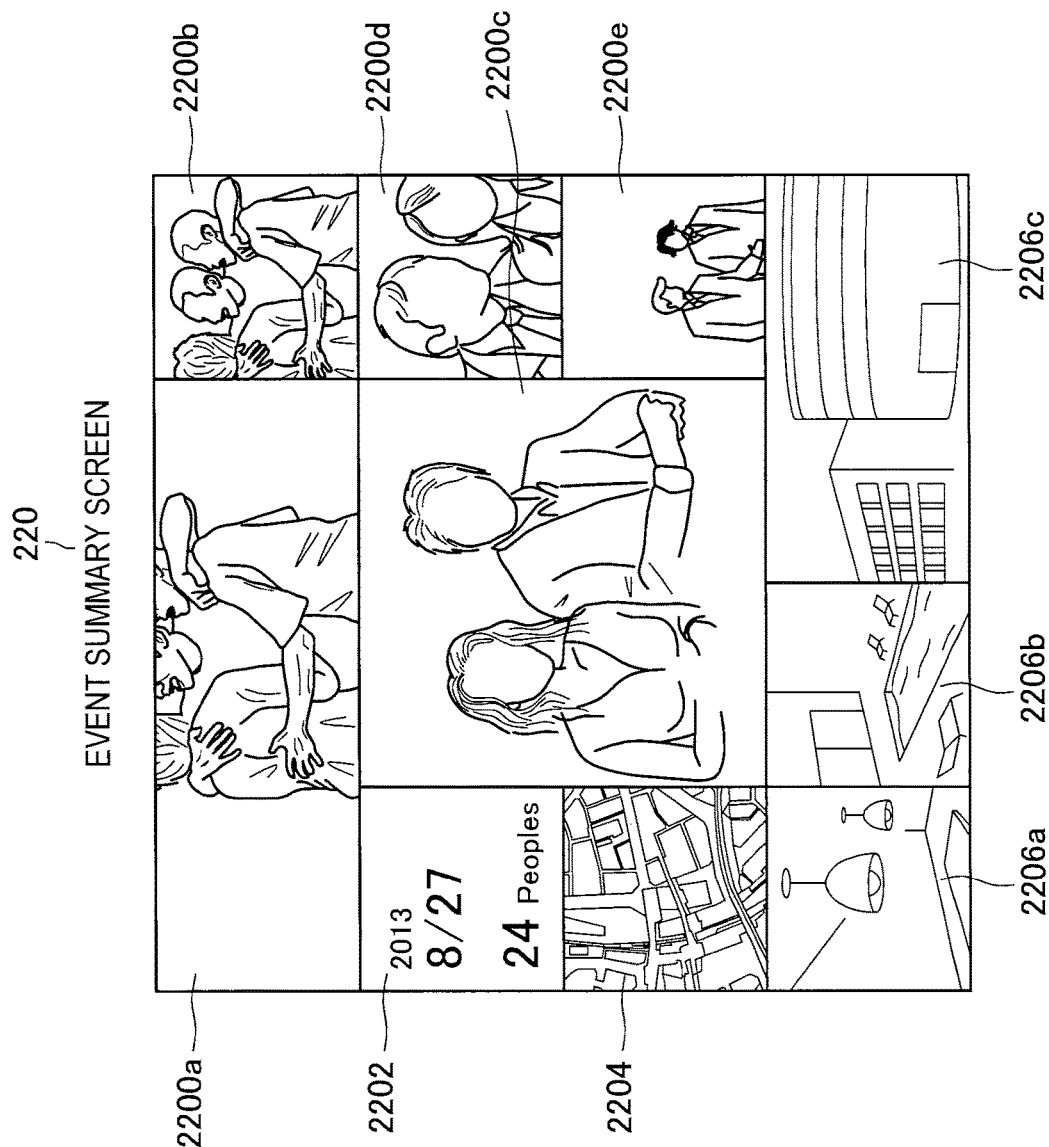
FIG. 24 is an explanatory diagram illustrating an example of a configuration of an event summary screen according to the same embodiment.

FIG. 24 is an example of a configuration of a group image generated by the image processing device 210 from multiple captured images received from the communication terminal 200, for example (an event summary screen 220). As illustrated in FIG. 24, the event summary screen 220 includes, for example, a group image display field 2200, an event information display field 2202, an event facility position display field 2204, and an event facility captured image display field 2206.

Herein, in the group image display field 2200, there is displayed a group of captured images (hereinafter designated a captured image group) extracted on the basis of a degree of appearance of persons recognized from each of multiple captured images captured during the relevant event. Herein, the degree of appearance may be a value according to the number of captured images that include a person of interest from among a certain captured image group, or a value for each captured image that depends on a degree of noticeability of the person of interest in each captured image.

For example, FIG. 24 illustrates an example in which a captured image group for which the degree of appearance of each person of interest is the most equal, or in other words, a captured image group in which the persons recognized from multiple captured images are the most evenly included (the captured image group made up of the captured image 2200a to the captured image 2200e) has been selected.

Also, in the event information display field 2202, the date when the relevant event was held is displayed together with the number of persons recognized from the relevant multiple captured images, as illustrated in FIG. 24. Note that in the event information display field 2202, instead of the number of persons recognized from the relevant multiple captured images, information such as the number of people who accessed a webpage related to the relevant event provided by the organizer of the relevant event, or the number of people who transmitted an email to an email address for providing information related to the relevant event may be displayed, for example.

Also, in the event facility position display field 2204, position information of a relevant facility is displayed, such as a map indicating the position of the facility where the relevant event was held, for example. Also, in the event facility captured image display field 2206, captured images of a relevant facility provided by the operator of a facility such as a store where the relevant event was held are displayed, such as the captured image 2206a to the captured image 2206c, for example. Note that captured images of the relevant facility may be provided to the event organizer by the operator of the relevant facility before the event is held. Consequently, the event organizer is able to provide captured images of the relevant facility to likely participants of the event in advance, and thus may entice participation in the event.

As discussed above, according to the second embodiment, the image processing device 210 recognizes a person included in each of multiple captured images, and evaluates one or more captured image groups extracted from the multiple captured images, on the basis of a degree of appearance of each recognized person of interest. Subsequently, the image processing device 210 selects the captured image group having the highest result of the relevant evaluation, and generates a group image. For this reason, the image processing device 210 is able to provide useful support when it is desirable to choose some images from among multiple captured images. For example, the image processing device 210 is able to select a captured image group from among multiple captured images that were captured during an event so that recognized persons are included as evenly as possible.

[2-3. Configuration According to Second Embodiment]
(2-3-1. Image Processing Device 210)

The foregoing thus describes an overview of the second embodiment. Next, a configuration according to the second embodiment will be described in detail.

Figure 25:
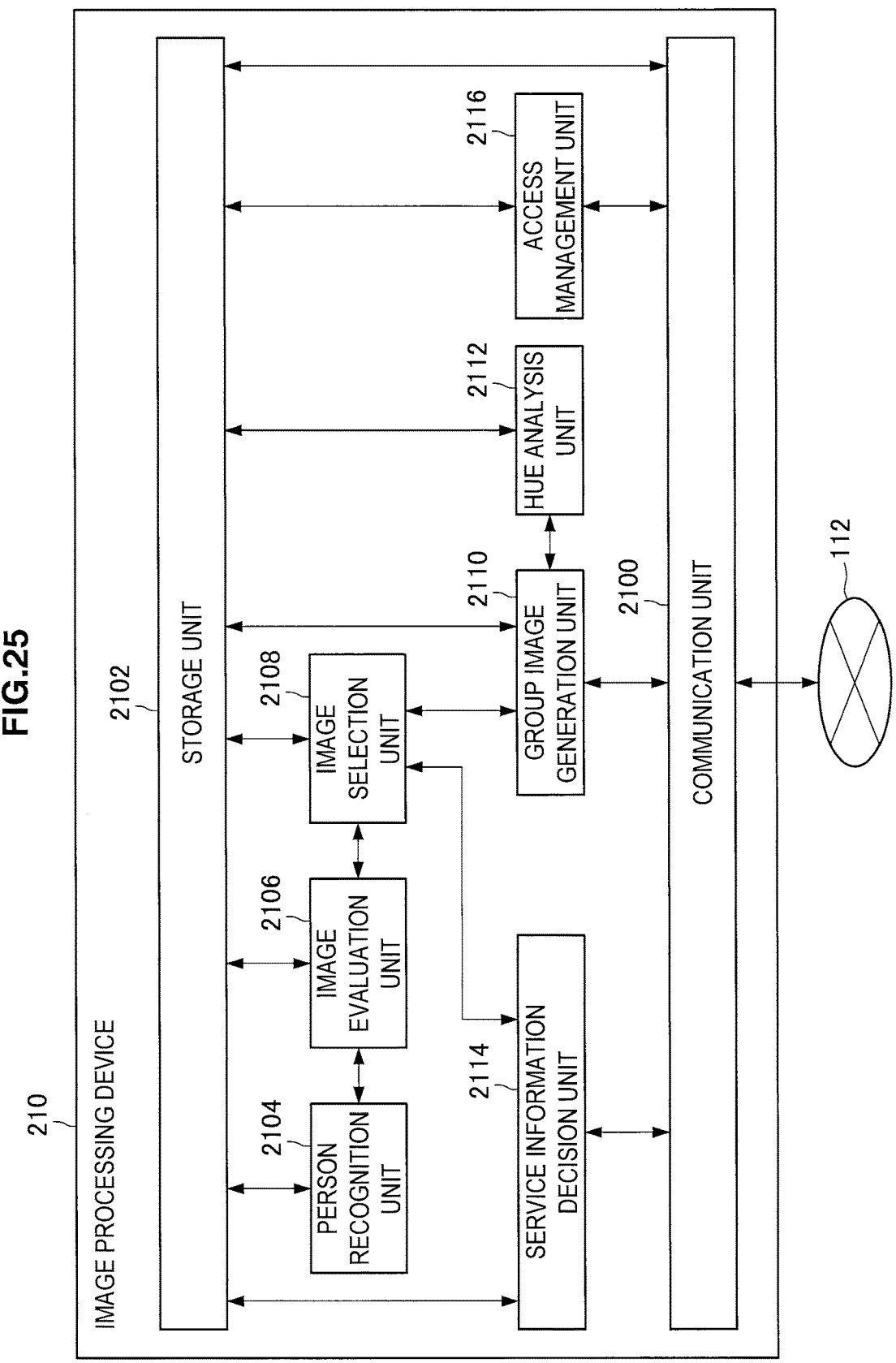
FIG. 25 is a function block diagram illustrating a configuration of an image processing device according to the same embodiment.

FIG. 25 is a function block diagram illustrating a configuration of an image processing device 210 according to the second embodiment. As illustrated in FIG. 25, the image processing device 210 according to the second embodiment includes a communication unit 2100, a storage unit 2102, a person recognition unit 2104, an image evaluation unit 2106, an image selection unit 2108, a group image generation unit 2110, a hue analysis unit 2112, a service information decision unit 2114, and an access management unit 2116.

The communication unit 2100 transmits and receives various information to and from the communication terminal 200 via the communication network 112. For example, the communication unit 2100 receives a captured image from the communication terminal 200, and transmits service information decided by the service information decision unit 2114 discussed later to the communication terminal 200 possessed by a person who submitted a captured image.

The storage unit 2102 stores a captured image received from the communication terminal 200, for example, and various software such as software for controlling the operation of the image processing device 210, for example.

The person recognition unit 2104 uses face recognition technology, for example, to recognize people included in each of multiple captured images stored in the storage unit 2102, for example. Herein, a captured image may be a still image or a moving image.

The image evaluation unit 2106 evaluates one or more captured image groups extracted from among multiple captured images stored in the storage unit 2102, for example, on the basis of a degree of appearance of each person of interest recognized by the person recognition unit 2104. Herein, each person of interest is a person included in at least one of the relevant multiple captured images, for example.

In addition, the image evaluation unit 2106 may also more highly evaluate a captured image group in which the degree of appearance for each person of interest is more equal. In addition, the image evaluation unit 2106 may also more highly evaluate a captured image group that is close to a target distribution in which the degree of appearance of a specific person of interest is prominent. Note that the specific person of interest may be the organizer of the event, a famous person, the bride and groom in a wedding ceremony, the subject of a birthday party, a performer at a concert, or an athlete at a sports event, for example.

At this point, an example of an image evaluation method by the image evaluation unit 2106 will be described with reference to FIGS. 26 to 28. First, the image evaluation unit 2106 (1) for each person of interest, computes a degree of appearance for each captured image stored in the storage unit 2102, for example.

FIG. 26 is an example of a list display (degree of appearance table 230) of frequencies computed by the image evaluation unit 2106. As illustrated in FIG. 26, in the degree of appearance table 230, a person of interest name column 2300, an image file name column 2302, and a noticeability column 2304 are recorded in association with each other, for example. Herein, in the person of interest name column 2300, the account name of each person of interest, or identification information for a person of interest such as the name of a person of interest, is recorded, for example. In the image file name column 2302, the name of an image file depicting the person of interest recorded in the person of interest name column 2300 is recorded. Also, in the noticeability column 2304, a computed value of the degree to which the person of interest recorded in the person of interest name column 2300 is noticeable in the image file recorded in the image file name column 2302 is recorded. Herein, the noticeability may be the magnitude of the image area of the person of interest in a captured image, or a degree of expression such as a smile by the person of interest, for example.

For example, the data illustrated on the second row of FIG. 26 indicates that the person of interest name is "A", the image file name is "Image 1", and that the noticeability of the person of interest "A" in the relevant image file ("Image 1") is computed to be "1.0".

Figure 27:
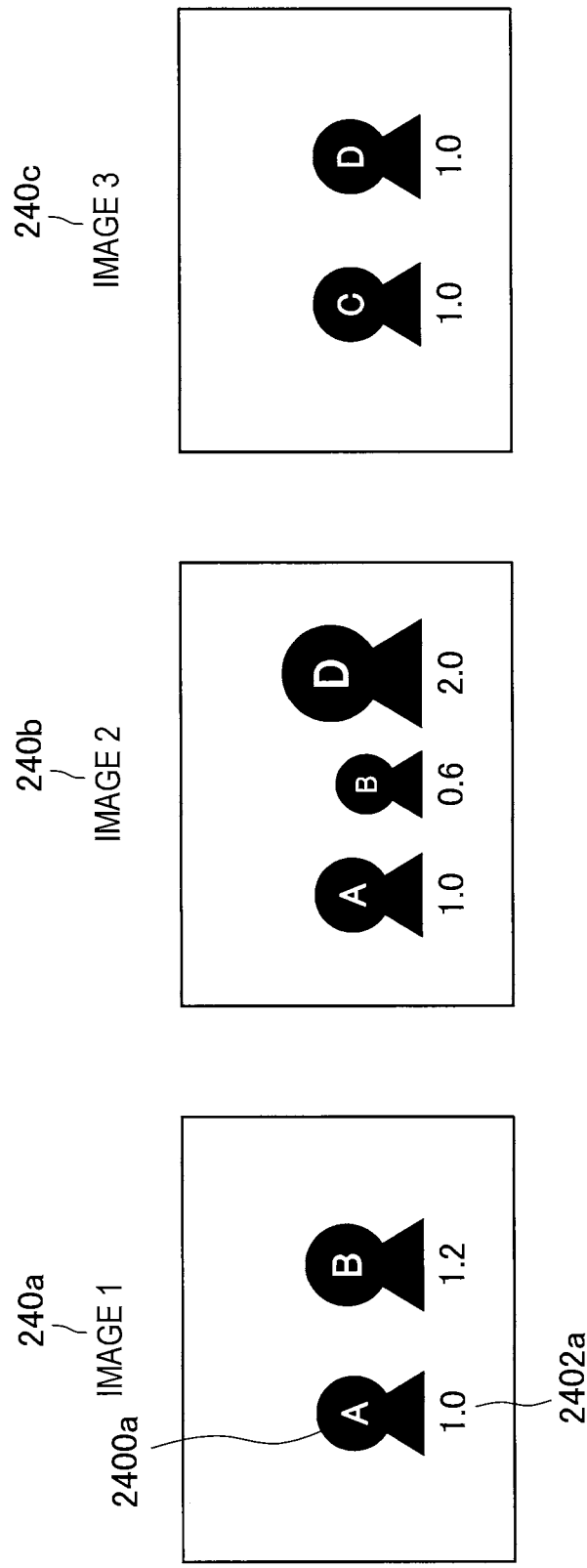
FIG. 27 is an explanatory diagram illustrating an example of captured images according to the same embodiment.

Additionally, FIG. 27 is an explanatory diagram illustrating, for each captured image 240, associations between a person of interest 2400 and a noticeability 2402 of the person of interest in each captured image. For example, FIG. 27 indicates that the "Image 1" 240a contains the persons of interest "A" and "B", and that the noticeability of the person of interest "A" in the "Image 1" 240a is "1.0", while the noticeability of the person of interest "B" in the "Image 1" 240a is "1.2".

Next, the image evaluation unit 2106 (2) evaluates one or more captured image groups extracted from among multiple captured images, on the basis of the degree of appearance of each person of interest computed with the method discussed above. FIG. 28 is an explanatory diagram for explaining the evaluation by the image evaluation unit 2106 of captured image groups extracted from the three images illustrated in FIG. 27.

The image group column 2500 in FIG. 28 indicates the set of captured images included in each captured image group. Note that FIG. 28 illustrates an example of presupposing that each captured image group includes two or more captured images.

Also, the degree of appearance column 2502 in FIG. 28 illustrates the degree of appearance of each person of interest in the captured image group indicated in the image group column 2500. Note that FIG. 28 illustrates an example in which the degree of appearance of each person of interest in each captured image group is treated as the total value, for each person of interest, of the noticeability computed for the captured images included in the relevant captured image group.

Also, the variance of degree of appearance column 2504 indicates, for each captured image group, a variance value of the degree of appearance which is computed from the degree of appearance of each person of interest. The variance of degree of appearance column 2504 indicates how much the degree of appearance of each person of interest indicated in the degree of appearance column 2502 varies in each captured image group.

For example, the data illustrated on the second row of FIG. 28 indicates a captured image group including "Image 1", "Image 2", and "Image 3", in which a person of interest "A" is computed to have a degree of appearance of "2.0", a person of interest "B" a degree of appearance of "1.8", and a person of interest "C" a degree of appearance of "1.0", and in which the variance value of the degree of appearance is computed to be "0.51".

In the example illustrated in FIG. 28, the image evaluation unit 2106 more highly evaluates a captured image group in which the degree of appearance for each person of interest is more equal, for example. In other words, the image evaluation unit 2106 mostly highly evaluates the captured image group having the smallest variance of degree of appearance column 2504, or in other words, the captured image group (Image 1, Image 3) illustrated on the fourth row of FIG. 28.

In addition, the image evaluation unit 2106 may also more highly evaluate a captured image group that is close to a target distribution in which the degree of appearance of a specific person of interest is prominent. For example, if the specific person of interest is "D" in FIG. 28, the image evaluation unit 2106 may most highly evaluate a captured image group for which the degree of appearance of "D" is relatively high and the variance of degree of appearance column 2504 is relatively small, such as the captured image (Image 1, Image 2, Image 3) illustrated on the second row of FIG. 28, for example.

Next, the description of a configuration of the image processing device 210 will continue with reference to FIG. 25 again. After the evaluation by the image evaluation unit 2106 discussed above, the image selection unit 2108 selects the captured image group having the highest result of the relevant evaluation.

The group image generation unit 2110 combines and arranges the captured images included in the captured image group selected by the image selection unit 2108, and thereby generates a group image like on the event summary screen 220 illustrated in FIG. 24, for example. Note that the group image may be a still image, or a moving image such as a slideshow, for example.

Herein, the group image generation unit 2110 may also display a captured image containing more persons of interest more largely in the relevant group image. In addition, the group image generation unit 2110 may also display a captured image containing a specific person of interest as discussed above more largely in the relevant group image, or display such a captured image in the center of the relevant group image like the captured image 2200c in FIG. 24, for example. In addition, the group image generation unit 2110 may also display a captured image that was captured more clearly more largely in the relevant group image, or in a prominent area, such as in the center, for example.

In addition, if the captured images are images captured by participants of an event, the group image generation unit 2110 may additionally arrange, in the group image, a display indicating the number of participants of the relevant event, like the event information display field 2202 illustrated in FIG. 24, for example. Herein, the method of computing the number of participants of the relevant event may involve the group image generation unit 2110 computing the total number of persons included in at least one of the multiple captured images, or counting the number of persons who accessed a predetermined URL, such as a webpage related to the relevant event.

In addition, if the captured images are images captured by participants of an event, the group image generation unit 2110 may additionally arrange, in the group image, a display indicating the position of a facility where the relevant event was conducted, like the event facility position display field 2204 illustrated in FIG. 24, for example.

In addition, if the captured images are images captured by participants of an event, the group image generation unit 2110 may additionally arrange, in the group image, captured images of a facility where the relevant event was conducted, like the event facility captured image display field 2206 illustrated in FIG. 24, for example. At this point, the group image generation unit 2110 may also select captured images of the facility to arrange in the group image according to a time slot during which the relevant event was conducted. For example, if the time slot during which the relevant event was conducted is at night, the group image generation unit 2110 selects captured images that capture the relevant facility at nighttime.

In addition, the group image generation unit 2110 may also select a theme color of the group image, such as a background color of the event information display field 2202 illustrated in FIG. 24, for example, on the basis of an analysis result from the hue analysis unit 2112 discussed later. Note that the functions of the group image generation unit 2110 discussed above will be later described in detail.

The hue analysis unit 2112 analyzes the hue of multiple captured images stored in the storage unit 2102, for example. Note that, as discussed above, an analysis result from the hue analysis unit 2112 is used by the group image generation unit 2110.

The service information decision unit 2114 decides service information to provide to a person who submitted a captured image included in a captured image group selected by the image selection unit 2108. For example, the service information decision unit 2114 decides a number of points or coupons, or a type of benefit, to be provided to a person who submitted a captured image by the organizer of the event or the operator of the event venue, according to the number of submitted captured images.

The access management unit 2116 manages the provision, to a participant of an event, of access information including URL information of a server for uploading a captured image and participant identification information. Additionally, the access management unit 2116 authenticates a person who accesses the relevant server on the basis of access information used by the person accessing the relevant server. Herein, the server for uploading a captured image may be the image processing device 210 itself, or another device such as the playback information database 160, for example.

Note that, according to the second embodiment, it is also possible to provide a computer program causing hardware such as a CPU, ROM, and RAM built into the image processing device 210 to exhibit the same functionality as the respective components of the image processing device 210 discussed above. Also, a storage medium having such a computer program stored therein is also provided.

The above thus describes a configuration of an image processing device 210 according to the second embodiment, but the configuration is not limited to the configuration discussed above. For example, one or more of any of the communication unit 2100, the storage unit 2102, the group image generation unit 2110, the hue analysis unit 2112, the service information decision unit 2114, and the access management unit 2116 may be provided in another device.

[2-4. Operation According to Second Embodiment]

Figure 29:
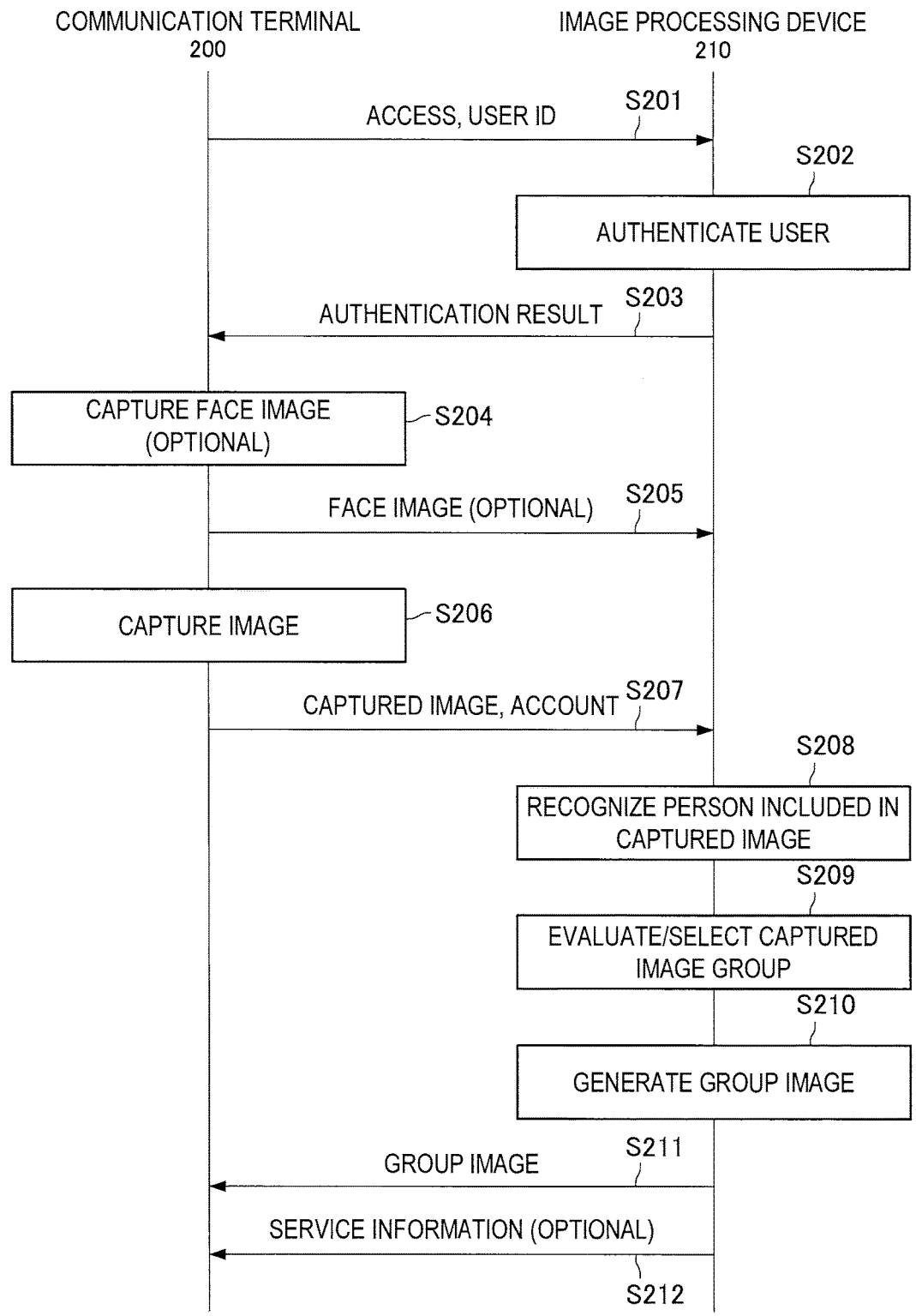
FIG. 29 is a sequence diagram illustrating operation according to the same embodiment.

The above thus describes a configuration according to the second embodiment. Next, operation according to the second embodiment will be described. FIG. 29 is a sequence diagram illustrating operation according to the second embodiment.

As illustrated in FIG. 29, first, the user of the communication terminal 200 accesses a site for uploading a captured image, provided by the image processing device 210 (S201).

More specifically, the communication terminal 200 may, for example, access the URL of a website provided by the organizer of an event, the operator of a facility where the event is held, or the like, scan a QR code (registered trademark) displayed on the relevant website, and then access the relevant upload site by accessing a URL included in the relevant QR code (registered trademark). Alternatively, the communication terminal 200 may transmit a blank email to an email address provided in information from the above organizer or the like, scan a QR code (registered trademark) included in a reply email to the relevant blank email, and then access the relevant upload site by accessing a URL included in the relevant QR code (registered trademark).

Subsequently, the access management unit 2116 of the image processing device 210 authenticates the person who accessed the relevant upload site, on the basis of access information used when the communication terminal 200 accesses the relevant upload site (S202). Herein, the relevant access information may be information such as a user ID included in the QR code (registered trademark) discussed above, for example.

Next, the communication unit 2100 transmits an authentication result from the access management unit 2116 to the communication terminal 200 (S203). Note that, if authentication by the access management unit 2116 fails, the image processing device 210 may stop communication with the communication terminal 200 immediately after S203, and not execute the operation after S203.

Next, if authenticated by the image processing device 210, the communication terminal 200, in response to an operation by the user of the communication terminal 200, captures a face image of the relevant user (S204). Note that the face image may also be used to visually display the submitter of each captured image in a group image like the event summary screen 220, by superimposing the face image on a captured image submitted by the relevant user in a tag format or the like, for example. In addition, the operation in S204 may also be omitted.

Next, the communication terminal 200 transmits the face image captured in S204 to the relevant upload site (S205).

Next, the communication terminal 200 captures an image that includes a participant of an event, during the event, for example (S206).

Next, the communication terminal 200 transmits the captured image and an account for using the relevant upload site to the relevant upload site. Subsequently, the storage unit 2102 of the image processing device 210 stores the captured image transmitted to the relevant upload site (S207).

Next, the person recognition unit 2104 of the image processing device 210 recognizes people included in multiple captured images stored in the storage unit 2102 (S208).

Next, as discussed earlier, the image evaluation unit 2106 evaluates one or more captured image groups extracted from among multiple captured images stored in the storage unit 2102, on the basis of a degree of appearance of each person of interest recognized by the person recognition unit 2104 (S209).

Next, the image selection unit 2108 selects the captured image group having the highest evaluation result from the image evaluation unit 2106. Subsequently, the group image generation unit 2110 combines and arranges the captured images included in the captured image group selected by the image selection unit 2108, and thereby generates a group image (S210).

Next, the communication unit 2100 transmits the generated group image to the communication terminal 200. Subsequently, the communication terminal 200 displays the received group image (S211).

Next, the service information decision unit 2114 decides service information to provide to the user of the communication terminal 200, according to the number of captured images transmitted from the communication terminal 200 to the upload site, for example. Subsequently, the communication unit 2100 transmits the decided service information to the communication terminal 200 (S212). Note that the operation in S212 may also be omitted.

The above thus describes operation according to the second embodiment, but operation is not limited to the operation discussed above. For example, if the relevant communication system includes the display device 170, in S211, the communication unit 2100 may also transmit the group image to the display device 170 instead of the communication terminal 200, and the display device 170 may then display the relevant group image.

According to this modification, by having the display device 170 display the relevant group image, many people, such as participants of an event, for example, are able to view the group image together, and there is an advantage in being able to share the circumstances of an even with many people. Also, by displaying a submitted captured image on the display device 170 in the middle of the event, the image processing device 210 is expected to exhibit an advantageous effect of enticing participants of the relevant event to submit more captured images.

[2-5. Advantageous Effects According to Second Embodiment]

As described above, according to the second embodiment, the image processing device 210 recognizes a person included in each of multiple captured images, and evaluates one or more captured image groups extracted from the multiple captured images, on the basis of a degree of appearance of each person of interest recognized by facial recognition technology, for example. Subsequently, the image processing device 210 selects the captured image group with the highest results of the relevant evaluation. For this reason, the image processing device 210 is able to provide useful support when it is desirable to choose some images from among multiple captured images.

For example, the image processing device 210 is able to select a captured image group from among multiple captured images that were captured during an event such as a party so that recognized persons are included as evenly as possible, and generate a group image. For this reason, an event participant may reference the group image generated by the image processing device 210 after the relevant ends, and thereby review the circumstances of the relevant event, such as who participated in the relevant event.

Additionally, from among multiple captured images, the image processing device 210 may highly evaluate a captured image with a higher degree of appearance of a specific person of interest, such as the central person of an event, for example. Subsequently, the image processing device 210 may present a display featuring the specific person of interest, such as by displaying an image containing the specific person of interest in the center of the group image, for example. For this reason, by referencing the relevant group image, an event participant is able to more clearly recall the circumstances of the relevant event.

In addition, the image processing device 210 places, in the group image, a display indicating the number of persons included in at least one of the multiple captured images, or the number of persons who accessed a URL such as a webpage related to the relevant event, for example. For this reason, by referencing the relevant group image after the event ends, a viewer of the group image is able to perceive the excitement or other atmosphere of the event.

In addition, the image processing device 210 may place, in the group image, captured images depicting the interior or exterior of a facility where an event is held, for example. Also, if captured images of the event are captured at night, for example, the image processing device 210 may select and place, in the group image, captured images of the facility where the event is held according to the time when the captured images were captured, such as by selecting captured images depicting the relevant facility at night. Consequently, since the group image may represent the atmosphere of the event in a unified way overall, by referencing the relevant group image, a person referencing the group image is able to more strongly perceive the ambience of the event.

In addition, since an operator of a facility such as a store where an event is held may clearly communicate the atmosphere of the relevant facility by using submitted captured images on a webpage or the like for the relevant facility, the promotional advantages of the webpage or the like may be increased, and an improvement in the profits of the relevant facility may be anticipated.

In addition, the image processing device 210 analyzes the hue of multiple captured images, and selects a theme color of the group image on the basis of the analysis result. For this reason, by referencing the relevant group image, a person referencing the group image is able to more clearly perceive the atmosphere of the event.

In addition, the image processing device 210 decides service information to provide to a user of the communication terminal 200 according to the number of captured images submitted from the communication terminal 200, for example, and transmits the relevant service information to the communication terminal 200. For this reason, since a greater number of coupon points may be given to persons who submit a greater number of captured images, for example, an advantageous effect of enticing event participants to submit more captured images may be anticipated.

<3. Detailed Description of Third Embodiment>

The foregoing thus describes the second embodiment. Next, the third embodiment will be described. First, a problem that the third embodiment attempts to solve will be described. In the past, in order to quickly propagate a QR code (registered trademark) to many people, a method of putting up a poster or the like with the QR code (registered trademark) printed thereon in a prominent place was adopted. However, with the relevant method, printing and putting up posters is burdensome, and the work of a user scanning a QR code (registered trademark) from a poster is inconvenient. Consequently, a simpler method is desirable.

In addition, the technologies described in JP 2012-133735A and JP 2012-064151A are unable to support the clear indication of individual transmission histories of information in association with users. For example, at a place where many participants gather, such as a party venue, a history of how information was transmitted among which users, and in what order, cannot be ascertained.

Thus, focusing on the above circumstances led to the creation of a communication terminal 310 according to the third embodiment. The communication terminal 310 according to the third embodiment is able to support the clear indication of individual transmission histories of information in association with users.

Such a communication terminal 310 according to the third embodiment is provided with:

A. an information acquisition unit 3102 that acquires, from another communication terminal 310, first information that includes connection information for connecting to a communication service and identification information of a user of the other communication terminal 310; and B. an information generation unit 3104 that, on the basis of the first information acquired by the information acquisition unit 3102, generates second information that includes the connection information and identification information of a user of the current terminal.

Also, an information processing device 320 (service management device) according to the third embodiment is provided with:

C. a communication unit 3200 (receiving unit) that receives identification information of a user of a communication terminal 310*a* (first communication terminal) and identification information of a user of a communication terminal 310*b* (second communication terminal) from the communication terminal 310*b*, which is a communication terminal that received the propagation of connection information of a communication service and identification information of a user of the current terminal from the communication terminal 310*a*; and D. a graph generation unit 3202 that generates a social graph that indicates a relationship between the user of the communication terminal 310*a* and the user of the communication terminal 310*b*.

[3-1. Basic Configuration of Communication System]

Figure 30:
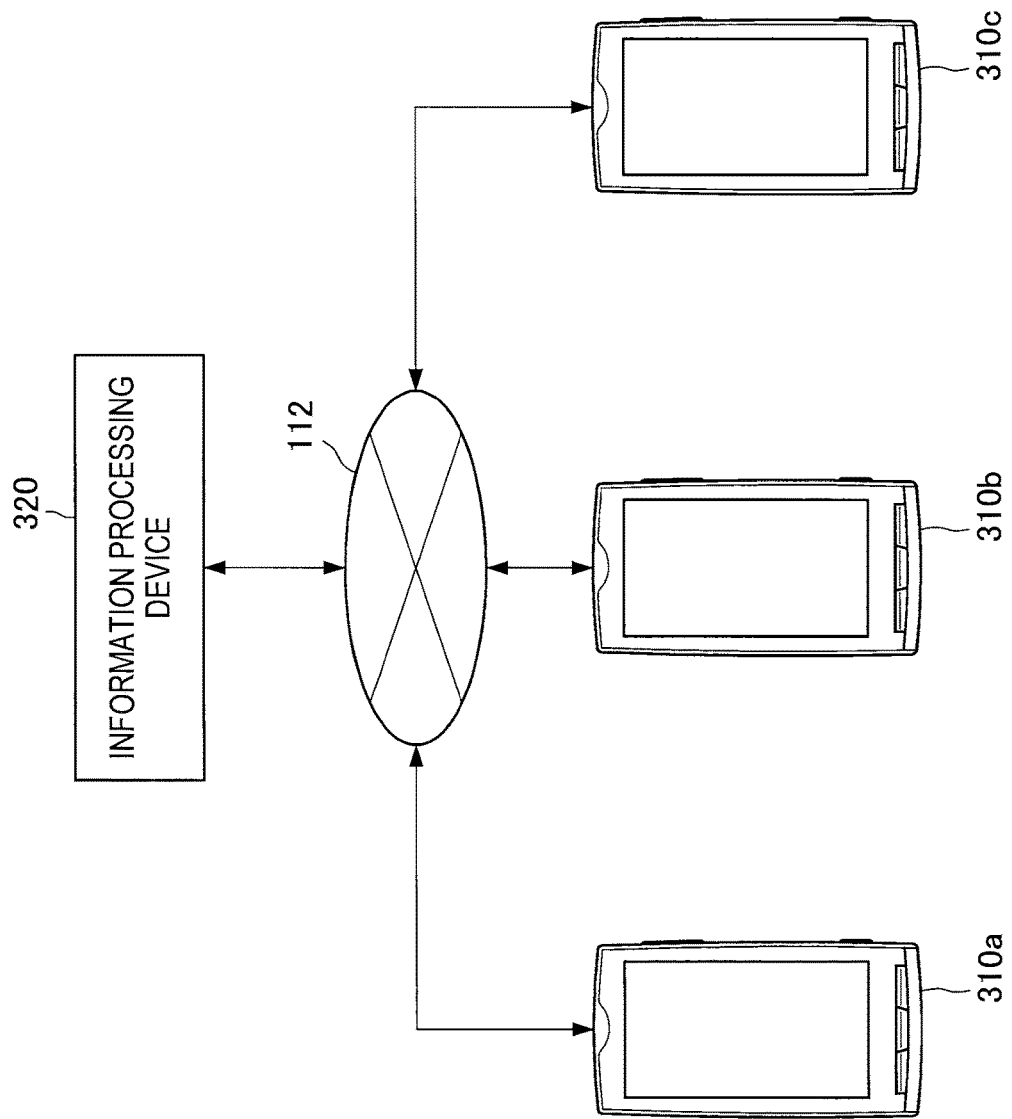
FIG. 30 is an explanatory diagram illustrating a configuration of a communication system according to the third embodiment of the present disclosure.

Hereinafter, first, a basic configuration of such a communication system according to the third embodiment will be described with reference to FIG. 30. As illustrated in FIG. 30, the communication system according to the third embodiment includes a communication terminal 310, a communication network 112, and an information processing device 320. Note that the communication network 112 is similar to the first embodiment.

—Communication Terminal 310—

The communication terminal 310 is a device connectable to the communication network 112. The communication terminal 3100 may be a mobile phone such as a smartphone, a tablet, or a PDA, for example. In addition, the communication terminal 310 may also have a hardware configuration similar to the first communication terminal 110 according to the first embodiment. Also, the communication terminal 310 may furthermore include a short-range wireless communication function, in addition to the hardware configuration according to the first communication terminal 110 discussed earlier.

In addition, the communication terminal 310 may also be a service management device capable of providing a communication service to another communication terminal 310 or the like, for example. Herein, the communication service may be a service for sharing content with another communication terminal, or a content playback service as described in the first embodiment, for example. In addition, the communication terminal 310 may also include the functionality of an access point for connecting another communication terminal 310 or the like to a predetermined wireless LAN via Wi-Fi, for example.

—Information Processing Device 320—

The information processing device 320 is a device connectable to the communication network 112. Also, the information processing device 320 may have a hardware configuration similar to the first communication terminal 110 according to the first embodiment, but may also have differences, such as not including the input device 1160 or the image capture device 1166, for example. In addition, the information processing device 320 may also be a service management device capable of providing a communication service as discussed above to multiple communication terminals 310, for example. Also, the information processing device 320 may be identical to one of the communication terminals 310.

[3-2. Overview of Third Embodiment]

Next, an overview of the third embodiment made up of the communication system discussed above will be described with reference to FIG. 31. Herein, as an example, a case will be described in which respective users possessing a communication terminal 310a to a communication terminal 310d desire to participate in a party, and in addition, the respective users desire to participate in an event held by the communication terminal 310a on a communication service provided by the information processing device 320, for example.

First, the event organizer "A", using the communication terminal 310a in his or her possession, provides first information that includes connection information for connecting to the relevant communication service and the user identification information of "A", such as a QR code (registered trademark), for example, to another party participant "B", who may be a friend of the organizer "A", for example (S31). Next, the relevant person "B", using the communication terminal 310b in his or her possession, scans and acquires the relevant first information from the communication terminal 310a (S32).

Subsequently, the communication terminal 310b connects to the relevant communication service using the connection information included in the acquired first information, and transmits the user identification information of "A" and the user identification information of "B" to the information processing device 320. Subsequently, the information processing device 320 generates a social graph indicating a relationship between "A" and "B".

Next, the communication terminal 310b, on the basis of the acquired first information, generates second information that includes the relevant connection information and the user identification information of "B", such as a QR code (registered trademark), for example. Subsequently, the relevant person "B" uses the communication terminal 310b to provide the relevant second information to other party participants "C" and "D", for example.

Next, the relevant persons "C" and "D", using the communication terminal 310c and the communication terminal 310d in their respective possession, scan and acquire the relevant second information from the communication terminal 310b.

Figure 31:
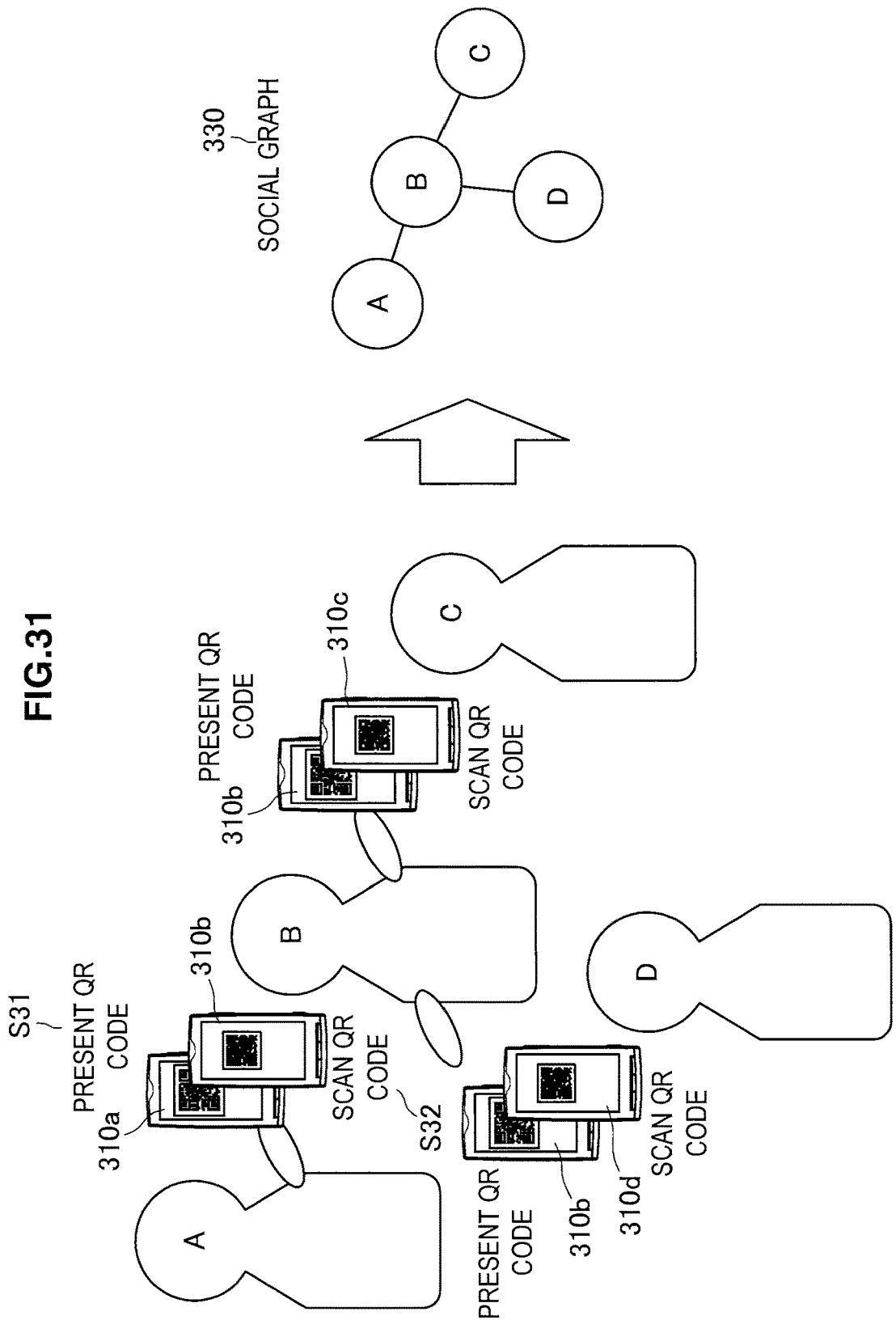
FIG. 31 is an explanatory diagram illustrating an overview of the same embodiment.

Subsequently, the communication terminal 310c and the communication terminal 310d respectively connect to the relevant communication service using the connection information included in the acquired second information, and transmit the user identification information of "B" and their own user identification information to the information processing device 320. Next, the information processing device 320 adds, to the generated social graph, a social graph indicating a relationship between "B" and "C", and a social graph indicating a relationship between "B" and "D". Note that the social graph 330 illustrated on the right side of FIG. 31 is the final social graph updated by the above process.

As discussed above, according to the third embodiment, the communication terminal 310b acquires, from another communication terminal 310a, first information that includes connection information for connecting to a communication service and identification information of a user of the other communication terminal 310a. Also, the communication terminal 310b, on the basis of the acquired first information, generates second information that includes the relevant connection information and identification information of the user of the current terminal itself. For this reason, the communication terminal 310b is able to acquire the relevant connection information in association with identification information of the user of the other communication terminal 310a from the other communication terminal communication terminal 310a, and propagate the relevant connection information in association with identification information of the user of the communication terminal 310b to another communication terminal 310c. Consequently, it is possible to support the clear indication of individual transmission histories of information in association with users, in a format such as the social graph 330, for example.

[3-3. Configuration According to Third Embodiment]

(3-3-1. Communication Terminal 310)

Figure 32:
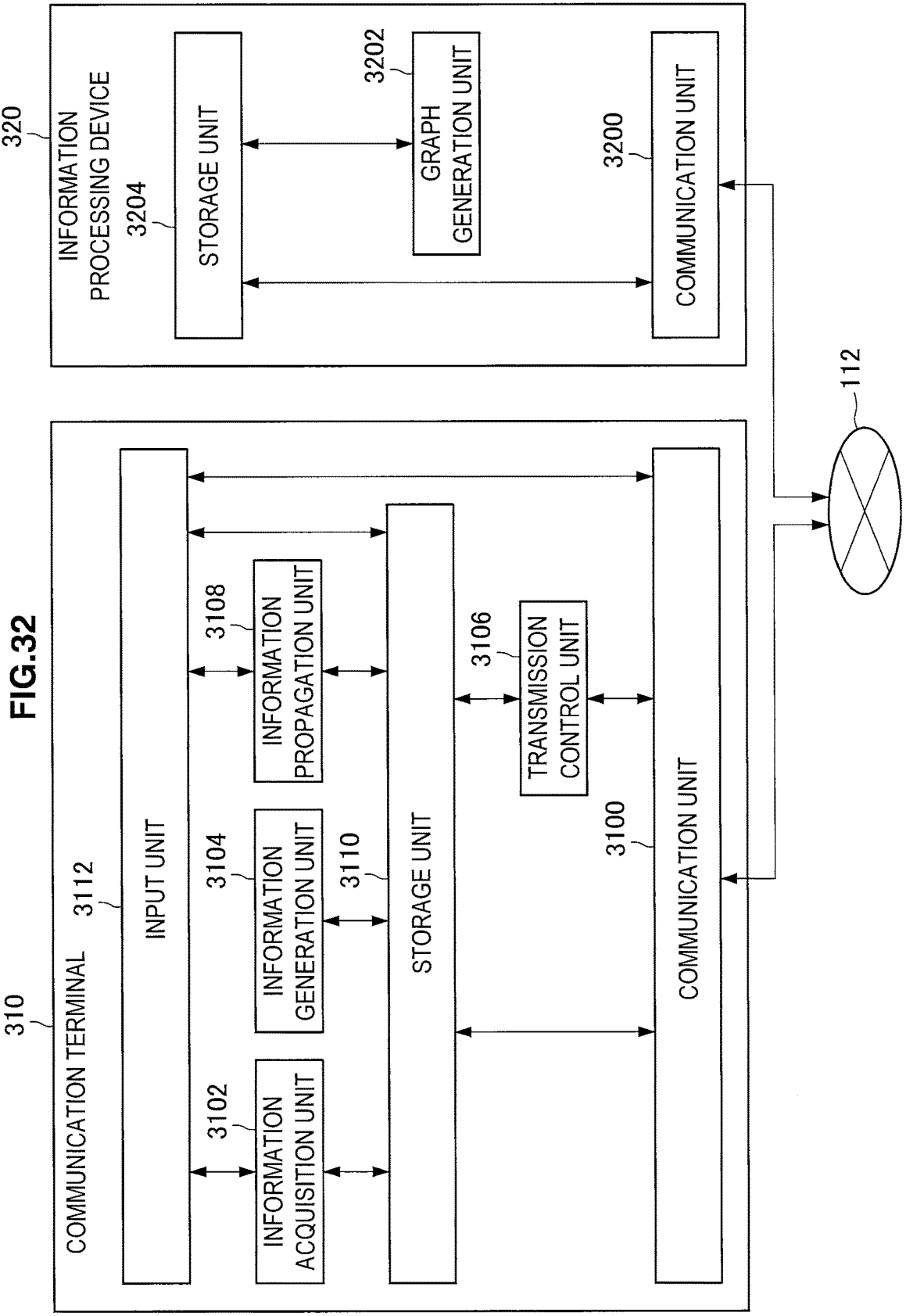
FIG. 32 is a function block diagram illustrating a configuration of a communication terminal and an image processing device according to the same embodiment.

The foregoing thus describes an overview of the third embodiment. Next, a configuration according to the third embodiment will be described in detail. FIG. 32 is a function block diagram illustrating a configuration of a communication terminal 310 and an information processing device 320 according to the third embodiment. As illustrated in FIG. 32, the communication terminal 310 according to the third embodiment includes a communication unit 3100, an information acquisition unit 3102, an information generation unit 3104, a transmission control unit 3106, an information propagation unit 3108, a storage unit 3110, and an input unit 3112.

The communication unit 3100 transmits and receives various information to and from the information processing device 320 via the communication network 112. For example, the communication unit 3100 transmits identification information of a user of another communication terminal 310, which is the source from which the information acquisition unit 3102 discussed later acquires the first information, in association with identification information of the user of the current terminal, to the information processing device 320.

The information acquisition unit 3102 acquires, from another communication terminal 310, first information that includes connection information for connecting to a communication service and identification information of a user of the relevant other communication terminal 310. Herein, the connection information may include address information of a service management device that manages the relevant communication service, such as another communication terminal 310 or the information processing device 320, for example, and identification information of the relevant communication service. In addition, the connection information may also include an identifier of a predetermined access point connected to the relevant communication service, such as another communication terminal 310, for example, and authentication information for connecting to the predetermined access point. Additionally, the first information may also be an information code such as a QR code (registered trademark) or a barcode, for example.

Also, if the first information is an information code, the information acquisition unit 3102 may also acquire first information displayed on another communication terminal 310 via image capture. In addition, the information acquisition unit 3102 may also acquire the first information from another communication terminal 310 via short-range wireless communication.

The information generation unit 3104, on the basis of the first information acquired by the information acquisition unit 3102, generates second information that includes the connection information discussed above and identification information of the user of the current terminal. Herein, the second information may also be an information code such as a QR code (registered trademark) or a barcode, for example.

The transmission control unit 3106 causes the communication unit 3100 to transmit the identification information of the user of another communication terminal 310 and the identification information of the user of the current terminal to the service management device discussed above. In addition, the transmission control unit 3106 may also cause the communication unit 3100 to transmit the identification information of the user of another communication terminal 310 and the identification information of the user of the current terminal immediately after the information acquisition unit 3102 acquires the first information, for example.

The information propagation unit 3108 propagates second information generated by the information generation unit 3104 to another communication terminal 310. Also, if the second information is an information code, the information propagation unit 3108 may also propagate the second information by displaying the second information on the communication terminal 310, for example. In addition, the information propagation unit 3108 may also propagate the second information to another communication terminal 310 via short-range wireless communication.

The storage unit 3110 stores various information such as first information acquired by the information acquisition unit 3102, and various software such as software for controlling the operation of the communication terminal 310, for example.

The input unit 3112 receives various operations from the user. For example, the input unit 3112 receives operations such as an instruction operation to acquire first information with the information acquisition unit 3102, and an instruction operation to propagate second information with the information propagation unit 3108.

Note that, according to the third embodiment, it is also possible to provide a computer program causing hardware such as a CPU, ROM, and RAM built into the communication terminal 310 to exhibit the same functionality as the respective components of the communication terminal 310 discussed above. Also, a storage medium having such a computer program stored therein is also provided.

The above thus describes a configuration of the communication terminal 310 according to the third embodiment, but the configuration is not limited to the configuration discussed above. For example, one or more of any of the communication unit 3100, the transmission control unit 3106, the information propagation unit 3108, the storage unit 3110, and the input unit 3112 may be provided in another device. In addition, functions similar to the structural elements of the information processing device 320 discussed later may also be included in the communication terminal 310.

(3-3-2. Information Processing Device 320)

Also, as illustrated in FIG. 32, a information processing device 320 according to the third embodiment includes a communication unit 3200, a graph generation unit 3202, and a storage unit 3204.

The communication unit 3200 transmits and receives various information to and from the communication terminal 310 via the communication network 112. For example, the communication unit 3200 receives identification information of the user of a communication terminal 310*a* and identification information of the user of a communication terminal 310*b* from a communication terminal 310*b*, which is a communication terminal that received the propagation of first information from the communication terminal 310*a*.

The graph generation unit 3202 generates a social graph indicating a relationship between the user of the communication terminal 310*a* (first communication terminal) and the user of the communication terminal 310*b* (second communication terminal) received by the communication unit 3200. In addition, if the communication unit 3200 receives identification information of the user of the communication terminal 310*b* and identification information of the user of a communication terminal 310*c* (third communication terminal) from the communication terminal 310*c*, which is a communication terminal that received the propagation of first information from the communication terminal 310*b*, the graph generation unit 3202 may also add, to the above social graph, a graph indicating a relationship between the user of the communication terminal 310*b* and the user of the communication terminal 310*c*.

The storage unit 3204 stores various software, such as software for controlling the operation of the information processing device 320, for example. In addition, the storage unit 3204 associates and records the identification information of the user of the other communication terminal 310*a*, which is the propagation source of the first information, and the identification information of the user of the communication terminal 310*b*, which were received from the communication terminal 310*b*, in a propagation information table 322 as illustrated in FIG. 33, for example, and additionally stores the propagation information table 322.

At this point, an example of the configuration of the propagation information table 322 will be described with reference to FIG. 33. As illustrated in FIG. 33, in the propagation information table 322, a connecting person ID column 3220, a propagation source ID column 3222, and a propagation destination ID column 3224 are recorded in association with each other. For example, the data illustrated on the third row of FIG. 33 indicates that the communication unit 3200 received, from a communication terminal 310b whose user has the identification information "B", "A" as identification information of the user of another communication terminal 310a, which is the propagation source of the first information. Also, the relevant data indicates that the communication unit 3200 received, from a communication terminal 310d whose user has the identification information "D", the fact that second information generated by the communication terminal 310b was propagated to the relevant communication terminal 310d.

The above thus describes a configuration of an information processing device 320 according to the third embodiment, but the configuration is not limited to the configuration discussed above. For example, the storage unit 3204 may also be provided in another device.

[3-4. Operation According to Third Embodiment]

Figure 34:
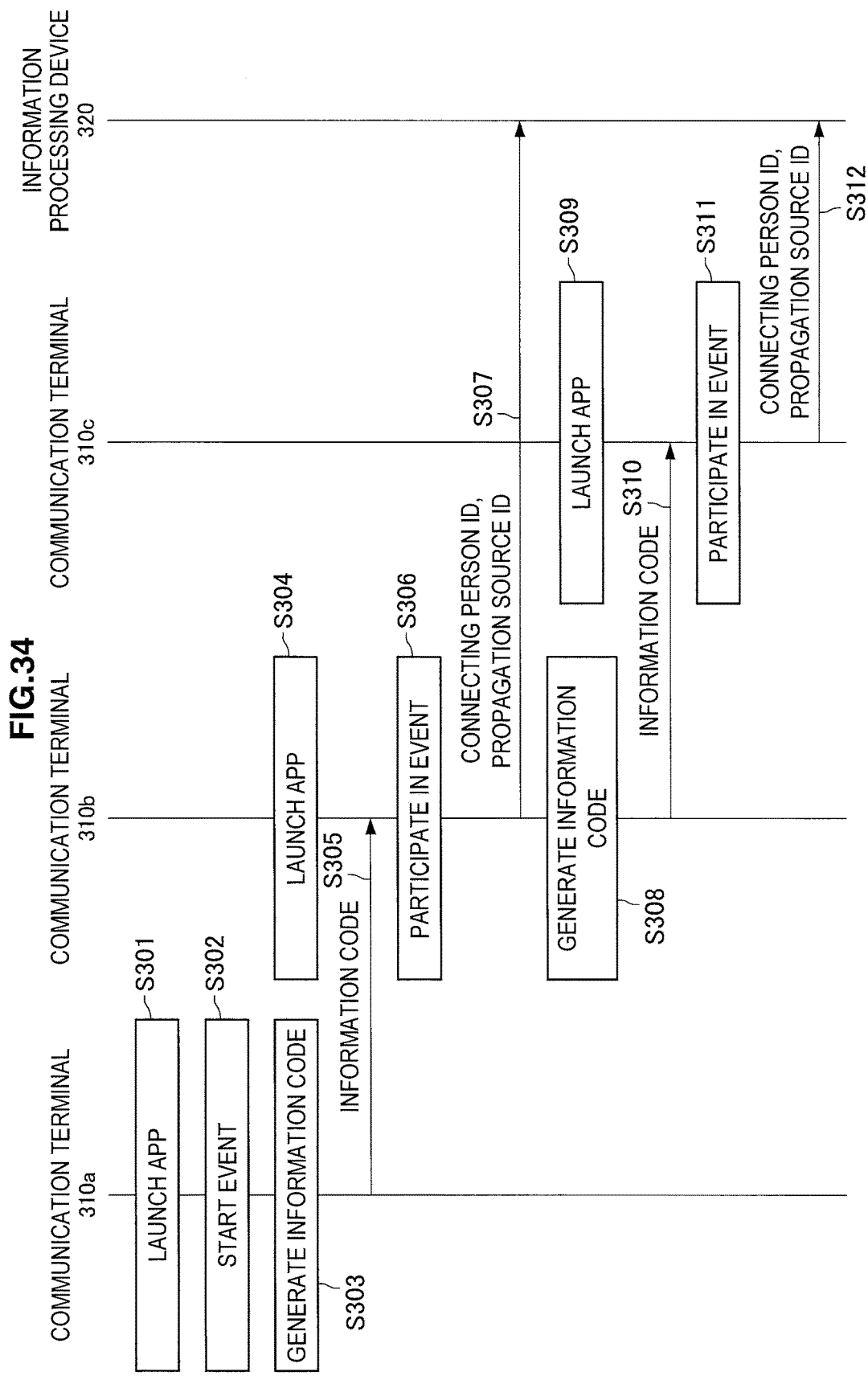
FIG. 34 is a sequence diagram illustrating operation according to the same embodiment.

The above thus describes a configuration according to the third embodiment. Next, operation according to the third embodiment will be described. FIG. 34 is a sequence diagram illustrating operation according to the third embodiment.

As illustrated in FIG. 34, first, in response to a user operation on the input unit 3112, the communication terminal 310a activates an application for using a relevant communication service downloaded in advance (S301). Subsequently, in response to a user operation on the input unit 3112, the communication terminal 310a holds an event on the relevant communication service (S302).

Next, the information generation unit 3104 of the communication terminal 310a generates first information that includes connection information for connecting to the relevant communication service and identification information of the user of the communication terminal 310a (S303). Note that the first information may also be an information code such as a QR code (registered trademark), for example.

Figure 35:
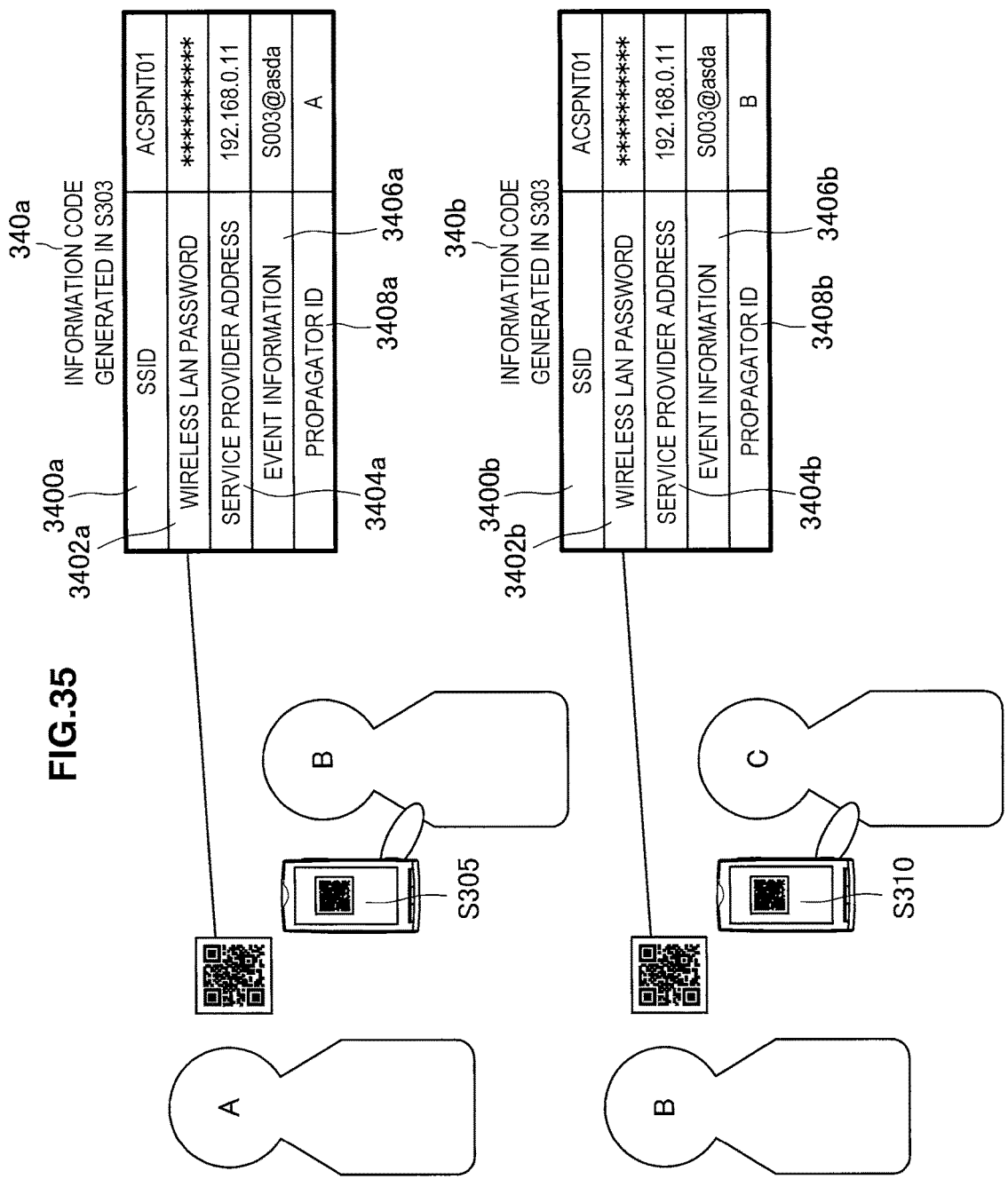
FIG. 35 is an explanatory diagram illustrating an example of data registered in an information code according to the same embodiment.

At this point, an example of data included in the first information generated in S303 (information code 340a) will be described with reference to FIG. 35. As illustrated in FIG. 35, the information code 340a includes, as the connection information, an SSID 3400a, a wireless LAN password 3402a, a service provider address 3404a, and event information 3406a. Additionally, the information code 340a includes a propagator ID 3408a. For example, the information code 340a illustrated in FIG. 35 indicates that "ACSPNT01" is included as the ID (SSID) of an access point on a wireless LAN, "192.168.0.11" as the IP address of the service provider, "5003@asda" as the event information, which is an identifier of the relevant event, for example, and "A" as identification information of the user of the communication terminal 310 that generated the relevant information code 340a.

Next, a communication terminal 310b, which is a different communication terminal from the communication terminal 310a, activates an application for using a relevant communication service downloaded in advance, in response to a user operation on the input unit 3112 (S304).

Next, the information acquisition unit 3102 of the communication terminal 310b acquires the first information from the communication terminal 310a (S305). At this point, if the first information is an information code, the information propagation unit 3108 of the communication terminal 310a may display the first information on the communication terminal 310a, for example, and the information acquisition unit 3102 of the communication terminal 310b may acquire the displayed first information via image capture.

Next, in response to a user operation on the input unit 3112, the communication unit 3100 of the communication terminal 310b connects to the relevant communication service on the basis of the connection information included in the acquired first information. Subsequently, in response to a user operation on the input unit 3112, the communication terminal 310b participates in the event held by the communication terminal 310a on the relevant communication service (S306).

Next, the communication unit 3100 of the communication terminal 310b transmits identification information of the user of the communication terminal 310a, which is the source from which the information acquisition unit 3102 acquired the first information, in association with identification information of the user of the current terminal, to the information processing device 320. Subsequently, the graph generation unit 3202 of the information processing device 320 generates a social graph that indicates a relationship between the user of the communication terminal 310a and the user of the communication terminal 310b (S307).

Next, the information generation unit 3104 of the communication terminal 310b, on the basis of the first information acquired by the information acquisition unit 3102, generates second information that includes the relevant connection information and identification information of the user of the communication terminal 310b (S308). Note that the first information may also be an information code such as a QR code (registered trademark), for example.

At this point, an example of data included in the second information generated in S308 (information code 340b) will be described with reference to FIG. 35. As illustrated in FIG. 35, the information code 340b may include information similar to the connection information included in the information code 340a as connection information, for example. Also, the propagator ID 3408b includes "B", which is identification information of a user related to the communication terminal 310 that generated the relevant information code 340b.

Next, a communication terminal 310c, which is a different communication terminal from the communication terminal 310a and the communication terminal 310b, activates an application for using a relevant communication service downloaded in advance, in response to a user operation on the input unit 3112 (S309).

Next, the information acquisition unit 3102 of the communication terminal 310c acquires the second information from the communication terminal 310b (S310). At this point, if the second information is an information code, the information propagation unit 3108 of the communication terminal 310b may display the second information on the communication terminal 310b, for example, and the information acquisition unit 3102 of the communication terminal 310c may acquire the displayed second information via image capture.

Next, in response to a user operation on the input unit 3112, the communication unit 3100 of the communication terminal 310c connects to the relevant communication service on the basis of the connection information included in the acquired second information. Subsequently, in response to a user operation on the input unit 3112, the communication terminal 310c participates in the event held by the communication terminal 310a on the relevant communication service (S311).

Next, the communication unit 3100 of the communication terminal 310c transmits identification information of the user of the communication terminal 310b, which is the source from which the information acquisition unit 3102 acquired the second information, in association with identification information of the user of the current terminal, to the information processing device 320. Subsequently, the graph generation unit 3202 of the information processing device 320 adds, to the social graph generated in S307, a graph that indicates a relationship between the user of the communication terminal 310*b* and the user of the communication terminal 310*c* (S312).

The above thus describes operation according to the third embodiment, but operation is not limited to the operation discussed above. For example, the operation in S308 may also be conducted between S305 and S306. As another example, if the communication terminal 310*a* additionally includes the functionality of the information processing device 320, in S307 and S312, the communication terminal 310*b* and the communication terminal 310*c* may also transmit the user identification information discussed above to the communication terminal 310*a* instead of the information processing device 320.

[3-5. Advantageous Effects According to Third Embodiment]

As described above, according to the third embodiment, the communication terminal 310*b* acquires, from another communication terminal 310*a*, first information that includes connection information for connecting to a communication service and identification information of a user of the other communication terminal 310*a*. Also, the communication terminal 310*b*, on the basis of the acquired first information, generates second information that includes the relevant connection information and identification information of the user of the current terminal itself. For this reason, the communication terminal 310*b* is able to acquire the relevant connection information in association with identification information of the user of the other communication terminal 310*a* from another communication terminal, and propagate the relevant connection information in association with identification information of the user of the communication terminal 310*b* to another communication terminal 310*c*. Consequently, it is possible to support the clear indication of individual transmission histories of information in association with users, in a format such as the social graph 330, for example.

Also, the communication terminal 310 transmits identification information of a user of the communication terminal 310 that is the propagation source of the first information, and identification information of the user of the current terminal to the information processing device 320, either at the same time or immediately after connecting to a communication service on the basis of the first information acquired from another communication terminal 310. For this reason, the information processing device 320 is able to generate and update a social graph dynamically according to connections to the communication service by the communication terminals 310, and thus individual transmission histories of information may be visualized dynamically.

Also, the user of the communication terminal 310 may acquire a social graph generated by the information processing device 320 from the information processing device 320 after an event ends, for example, and thereby an overview of event participants, or utilize the social graph as reference data for estimating relationships among participants.

Also, if the first information is an information code, the communication terminal 310 acquires first information displayed on another communication terminal 310 via image capture. For this reason, the user of the communication terminal 310 is able to capture an image of the information code more quickly and easily compared to the case of capturing an image of an information code printed on paper, such as a poster, for example.

Also, as a general rule, the communication terminal 310 propagates second information that includes only connection information for connecting to the communication service and identification information of the identification information of the current terminal to another communication terminal 310. For this reason, since important information such as personal information is not shared between communication terminals 310, there is almost no risk of important information being leaked or used without authorization.

In addition, if a communication terminal 310 does not acquire first information from another communication terminal 310, that communication terminal 310 is unable to connect to the relevant communication service as a general rule. For this reason, a person who is ineligible to join the communication service is unable to connect to the relevant communication service, for example, and thus a highly secure communication service may be realized.

<4. Detailed Description of Fourth Embodiment>

The foregoing thus describes the third embodiment. Next, the fourth embodiment will be described. First, a problem that the fourth embodiment attempts to solve will be described. In the past, services for sharing photos and data have been developed, but such sharing services always require users to go through user registration, and also log into the relevant sharing service with a username and password pair. For this reason, a user is burdened with the above work of registration and login, and also becomes unable to login if the user forgets his or her password. Particularly, for applications in which the user wants to "share data just this time", the above work of registration and login may impose a large burden on the user in some cases.

In addition, the technologies described in JP 2012-133735A and JP 2012-064151A are unable to adequately support the reviewing of usage details for a communication service after the relevant communication service ends, and for example, are unable to support the reviewing of details of usage on a communication service temporarily provided at a party venue or the like after the relevant communication service ends.

Thus, focusing on the above circumstances led to the creation of a first communication terminal 410 (communication terminal) according to the fourth embodiment. The first communication terminal 410 according to the fourth embodiment is able to support the reviewing of usage details for a communication service after the relevant communication service ends.

Such a first communication terminal 410 according to the fourth embodiment is provided with:

A. a communication unit 4100 (acquisition unit) that acquires service identification information associated with a communication service from an information processing device 430 that manages shared content;

B. a user identification information issuing unit 4102 that issues service user identification information associated with the service identification information to a second communication terminal 420 (other communication terminal); and C. a transmission control unit 4104 that causes the communication unit 4100 to transmit the service identification information, and the service user identification information issued by the user identification information issuing unit 4102, to the information processing device 430.

Also, a second communication terminal 420 (communication terminal) according to the fourth embodiment is provided with:

D. a service usage request unit 4202 that requests usage of a communication service from a first communication terminal 410 (other communication terminal);

E. a communication unit 4200 (receiving unit) that receives, from the first communication terminal 410, service identification information of the communication service and service user identification information associated with the service identification information; and F. a transmission control unit 4204 that causes the communication unit 4200 to transmit meta-information corresponding to content stored in the current terminal to the first communication terminal 410.

[4-1. Basic Configuration of Communication System]

Figure 36:
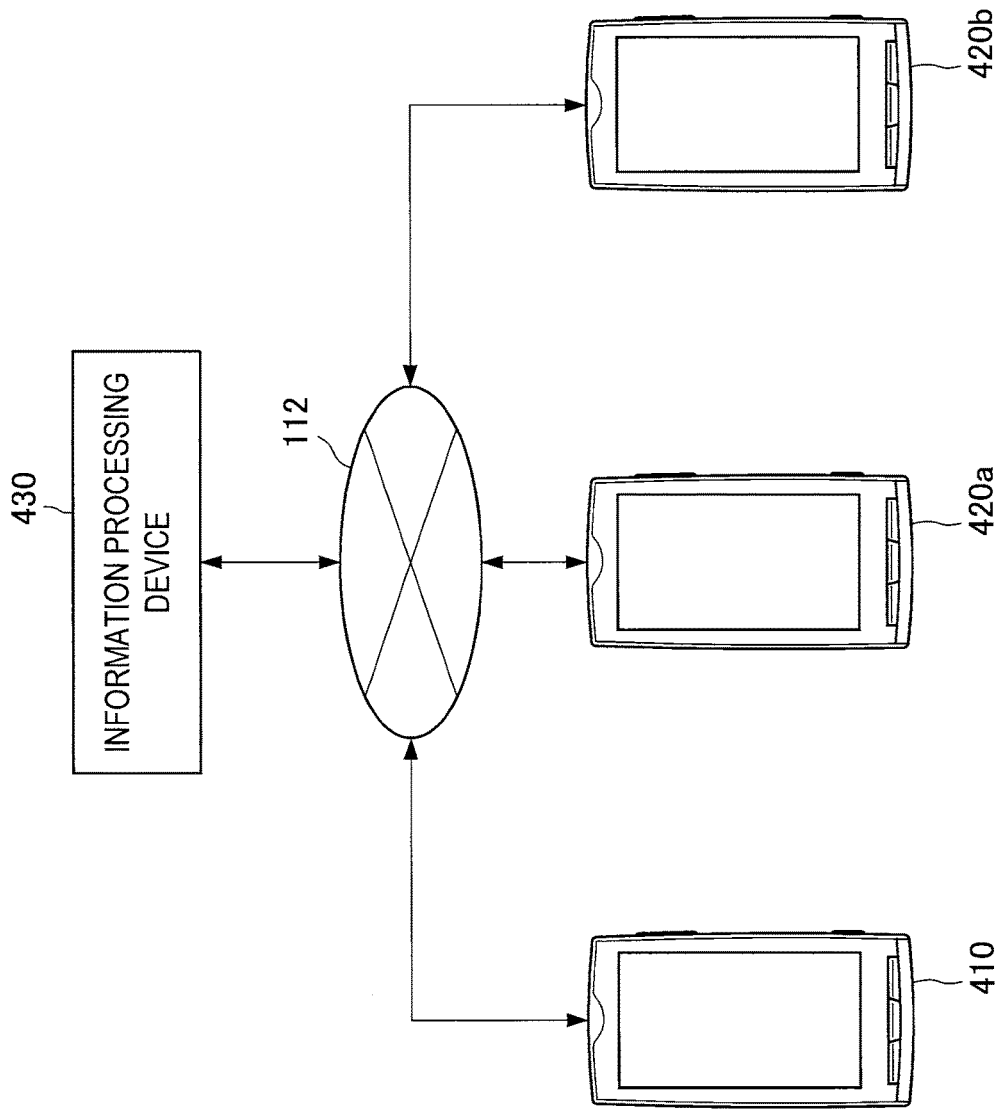
FIG. 36 is an explanatory diagram illustrating a configuration of a communication system according to the fourth embodiment of the present disclosure.

Hereinafter, first, a basic configuration of a such a communication system according to the fourth embodiment will be described with reference to FIG. 36. As illustrated in FIG. 36, the communication system according to the fourth embodiment includes a first communication terminal 410, a second communication terminal 420, a communication network 112, and an information processing device 430. Note that the communication network 112 is similar to the first embodiment.

—First Communication Terminal 410—

The first communication terminal 410 is a communication terminal connectable to the communication network 112. The first communication terminal 410 may be a mobile phone such as a smartphone, a tablet, a tablet personal computer (PC), a PDA, a digital still camera, a digital video camera, or a game console, for example. In addition, the first communication terminal 410 may also have a hardware configuration similar to the first communication terminal 110 according to the first embodiment. In addition, the first communication terminal 410 may also include the functionality of an access point for connecting the second communication terminal 420 or the like to a predetermined wireless LAN via Wi-Fi, for example.

—Second Communication Terminal 420—

The second communication terminal 420 is a communication terminal connectable to the communication network 112. The second communication terminal 420 may be a mobile phone such as a smartphone, a tablet, a laptop PC, a PDA, a digital still camera, a digital video camera, or a game console, for example. In addition, the first communication terminal 410 may also have a hardware configuration similar to the first communication terminal 110 according to the first embodiment.

—Information Processing Device 430—

The information processing device 430 is a device that manages content shared between the first communication terminal 410 and the second communication terminal 420. Also, the information processing device 320 may have a hardware configuration similar to the first communication terminal 110 according to the first embodiment, but may also have differences, such as not including the input device 1160 or the image capture device 1166, for example.

[4-2. Overview of Fourth Embodiment]

Figure 37:
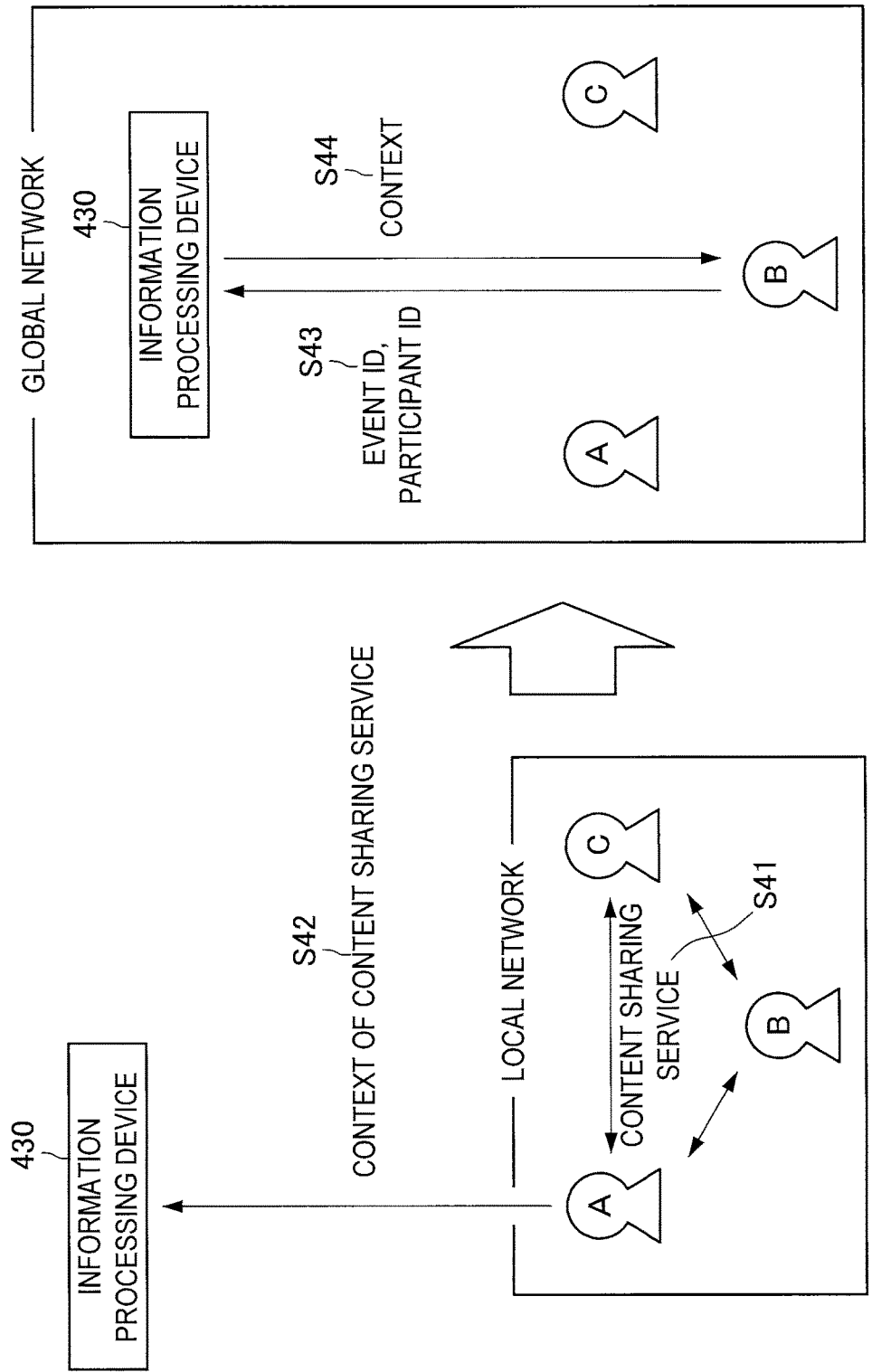
FIG. 37 is an explanatory diagram illustrating an overview of the same embodiment.

Next, an overview of the fourth embodiment made up of the communication system discussed above will be described with reference to FIG. 37. Herein, an example will be described in which, on a local network provided by a predetermined access point such as the first communication terminal 410, for example, a person A possessing the first communication terminal 410 desires to organize a content sharing service, and in addition, a person B and a person C possessing the second communication terminal 420 desire to participant in the relevant content sharing service.

In such a situation, first, the first communication terminal 410 acquires service identification information associated with the relevant content sharing service from the information processing device 430 installed outside of the relevant local network, for example. Next, the first communication terminal 410 uses the acquired service identification information to organize a content sharing service on the relevant local network. Subsequently, the first communication terminal 410 issues service user identification information associated with the relevant service identification information to the persons B and C possessing the second communication terminal 420 who desire to participate in the relevant content sharing service. Different service user identification information is issued per person.

Next, the relevant content sharing service is used among the three persons A, B, and C, and content such as captured images respectively owned by each person is shared, for example (S41).

Next, when the relevant content sharing service ends, for example, the first communication terminal 410 transmits the relevant service identification information, a list of service user identification information issued to the second communication terminal 420, and context of the relevant content sharing service, such as a captured image, for example, to the information processing device 430 (S42). After that, the first communication terminal 410 ends the relevant content sharing service. Note that the information processing device 430 may provide a service (hereinafter designated the parent service) that stores usage details such as the context of the relevant content sharing service.

Next, the second communication terminal 420 possessed by the person B, after separating from the relevant local network, for example, transmits the relevant service identification information and the service user identification information issued by the first communication terminal 410 to the information processing device 430 via the communication network 112, for the purpose of reviewing the above context of the content sharing service (S43).

After that, if the information processing device 430 confirms that the person B is a user of the relevant content sharing service by matching the information received in S42, the information processing device 430 permits the second communication terminal 420 possessed by the person B to reference the relevant context and the like, for example (S44).

As discussed above, according to the fourth embodiment, the first communication terminal 410 acquires service identification information associated with a communication service from a information processing device 430 that manages shared content, and issues service user identification information associated with the relevant service identification information to the second communication terminal 420. Subsequently, the first communication terminal 410 transmits the relevant service identification information, and the service user identification information issued to the second communication terminal 420, to the information processing device 430. For this reason, a user of the second communication terminal 420 may transmit the relevant service identification information and the service user identification information issued by the first communication terminal 410 to the information processing device 430 via the communication network 112, thereby enabling the information processing device 430 to ensure the identity of a user of the relevant communication service even after the communication service ends. Consequently, the first communication terminal 410 is able to support the maintaining of connections made between users on the relevant communication service, even after the relevant communication service ends.

[4-3. Configuration According to Fourth Embodiment]

(4-3-1. First Communication Terminal 410)

Figure 38:
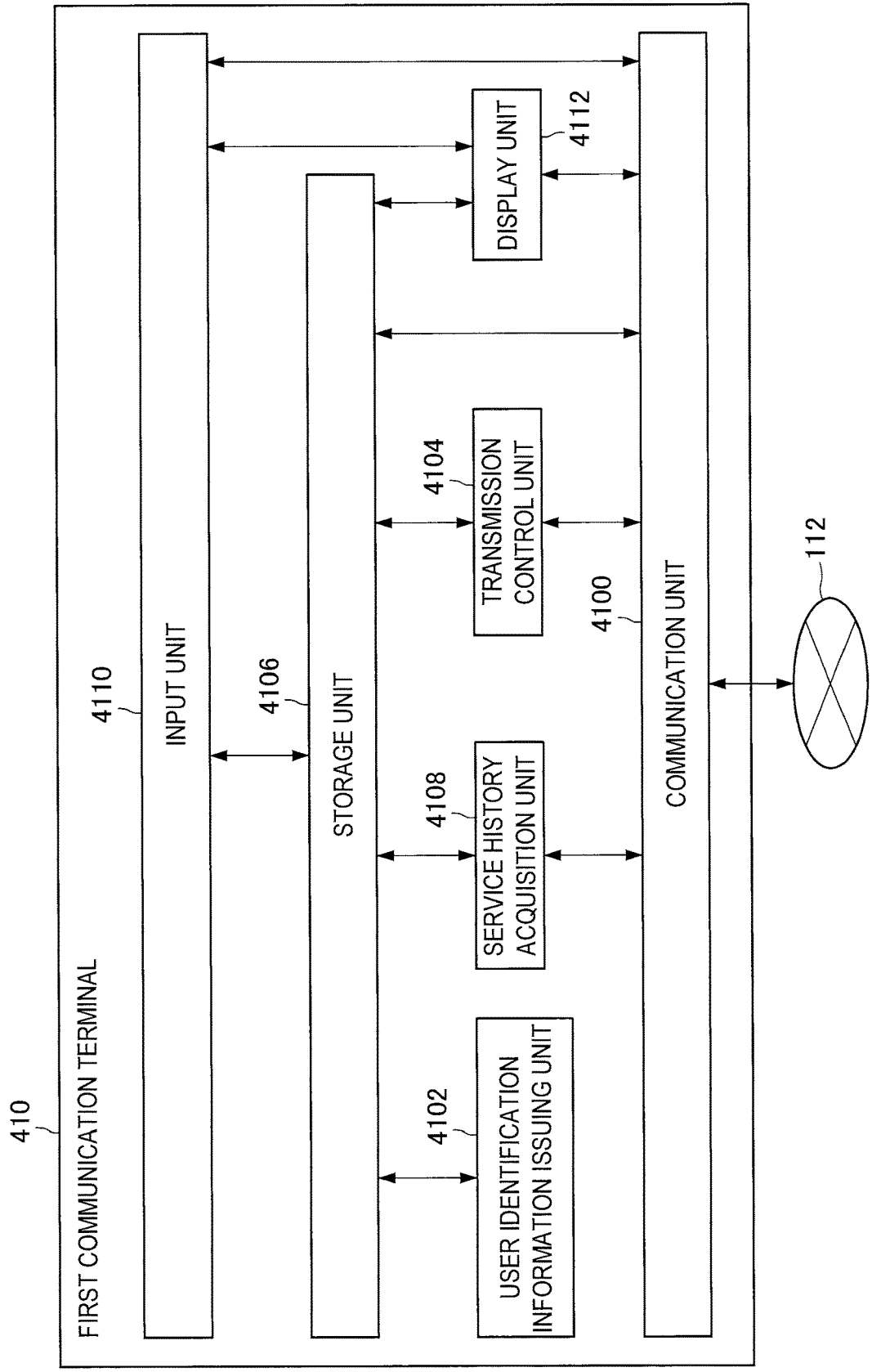
FIG. 38 is a function block diagram illustrating a configuration of a first communication terminal according to the same embodiment.

The foregoing thus describes an overview of the fourth embodiment. Next, a configuration according to the fourth embodiment will be described in detail. FIG. 38 is a function block diagram illustrating a configuration of the first communication terminal 410 according to the fourth embodiment. As illustrated in FIG. 38, the first communication terminal 410 according to the fourth embodiment includes a communication unit 4100 (acquisition unit), a user identification information issuing unit 4102, a transmission control unit 4104, a storage unit 4106, a service history acquisition unit 4108, an input unit 4110, and a display unit 4112.

The communication unit 4100 transmits and receives various information to and from the second communication terminal 420 and the information processing device 430 via the communication network 112. For example, the communication unit 4100 receives service identification information associated with a communication service from the information processing device 430. Herein, the communication service is a service for sharing content, for example. Also, the content may be text information, music, or images, for example.

In addition, the communication unit 4100 receives, from the second communication terminal 420, meta-information corresponding to content stored in the relevant second communication terminal 420, and service user identification information issued to the relevant second communication terminal 420. In addition, the communication unit 4100 receives, from the second communication terminal 420, a provision request for service user identification information corresponding to meta-information stored in the storage unit 4106 discussed later. In addition, the communication unit 4100, under control by the transmission control unit 4104 discussed later, transmits received service identification information to the second communication terminal 420.

The user identification information issuing unit 4102 issues service user identification information associated with received service identification information to the second communication terminal 420. In addition, the user identification information issuing unit 4102 may additionally issue the above service user identification information to the first communication terminal 410.

The transmission control unit 4104 causes the communication unit 4100 to transmit the receiver service identification information, and the service user identification information issued by the user identification information issuing unit 4102, to the information processing device 430. In addition, the transmission control unit 4104 may also cause the communication unit 4100 to transmit the above service identification information to the second communication terminal 420. In addition, if the provision request discussed above is received from the second communication terminal 420, the transmission control unit 4104 may also cause the communication unit 4100 to transmit service user identification information corresponding to meta-information specified by the relevant provision request to the second communication terminal 420. In addition, the transmission control unit 4104 may also cause the communication unit 4100 to transmit meta-information stored in the storage unit 4106 discussed later, and service user identification information corresponding to the relevant meta-information, to the information processing device 430. Note that the functions of the transmission control unit 4104 discussed above will be described later in detail.

The storage unit 4106 stores meta-information received from the second communication terminal 420 and service user identification information issued to the relevant second communication terminal 420 in association with each other, for example. In addition, the storage unit 4106 may also store meta-information corresponding to content stored in the storage unit 4106 and service user identification information issued to the first communication terminal 410 in association with each other. In addition, if the transmission control unit 4104 causes the communication unit 4100 to transmit the above meta-information and the above service user identification information to the information processing device 430, the storage unit 4106 may delete the relevant meta-information and the relevant service user identification information stored in the storage unit 4106.

The service history acquisition unit 4108 acquires, from the information processing device 430, meta-information stored in the information processing device 430 and service user identification information corresponding to the relevant meta-information.

The input unit 4110 receives various operations from the user. For example, the input unit 4110 receives a user operation that activates an application for using a communication service.

The display unit 4112 displays various display screens, such as a display screen generated by an application for using a communication service, such as a content sharing service, for example.

Figure 40:
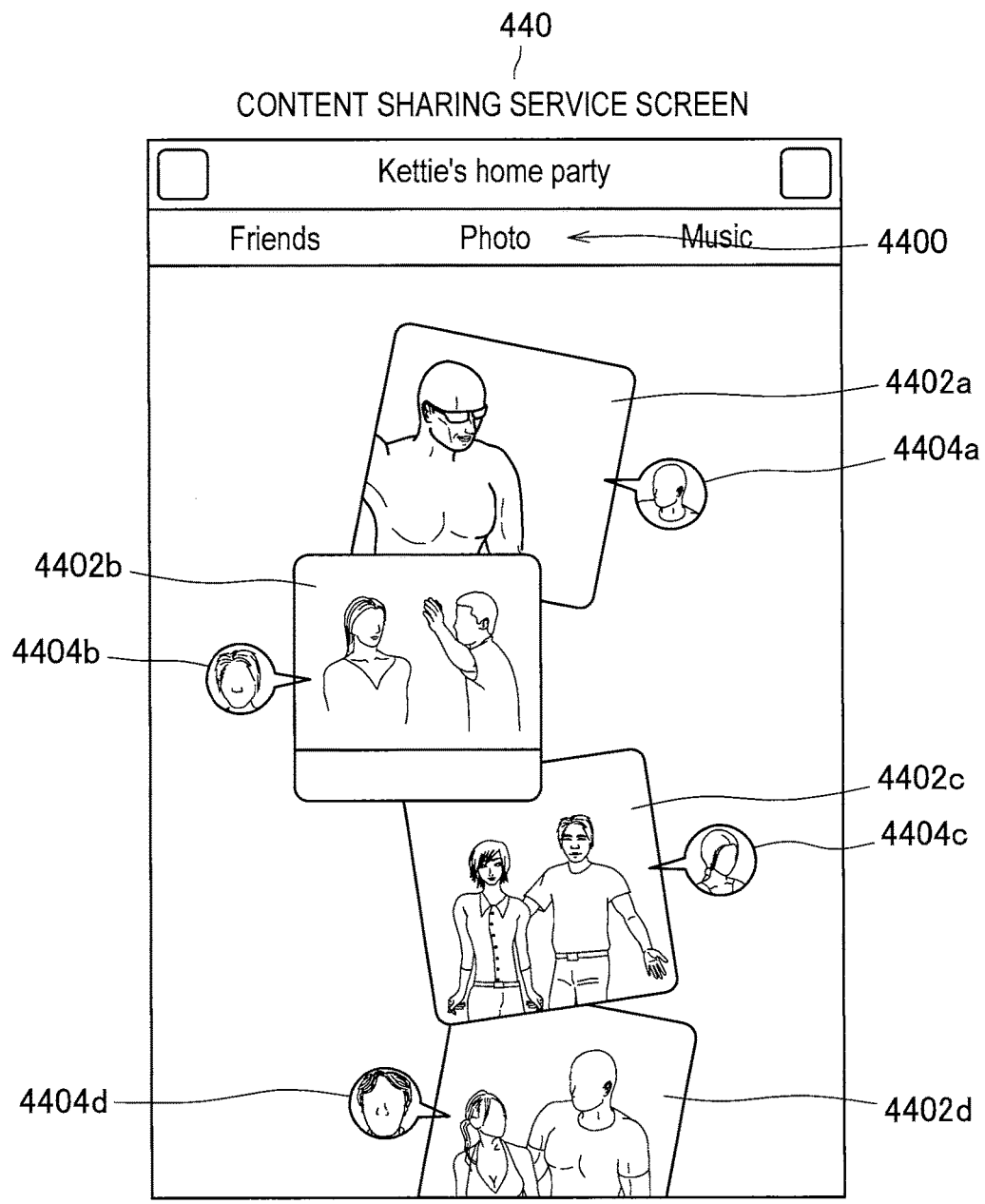
FIG. 40 is an explanatory diagram illustrating an example of a configuration of a content sharing service screen according to the same embodiment.

At this point, FIG. 40 will be referenced to describe an example of a display screen from an application for using a content sharing service (content sharing service screen 440). As illustrated in FIG. 40, the content sharing service screen 440 includes a display screen selection button 4400, a content display field 4402, and a content owner face image display field 4404. Herein, the display screen selection button 4400 may be a button for toggling the display of display screens provided for different content to play back, such as a screen for pictures and a screen for music, for example. Note that although FIG. 40 illustrates an example in which the type of content to share is captured images, the configuration is not limited to such an example, and the content to share may also be music, movies, chat content, or the like. As another example, if the content to share is music, on the content display field 4402, a thumbnail related to the relevant content may also be displayed, for example. Additionally, the content sharing service screen 440 may also be generated on the basis of a content sharing list 432 as illustrated in FIG. 41, which is stored in the storage unit 4106, for example.

Next, an example of a configuration of the content sharing list 432 will be described with reference to FIG. 41. As illustrated in FIG. 41, in the content sharing list 432, a meta-information (content name) column 4320, a meta-information (artist name) column 4322, and a content owner account column 4324 are recorded in association with each other, for example. Herein, in the content owner account column 4324, the account of the user who submitted the relevant content to the relevant content sharing service is recorded. For example, the data illustrated on the second row of FIG. 41 indicates that the content name is "Song 1", the content type is "Music", and the account name of the owner of the relevant content is "Akko".

Note that, according to the fourth embodiment, it is also possible to provide a computer program causing hardware such as a CPU, ROM, and RAM built into the first communication terminal 410 to exhibit the same functionality as the respective components of the first communication terminal 410 discussed above. Also, a storage medium having such a computer program stored therein is also provided.

The above thus describes a configuration of the first communication terminal 410 according to the fourth embodiment, but the configuration is not limited to the configuration discussed above. For example, one or more of any of the storage unit 4106, the service history acquisition unit 4108, the input unit 4110, and the display unit 4112 may be provided in another device.

(4-3-2. Second Communication Terminal 420)

Figure 39:
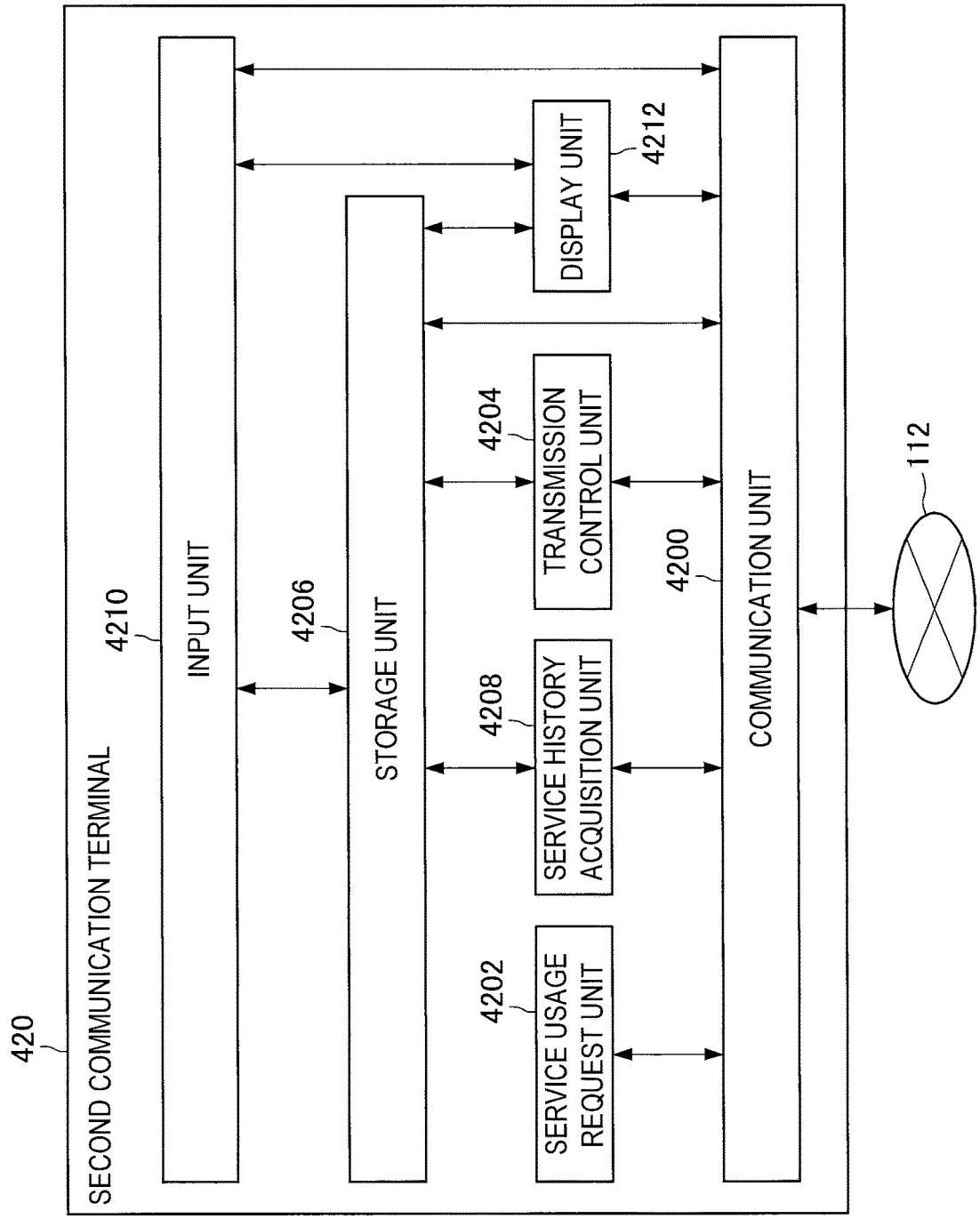
FIG. 39 is a function block diagram illustrating a configuration of a second communication terminal according to the same embodiment.

Also, as illustrated in FIG. 39, the second communication terminal 420 according to the fourth embodiment includes a communication unit 4200 (receiving unit), a service usage request unit 4202, a transmission control unit 4204, a storage unit 4206, a service history acquisition unit 4208, an input unit 4210, and a display unit 4212.

The communication unit 4200 transmits and receives various information to and from the first communication terminal 410 and the information processing device 430 via the communication network 112. For example, the communication unit 4200 receives, from the first communication terminal 410, service identification information of a communication service and service user identification information associated with the relevant service identification information. In addition, the communication unit 4200, under control by the transmission control unit 4204 discussed later, transmits the above service identification information and the above service user identification information received from the first communication terminal 410 to the information processing device 430.

The service usage request unit 4202 requests usage of a communication service from the first communication terminal 410 via the communication unit 4200.

The transmission control unit 4204 controls the communication unit 4200 to transmit various information to the first communication terminal 410 and the information processing device 430. For example, the transmission control unit 4204 causes the communication unit 4200 to transmit meta-information of content stored in the storage unit 4206 to the first communication terminal 410.

The storage unit 4206 stores various information such as the above service identification information and the above service user identification information received by the communication unit 4200, and various software such as an application for using a communication service, for example.

Note that the functions of the service history acquisition unit 4208, the input unit 4210, and the display unit 4212 are similar to the service history acquisition unit 4108, the input unit 4110, and the display unit 4112 in the first communication terminal 410, respectively.

The above thus describes a configuration of the second communication terminal 420 according to the fourth embodiment, but the configuration is not limited to the configuration discussed above. For example, one or more of any of the service usage request unit 4202, the service history acquisition unit 4208, and the input unit 4210 may also be provided in another device.

[4-4. Operation According to Fourth Embodiment]

(4-4-1. Operation of Content Sharing Service)

The above thus describes a configuration according to the fourth embodiment. Next, operation according to the fourth embodiment will be described. First, operation during a communication service according to the fourth embodiment will be described. Note that, as an example, the following describes operation in the case in which the communication service is a content sharing service.

FIG. 42 is a sequence diagram illustrating operation during a content sharing service according to the fourth embodiment. As illustrated in FIG. 42, first, in response to a user operation on the input unit 4110, the first communication terminal 410 activates an application for using a content sharing service downloaded in advance (S401).

Next, in response to a user operation on the input unit 4110, the communication unit 4200 requests the information processing device 430 for service identification information for a content sharing service that the user desires to organize on a certain local network (S402).

Next, the information processing device 430 issues service identification information of the relevant content sharing service on the basis of the above request received from the first communication terminal 410, and subsequently transmits the relevant service identification information to the first communication terminal 410 (S403).

Next, in response to a user operation on the input unit 4110, the first communication terminal 410 uses the relevant service identification information to start a content sharing service on the relevant local network (S404).

Next, the user identification information issuing unit 4102 issues service user identification information associated with the service identification information received in S403 to the first communication terminal 410 (S405). Subsequently, the storage unit 4106 stores the service identification information received in S403 and the service user identification information issued in S405 in association with each other (S406).

Next, in response to a user operation on the input unit 4210, the second communication terminal 420 activates an application for using a content sharing service downloaded in advance (S407).

Next, the service usage request unit 4202 of the second communication terminal 420 requests usage of the content sharing service organized by the first communication terminal 410 from the first communication terminal 410 via the communication unit 4200 (S408).

Next, the user identification information issuing unit 4102, on the basis of the above request received from the second communication terminal 420, issues service user identification information, which is different from the service user identification information issued in S405, to the second communication terminal 420. Subsequently, the storage unit 4106 stores the service identification information received in S403 and the service user identification information issued to the second communication terminal 420 in association with each other (S409).

Next, the transmission control unit 4104 causes the communication unit 4100 to transmit the service identification information stored in the storage unit 4106 and the service user identification information issued in S409 to the second communication terminal 420. Subsequently, the storage unit 4206 of the second communication terminal 420 stores the service identification information and the service user identification information received from the first communication terminal 410 in association with each other (S410).

At this point, if multiple second communication terminals 420 are connected to the relevant local network, the operation from S407 to S410 may be repeated a number of times equal to the number of second communication terminals 420 connected to the relevant local network.

Next, the first communication terminal 410 and the second communication terminal 420 display the content sharing service screen illustrated in FIG. 40, for example, share content stored in each terminal, chat, and the like (S411).

More specifically, if content is submitted by the second communication terminal 420, for example, first, the communication unit 4100 of the first communication terminal 410 receives, from the second communication terminal 420, meta-information corresponding to content stored in the second communication terminal 420, and service user identification information issued to the second communication terminal 420. Subsequently, the storage unit 4106 stores the meta-information and the service user identification information received from the second communication terminal 420 in association with each other, like in the content sharing list illustrated in FIG. 41, for example.

Also, if content is submitted by the first communication terminal 410, the storage unit 4106 of the first communication terminal 410 similarly stores meta-information corresponding to the relevant content and the service user identification information issued to the first communication terminal 410 in association with each other.

Also, if the second communication terminal 420a desires to play back music owned by another user, for example, first, the communication unit 4100 of the first communication terminal 410 receives a provision request for the service user identification information issued to the communication terminal that owns the relevant music (assumed to be the second communication terminal 420b herein for the sake of convenience). Subsequently, the transmission control unit 4104 causes the communication unit 4100 to transmit the service user identification information of the second communication terminal 420b stored in the storage unit 4106 to the second communication terminal 420a. Consequently, the second communication terminal 420a is able to request the second communication terminal 420b to transmit the relevant music in a streaming format, or request playback by a playback device connected to the relevant local network, for example.

Next, when the content sharing service ends, for example, the transmission control unit 4104 of the first communication terminal 410 causes the communication unit 4100 to transmit the service identification information, a list of service user identification information issued in S405 and S409, and context of the relevant content sharing service, which are stored in the storage unit 4106, to the information processing device 430 (S412).

After that, the information processing device 430 stores the service identification information, the list of service user identification information, and the context of the relevant content sharing service, which were received from the first communication terminal 410, in association with each other (S413).

(4-4-2. Operation of Review After Content Sharing Service)

Next, operation of a review after a content sharing service according to the fourth embodiment will be described. FIG. 43 is a sequence diagram illustrating operation of a review after a content sharing service according to the fourth embodiment. Note that FIG. 43 presupposes that the first communication terminal 410 and the second communication terminal 420 have separated from the above local network as a general rule.

At this point, if the user of the first communication terminal 410 desires to review the context of the content sharing service in S411 of FIG. 42, as illustrated in FIG. 43, first, in response to a user operation on the input unit 4110, the first communication terminal 410 activates the application for using a content sharing service as discussed earlier (S421).

Next, in response to a user operation on the input unit 4110, the service history acquisition unit 4108 causes the communication unit 4100 to transmit the service identification information of the relevant content sharing service, the service user identification information issued to the current terminal, and meta-information corresponding to the desired content to reference, for example, which are stored in the storage unit 4106, to the information processing device 430 via the communication network 112 (S422). At this point, the service history acquisition unit 4108 may also not cause the communication unit 4100 to transmit the above meta-information to the information processing device 430.

Next, the information processing device 430, according to the above information received from the first communication terminal 410, transmits the context of the relevant content sharing service, and the identification information of the communication terminal of the owner of the content corresponding to the received meta-information (assumed to be the second communication terminal 420b herein for the sake of convenience), for example, to the first communication terminal 410 (S423). At this point, if meta-information is not received in S422, the information processing device 430 may also not transmit the identification information of the communication terminal of the owner of the above content to the first communication terminal 410.

Note that, as a modification of S423, the information processing device 430, according to the above information received from the first communication terminal 410, may also transmit a group image like the event summary screen 220 illustrated in FIG. 24, for example, to the first communication terminal 410. According to this modification, the user of the first communication terminal 410 is able to review in a format in which the details of shared content, such as captured images, for example, are briefly summarized.

Next, in response to a user operation on the input unit 4110, the communication unit 4100 of the first communication terminal 410 requests the second communication terminal 420b to display or play back content, for example (S424).

Next, the second communication terminal 420b, according to the request received from the first communication terminal 410, displays the relevant content on the first communication terminal 410, or transmits the relevant content in a stream format, for example (S425).

Next, if the user of the second communication terminal 420a similarly desires to review the context of the content sharing service, in response to a user operation on the input unit 4210, the second communication terminal 420a activates the application for using a content sharing service as discussed earlier (S426).

Next, in response to a user operation on the input unit 4210, the service history acquisition unit 4208 causes the communication unit 4200 to transmit the service identification information of the relevant content sharing service, the service user identification information issued to the current terminal, and meta-information corresponding to the desired content to reference, for example, which are stored in the storage unit 4206, to the information processing device 430 via the communication network 112 (S427). At this point, the service history acquisition unit 4208 may also not cause the communication unit 4200 to transmit the above meta-information to the information processing device 430.

Next, the information processing device 430, according to the above information received from the second communication terminal 420a, transmits the context of the relevant content sharing service, and the identification information of the communication terminal of the owner of the content corresponding to the received meta-information (assumed to be the second communication terminal 420*b* herein for the sake of convenience), for example, to the second communication terminal 420*a* (S428). At this point, if meta-information is not received in S427, the information processing device 430 may also not transmit the identification information of the communication terminal of the owner of the above content to the second communication terminal 420*a*.

Note that, as a modification of S428, similarly to S423, the information processing device 430, according to the above information received from the second communication terminal 420*a*, may also transmit a group image like the event summary screen 220 illustrated in FIG. 24, for example, to the second communication terminal 420*a*.

Next, in response to a user operation on the input unit 4210, the communication unit 4200 of the second communication terminal 420*a* requests the second communication terminal 420*b* to display or play back content, for example (S429).

Next, the second communication terminal 420*b*, according to the request received from the second communication terminal 420*a*, displays the relevant content on the second communication terminal 420*a*, or transmits the relevant content in a stream format, for example (S430).

The above thus describes operation of a review after a content sharing service with reference to FIG. 43, but operation is not limited to the operation discussed above. For example, the operation from S421 to S425 and the operation from S426 to S430 may be processed in parallel instead of being processed in the order illustrated in FIG. 43.

In addition, before S421, for example, the information processing device 430 may also cause the first communication terminal 410 and the second communication terminal 420 to register with a parent service managed by the information processing device 430, for example. Additionally, as part of the process of registering with the relevant parent service, the information processing device 430 may also cause the user of the first communication terminal 410 and the second communication terminal 420 to register more personal information, such as the user's name, age, and occupation, for example. According to this modification, since the information processing device 430 is able to collect more personal information related to the relevant user, there is an advantage of utilizing such information for advertising and marketing, for example, or enabling easier introduction of paid service functionality.

[4-5. Advantageous Effects According to Fourth Embodiment]

As described above, according to the fourth embodiment, the first communication terminal 410 acquires service identification information associated with a communication service from a information processing device 430 that manages shared content, and issues service user identification information associated with the relevant service identification information to the second communication terminal 420. Subsequently, the first communication terminal 410 transmits the relevant service identification information, and the service user identification information issued to the second communication terminal 420, to the information processing device 430. For this reason, a user of the second communication terminal 420 may transmit the relevant service identification information and the service user identification information issued by the first communication terminal 410 to the information processing device 430 via the communication network 112, thereby enabling the information processing device 430 to ensure the identity of a user of the relevant communication service even after the communication service ends. Consequently, the first communication terminal 410 is able to support the maintaining of connections made between users on the relevant communication service, even after the relevant communication service ends.

For example, if the communication service is a content sharing service, the user of the second communication terminal 420 is able to review or re-share context such as captured images and chat content, for example, that were shared with the first communication terminal 410 or another second communication terminal 420, even after the communication service ends.

Also, if the communication service is a content sharing service, the information shared between the first communication terminal 410 and the second communication terminal 420, or between two second communication terminals 420, may be just meta-information corresponding to content and service user identification information, as discussed above. For this reason, since the content itself is not shared, it is possible to protect the copyright of content such as music, for example.

Also, the information that is provided to the first communication terminal 410 and another second communication terminal 420 in order for the second communication terminal 420 to use the communication service is, as a general rule, just service identification information and service user identification information acquired from the first communication terminal 410. For this reason, the second communication terminal 420 does not publish personal information such as identification information of the current terminal or private information, for example, to the first communication terminal 410 and another second communication terminal 420, and thus there is almost no risk of personal information being used without authorization. Consequently, the user of the second communication terminal 420 is able to use the communication service casually and without hesitation. Also, there is an advantage in that the user of the first communication terminal 410 may anticipate that more users of the second communication terminal 420 will participate in the communication service, because of the above reasons.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1) A communication terminal including:

an information acquisition unit that acquires, from another communication terminal, first information that includes connection information for connecting to a communication service and identification information of a user of the other communication terminal; and an information generation unit that, on the basis of the first information acquired by the information acquisition unit, generates second information that includes the connection information and identification information of a user of the current terminal.

(2) The communication terminal according to (1), further including:

a transmission control unit that causes a communication unit to transmit the identification information of the user of the other communication terminal and the identification information of a user of the communication terminal to a service management device that manages the communication service.

(3) The communication terminal according to (1) or (2), wherein
the first information is an information code, and
the information acquisition unit uses image capture to acquire an information code that is the first information displayed on the other communication terminal.

(4) The communication terminal according to any one of (1) to (3), further including:
an information propagation unit that propagates the second information generated by the information generation unit to another communication terminal.

(5) The communication terminal according to (4), wherein
the second information is an information code, and
the information propagation unit propagates an information code that is the second information by displaying the information code.

(6) The communication terminal according to any one of (2) to (5), wherein
the transmission control unit causes the communication unit to transmit the identification information of the user of the other communication terminal and the identification information of the user of the communication terminal in response to acquisition of the first information by the information acquisition unit.

(7) The communication terminal according to any one of (2) to (6), wherein
the connection information includes address information of the service management device and identification information of the communication service.

(8) The communication terminal according to any one of (1) to (7), wherein
the connection information includes an identifier of a predetermined access point connected to the communication service and authentication information for connecting to the predetermined access point.

(9) An information processing device including:
a receiving unit that receives identification information of a user of a first communication terminal and identification information of a user of a second communication terminal from the second communication terminal, is the second communication terminal being a communication terminal that has received propagation of connection information of a communication service and identification information of a user of the current terminal from the first communication terminal; and
a graph generation unit that generates a social graph that indicates a relationship between the user of the first communication terminal and the user of the second communication terminal.

(10) The information processing device according to (9), wherein
the receiving unit additionally receives the identification information of the user of the second communication terminal and identification information of a user of a third communication terminal from the third communication terminal, is the third communication terminal being a communication terminal that has received propagation of the connection information and the identification information of the user of the second communication terminal from the second communication terminal, and
the graph generation unit adds to the social graph a graph indicating a relationship between the user of the second communication terminal and the user of the third communication terminal.

(11) A communication method including:
acquiring, from another communication terminal, first information that includes connection information for connecting to a communication service and identification information of a user of the other communication terminal; and
generating, on the basis of the acquired first information, second information that includes the connection information and identification information of a user of the current terminal.

(12) An information processing method including:
receiving identification information of a user of a first communication terminal and identification information of a user of a second communication terminal from the second communication terminal, is the second communication terminal being a communication terminal that has received propagation of connection information of a communication service and identification information of a user of the current terminal from the first communication terminal; and
generating a social graph that indicates a relationship between the user of the first communication terminal and the user of the second communication terminal.

(13) A program for causing a computer to function as:
an information acquisition unit that acquires, from another communication terminal, first information that includes connection information for connecting to a communication service and identification information of a user of the other communication terminal; and
an information generation unit that, on the basis of the first information acquired by the information acquisition unit, generates second information that includes the connection information and identification information of a user of the current terminal.

(14) A communication system including:
a communication terminal and an information processing device, wherein
the communication terminal includes
an information acquisition unit that acquires, from another communication terminal, first information that includes connection information for connecting to a communication service and identification information of a user of the other communication terminal, and
an information generation unit that, on the basis of the first information acquired by the information acquisition unit, generates second information that includes the connection information and identification information of a user of the current terminal, and
the information processing device includes
a receiving unit that receives, from the communication terminal, the identification information of the user of the other communication terminal and identification information of a user of the communication terminal, and
a graph generation unit that generates a social graph that indicates a relationship between the user of the other communication terminal and the user of the communication terminal.

REFERENCE SIGNS LIST 110 first communication terminal
112 communication network
120 second communication terminal
130 playback device
160 playback information database
170 display device
190 music selling service
200 communication terminal 210 image processing device
310 communication terminal
320 information processing device
410 first communication terminal
420 second communication terminal
430 information processing device
1100 communication unit
1102 playlist management unit
1104 storage unit
1106 stored information operation unit
1108 playlist transmitting unit
1110 playback control unit
1112 display unit
1114 input unit
1116 image capture unit
1118 playback information database operation unit
1120 content request unit
1150 CPU
1152 ROM
1154 RAM
1156 internal bus
1158 interface
1160 input device
1162 output device
1164 storage device
1166 image capture device
1168 communication device
1200 communication unit
1202 storage unit
1204 display unit
1206 input unit
1206 display unit
1208 image capture unit
2100 communication unit
2102 storage unit
2104 person recognition unit
2106 image evaluation unit
2108 image selection unit
2110 group image generation unit
2112 hue analysis unit
2114 service information decision unit
2116 access management unit
3100 communication unit
3102 information acquisition unit
3104 information generation unit
3106 transmission control unit
3108 information propagation unit
3110 storage unit
3112 input unit
3200 communication unit
3202 graph generation unit
3204 storage unit
4100 communication unit
4102 user identification information issuing unit
4104 transmission control unit
4106 storage unit
4108 service history acquisition unit
4110 input unit
4112 display unit
4200 communication unit
4202 service usage request unit
4204 transmission control unit
4206 storage unit
4208 service history acquisition unit
4210 input unit
4212 display unit

The invention claimed is:

1. A first communication terminal, comprising:
a first display device;
a memory configured to store computer-executable instructions; and
one or more processors configured to execute the computer-executable instructions to:
acquire, from a second communication terminal, a first information code that includes connection information to connect to a communication service of an external device and first identification information of a first user of the second communication terminal;
transmit, based on the acquired first information code, the first identification information of the first user of the second communication terminal and second identification information of a second user of the first communication terminal to the external device;
generate, based on the acquired first information code, second information that includes a second information code and the second identification information; and
control the first display device to display the second information code, wherein a third communication terminal acquires the displayed second information code by capture of a first image of the displayed second information code.

2. The first communication terminal according to claim 1, wherein the one or more processors are further configured to control a camera to capture a second image to acquire the first information code.

3. The first communication terminal according to claim 1, wherein the one or more processors are further configured to propagate the generated second information to the third communication terminal.

4. The first communication terminal according to claim 1, wherein the connection information includes address information of the external device and third identification information of the communication service.

5. The first communication terminal according to claim 1, wherein the connection information includes:
an identifier of an access point connected to the communication service; and
authentication information to connect to the access point.

6. The first communication terminal according to claim 1, wherein the one or more processors are further configured to acquire meta-information of content on the communication service from the second communication terminal.

7. The first communication terminal according to claim 6, wherein the meta-information of the content includes at least one of a name of the content or an artist name of the content.

8. The first communication terminal according to claim 1, wherein the one or more processors are further configured to control a playback duration of content on the communication service based on an instruction from the second communication terminal.

9. The first communication terminal according to claim 1, wherein the second communication terminal includes a second display device that displays the first information code.

10. The first communication terminal according to claim 1, wherein the first information code corresponds to a Quick Response (QR) code.

11. The first communication terminal according to claim 1, wherein the connection information includes at least one of event information or propagator identification information.

12. An information processing device, comprising:
a memory configured to store computer-executable instructions; and
one or more processors configured to execute the computer-executable instructions to:
   receive, from a first communication terminal, first identification information of a first user of a second communication terminal and second identification information of a second user of the first communication terminal,
      wherein the first communication terminal receives connection information of a communication service and the first identification information from the second communication terminal,
      wherein the first communication terminal generates second information that includes a second information code and the second identification information,
      wherein the first communication terminal displays the second information code, and
      wherein a third communication terminal acquires the displayed second information code by capture of an image of the displayed second information code;
   generate, based on the first identification information and the second identification information, a social graph that indicates a first relationship between the first user of the second communication terminal and the second user of the first communication terminal;
   update the social graph based on the connection information of the communication service; and
   transmit the updated social graph to each of a plurality of terminals and each of the first communication terminal, the second communication terminal, and the third communication terminal.

13. The information processing device according to claim 12,
wherein the one or more processors are further configured to:
   receive, from the third communication terminal, the second identification information of the second user of the first communication terminal and third identification information of a third user of the third communication terminal,
      wherein the third communication terminal receives the connection information of the communication service and the second identification information from the first communication terminal; and
   update the social graph with a first graph that indicates a second relationship between the second user of the first communication terminal and the third user of the third communication terminal.

14. A communication method, comprising:
in a first communication terminal:
   acquiring, from a second communication terminal, a first information code that includes connection information to connect to a communication service of an external device and first identification information of a first user of the second communication terminal;
   transmitting, based on the acquired first information code, the first identification information of the first user of the second communication terminal and second identification information of a second user of the first communication terminal to the external device;
   generating, based on the acquired first information code, second information that includes a second information code and the second identification information; and
   controlling a display device of the first communication terminal to display the second information code,
      wherein a third communication terminal acquires the displayed second information code by capture of an image of the displayed second information code.

15. An information processing method, comprising:
in an information processing device:
   receiving, from a first communication terminal, first identification information of a first user of a second communication terminal and second identification information of a second user of the first communication terminal,
      wherein the first communication terminal receives connection information of a communication service and the first identification information from the second communication terminal,
      wherein the first communication terminal generates second information that includes a second information code and the second identification information,
      wherein the first communication terminal displays the second information code, and
      wherein a third communication terminal acquires the displayed second information code by capture of an image of the displayed second information code;
   generating, based on the first identification information and the second identification information, a social graph that indicates a relationship between the first user of the second communication terminal and the second user of the first communication terminal;
   updating the social graph based on the connection information of the communication service; and
   transmitting the updated social graph to each of a plurality of terminals and each of the first communication terminal, the second communication terminal, and the third communication terminal.

16. A non-transitory computer-readable medium having stored thereon computer-executable instructions which, when executed by a processor of a first communication terminal, cause the processor to execute operations, the operations comprising:
   acquiring, from a second communication terminal, a first information code that includes connection information to connect to a communication service of an external device and first identification information of a first user of the second communication terminal;
   transmitting, based on the acquired first information code, the first identification information of the first user of the second communication terminal and second identification information of a second user of the first communication terminal to the external device;
   generating, based on the acquired first information code, second information that includes a second information code and the second identification information; and
   controlling a display device of the first communication terminal to display the second information code,
      wherein a third communication terminal acquires the displayed second information code by capture of an image of the displayed second information code.

17. A communication system, comprising:
a first communication terminal that comprises:
   a display device;
   a first memory configured to store first set of computer-executable instructions; and a first set of one or more processors configured to execute the first set of computer-executable instructions to:
  acquire, from a second communication terminal, a first information code that includes connection information to connect to a communication service of an external device and first identification information of a first user of the second communication terminal;
  transmit, based on the acquired first information code, the first identification information of the first user of the second communication terminal and second identification information of a second user of the first communication terminal to the external device;
  generate, based on the acquired first information code, second information that includes a second information code and the second identification information; and
  control the display device to display the second information code, wherein a third communication terminal acquires the displayed second information code by capture of a first image of the displayed second information code; and
an information processing device that comprises:
  a second memory configured to store a second set of computer-executable instructions; and
  a second set of one or more processors configured to execute the second set of computer-executable instructions to:
    receive, from the first communication terminal, the first identification information of the first user of the second communication terminal and the second identification information of the second user of the first communication terminal,
    wherein the first communication terminal receives connection information of the communication service and the first identification information from the second communication terminal, and
    generate, based on the first identification information and the second identification information, a social graph that indicates a relationship between the first user of the second communication terminal and the second user of the first communication terminal;
    update the social graph based on the connection information of the communication service; and
    transmit the updated social graph to each of a plurality of terminals and each of the first communication terminal, the second communication terminal, and the third communication terminal.

\* \* \* \* \*